US012582027B2

US 12,582,027 B2

(12) United States Patent
Kelly et al.

(10) Patent No.: US 12,582,027 B2
(45) Date of Patent: Mar. 24, 2026

(54) VEGETATION MONITORING DEVICE, VEGETATION MONITORING SYSTEM AND VEGETATION MONITORING METHOD FOR MONITORING VEGETATION HEALTH IN A GARDEN

(71) Applicant: Robert Bosch GmbH, Stuttgart (DE)

(72) Inventors: Aaron Kelly, Cottenham (GB); Jon Taylor, Illington (GB); Elzbieta Kotyrba, Ipswich (GB); Chris Ager, Melton (GB)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 18/695,780

(22) PCT Filed: Sep. 7, 2022

(86) PCT No.: PCT/EP2022/074790
§ 371 (c)(1),
(2) Date: Mar. 26, 2024

(87) PCT Pub. No.: WO2023/052055
PCT Pub. Date: Apr. 6, 2023

(65) Prior Publication Data

US 2024/0407288 A1 Dec. 12, 2024

(30) Foreign Application Priority Data

Sep. 30, 2021 (DE) ..................... 10 2021 210 960.8

(51) Int. Cl.
*A01D 34/00* (2006.01)
*A01D 101/00* (2006.01)
(Continued)

(52) U.S. Cl.
CPC ............. *A01D 34/008* (2013.01); *A01G 7/00* (2013.01); *G05D 1/622* (2024.01); *G05D 1/6486* (2024.01);
(Continued)

(58) Field of Classification Search
CPC ............. A01D 34/008; A01D 2101/00; G06V 20/188; G05D 1/6486; G05D 1/622;
(Continued)

(56) References Cited

U.S. PATENT DOCUMENTS

| | | |
|---|---|---|
| 2018/0052114 A1 | 2/2018 | Takashima et al. |
| 2020/0193589 A1 | 6/2020 | Peshlov et al. |
| 2021/0078706 A1* | 3/2021 | Lin ..................... A01C 23/047 |

OTHER PUBLICATIONS

International Search Report corresponding to PCT Application No. PCT/EP2022/074790, mailed Feb. 10, 2023 (German and English language document) (10 pages).

(Continued)

*Primary Examiner* — Michael D Lang
(74) *Attorney, Agent, or Firm* — Maginot, Moore & Beck LLP

(57) ABSTRACT

A vegetation monitoring device with at least one camera unit (28) for monitoring vegetation health in a garden (10), wherein the at least one camera unit (28) is configured to detect the garden area (30, 32, 34) in at least a first range of the electromagnetic spectrum, in particular in the visible light range, and in at least a second region of the electro-magnetic spectrum, in particular in the infrared range, in order to determine at least one vegetation index of at least one garden area (30, 32, 34) of the garden (10), in particular in the region of visible light, and in at least one second region of the electromagnetic spectrum, in particular in the infrared range, wherein the camera unit (28) is provided for an arrangement at least substantially above ground level of the garden (10) and for an at least substantially stationary
(Continued)

Figure 1:
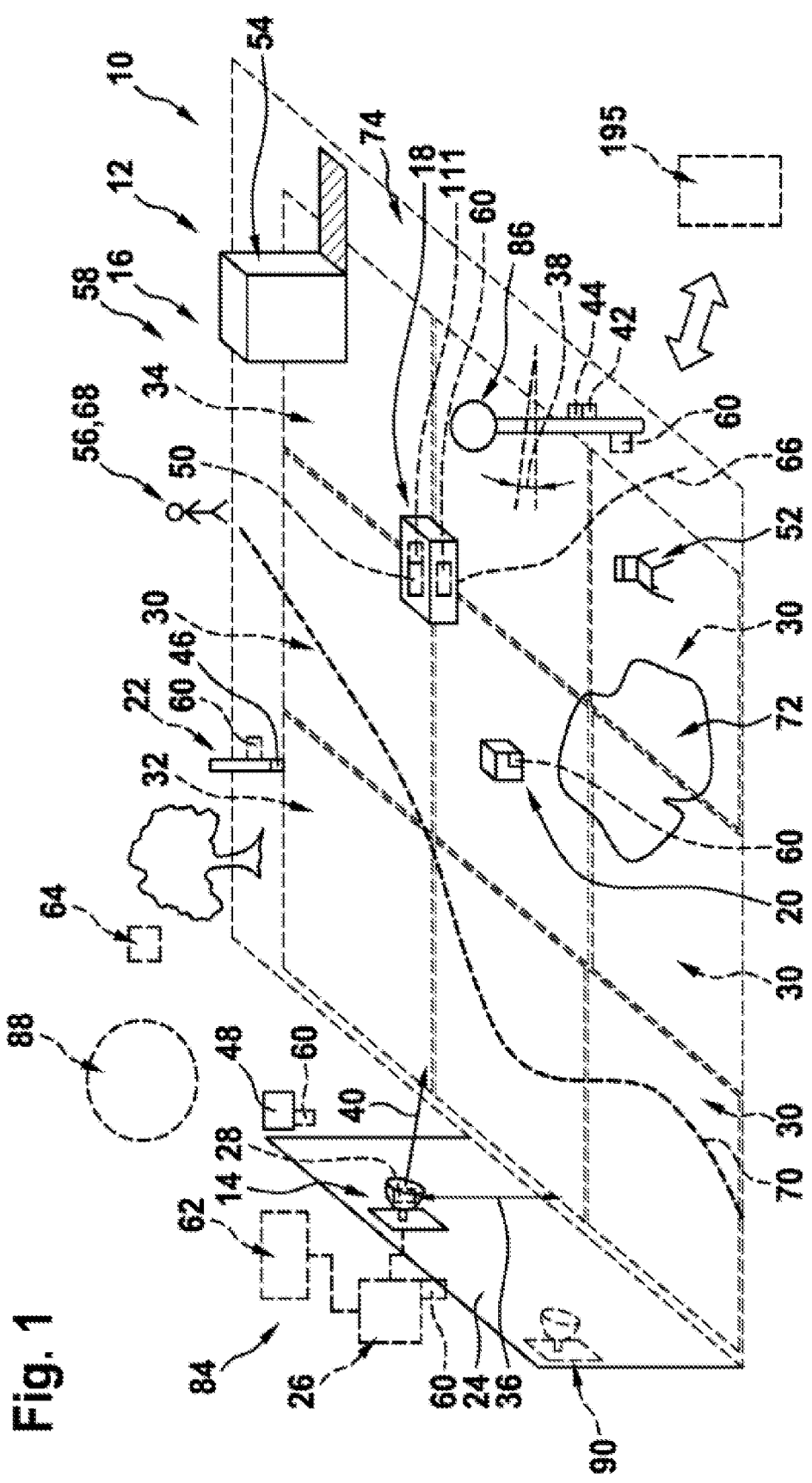

arrangement outside or in the vicinity of the garden (10), and a vegetation monitoring system is proposed.

20 Claims, 13 Drawing Sheets

(51) Int. Cl.

| | |
|---|---|
| *A01G 7/00* | (2006.01) |
| *G05D 1/622* | (2024.01) |
| *G05D 1/648* | (2024.01) |
| *G05D 105/15* | (2024.01) |
| *G05D 107/20* | (2024.01) |
| *G06V 20/10* | (2022.01) |
| *H04N 7/18* | (2006.01) |

(52) U.S. Cl.
CPC ............. *G06V 20/188* (2022.01); *H04N 7/18* (2013.01); *A01D 2101/00* (2013.01); *G05D 2105/15* (2024.01); *G05D 2107/23* (2024.01)

(58) Field of Classification Search
CPC .. G05D 2105/15; G05D 2107/23; A01G 7/00; H04N 7/18
See application file for complete search history.

(56) References Cited

OTHER PUBLICATIONS

"Precision agriculture", Wikipedia, Sep. 12, 2021 (Sep. 12, 2021), pp. 1-5, Retrieved from the Internet: https://en.wikipedia.org/w/index.php?title=Precision_agriculture&oldid=1043793459 [retrieved on Dec. 7, 2022] XP093005916.
"Normalized difference vegetation index", Wikipedia, Jul. 14, 2021 (Jul. 14, 2021), pp. 1-4, Retrieved from the Internet: https://en.wikipedia.org/w/index.php?title=Normalized_difference_vegetation_index&oldid=1033586910 [retrieved on Dec. 8, 2022] XP093006090.

* cited by examiner

Fig. 4

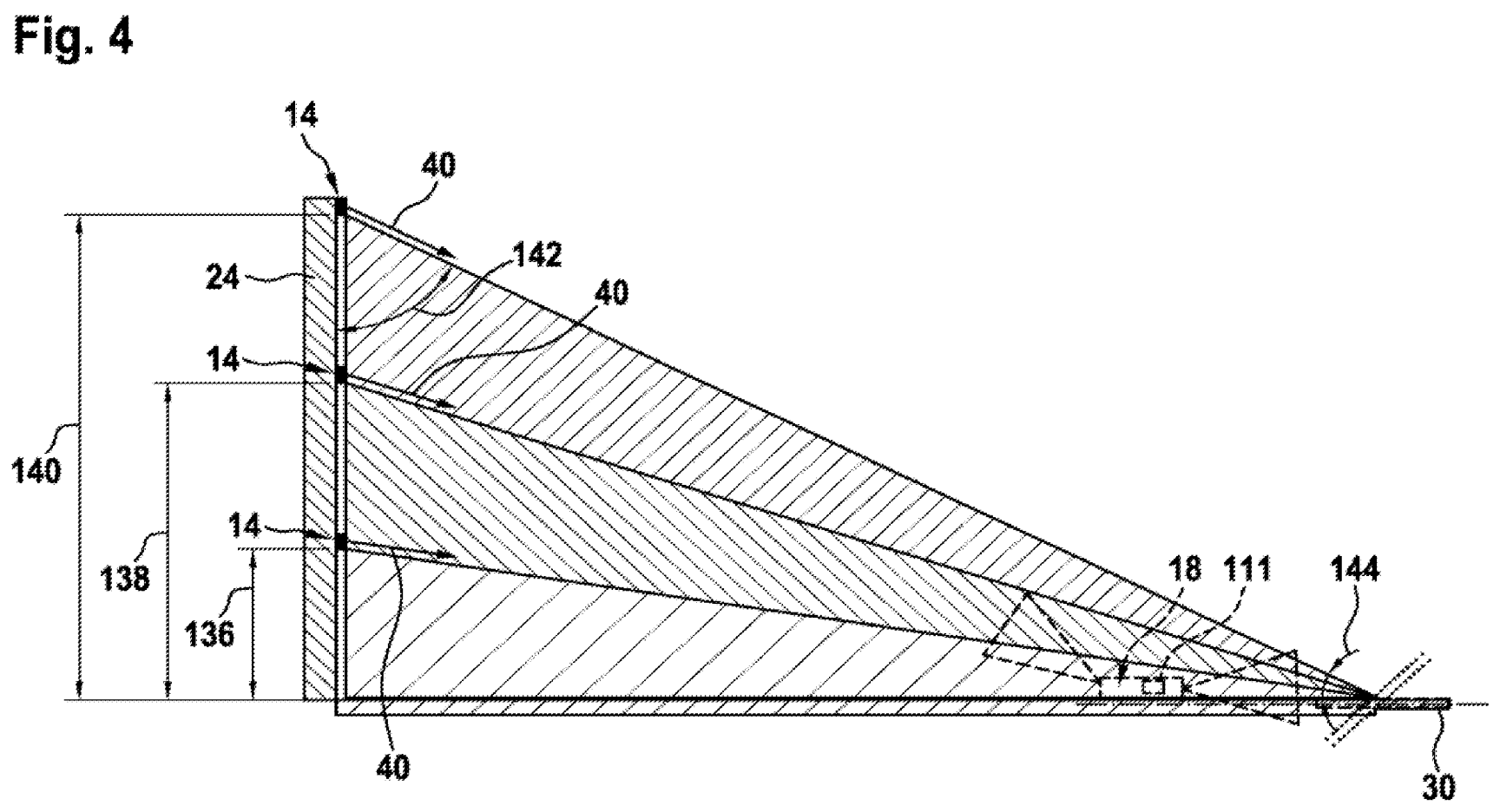

Fig. 7

VEGETATION MONITORING DEVICE, VEGETATION MONITORING SYSTEM AND VEGETATION MONITORING METHOD FOR MONITORING VEGETATION HEALTH IN A GARDEN

This application is a 35 U.S.C. § 371 National Stage Application of PCT/EP2022/074790, filed on Sep. 7, 2022, which claims the benefit of priority to Serial No. DE 10 2021 210 960.8, filed on Sep. 30, 2021 in Germany, the disclosures of which are incorporated herein by reference in their entirety.

PRIOR ART

A vegetation monitoring device and a vegetation monitoring system with a vegetation monitoring device have already been proposed.

DISCLOSURE OF THE INVENTION

The invention proposes a vegetation monitoring device for monitoring vegetation health in a garden having at least one camera unit, wherein the at least one camera unit is configured to capture at least one garden area of the garden in at least a first range of the electromagnetic spectrum, in particular in the visible light range, and in at least a second range of the electromagnetic spectrum, in particular in the infrared range, wherein the at least one camera unit is provided for an arrangement at least substantially above ground level of the garden and for an at least substantially stationary arrangement within or in the vicinity of the garden, wherein image data captured by the at least one camera unit is provided for determining a vegetation index of the at least one garden area of the garden.

In addition, a vegetation monitoring system for monitoring vegetation health in a garden, having at least one vegetation monitoring device, which is in particular arranged in an at least substantially stationary manner and is intended to detect at least one garden area of the garden in order to determine at least one vegetation index of the at least one garden area, and with at least one vegetation maintenance device which is intended to carry out at least one activity in the at least one garden area as a function of the determined vegetation index and/or of at least one garden parameter which is detected in the at least one garden area or can be assigned to the at least one garden area, in particular an additional garden parameter. Preferably, the vegetation monitoring system is provided for the maintenance of vegetation of the garden, in particular within the at least one garden area, in particular using the at least one vegetation maintenance device or the activity of the at least one vegetation maintenance device in the at least one garden area.

A "vegetation index" is to be understood in particular as a characteristic value that is representative of an observation and analysis of an area, in particular a ground surface, and in particular vegetation thereon, wherein special radiating characteristics of plants, in particular during photosynthesis, are utilized to distinguish them preferably from non-vegetation, in particular non-vegetated ground and/or objects. Preferably, the vegetation index can be used to make a statement about the vegetation health and vegetation density in an area under consideration. The vegetation index is preferably determined from at least one ratio of reflectivity values in different spectral ranges, in particular a ratio of sums and/or differences of reflectivity values in different spectral ranges. In particular, the vegetation index is referred to as DVI (Difference Vegetation Index), as RVI (Ratio Vegetation Index), as WDVI (Weighted Difference Vegetation Index), as an index of the SAVI family (Soil Adjusted Vegetation Index), as EVI (Enhanced Vegetation Index), as GRABS (Greeness Above Bare Soil), as NDVI (Normalized Differenced Vegetation Index), as MTCI (MERIS Terrestrial Chlorophyll Index), as PRI (Photochemical Reflectance Index), as Cl2, as GRVI (Green/Red Vegetation Index) or as PVI (Perpendicular Vegetation Index). In a particularly preferred embodiment, the vegetation index is configured as NDVI (Normalized Differenced Vegetation Index). The vegetation index formed as NDVI is preferably calculated, in particular by means of the computing unit, from a quotient of a difference between a reflectivity value in the near-infrared range of the electromagnetic spectrum $R_{NIR}$ and a reflectivity value in the red visible range of the electromagnetic spectrum $R_{Rot}$ and a sum of the reflectivity value in the near-infrared range of the electromagnetic spectrum $R_{NIR}$ and the reflectivity value in the red visible range of the electromagnetic spectrum $R_{Rot}$. In particular, there is a formula for calculating the vegetation index in the form of the NDVI.

$$NDVI = \frac{R_{NIR} - R_{Rot}}{R_{NIR} + R_{Rot}}.$$

Preferably, the vegetation monitoring device comprises at least one camera unit for capturing the at least one garden area. The camera unit is preferably configured to capture the at least one garden area in at least a first range of the electromagnetic spectrum, in particular in the visible light range, and in at least a second range of the electromagnetic spectrum, in particular in the infrared range. Preferably, the vegetation monitoring system for determining the vegetation index of the garden area of the garden comprises at least one computing unit, which is provided for calculating the vegetation index as a function of image data captured via the camera unit, which in particular comprise reflectivity values of the at least one garden area from the first range of the electromagnetic spectrum and reflectivity values of the at least one garden area from the second range of the electromagnetic spectrum, in particular by means of the formula for calculating the vegetation index formed as NDVI. The term "computing unit" is understood in particular to mean a unit having an information input, information processing, and an information output. Advantageously, the computing unit comprises at least one processor, a storage, input and output means, further electrical components, an operating program, regulating routines, control routines, and/or calculation routines. The components of the computing unit are preferably arranged on a common board and/or advantageously arranged within a common housing. In particular, the computing unit comprises at least one storage medium or is provided for an information technology connection to a storage medium. Preferably, the image data comprises at least one image of the at least one garden area and/or a section of the at least one garden area. In particular, the image data is configured as an electronic data packet. Preferably, the image data comprises a plurality of pixel values each associated with a pixel when the at least one garden area is captured. Preferably, the camera unit is provided to capture reflected light from a light source in the respective ranges of the electromagnetic spectrum from the at least one garden area within an exposure time. Preferably, the camera unit is provided to capture the at least one garden area, in particular for each range of the electromagnetic spectrum to be captured, in at least one image formed from a plurality of pixels. Alternatively, other embodiments of the vegetation index, in particular those mentioned above, are also conceivable. Preferably, the computing unit is configured to determine the vegetation index from at least one product and/or quotient of at least one reflectivity value captured in the first range of the electromagnetic spectrum, in particular a sum or an average value of reflectivity values captured in the first range of the electromagnetic spectrum, of the at least one garden area and a reflectivity value captured in the second range of the electromagnetic spectrum, in particular a sum or an average value of reflectivity values captured in the second range of the electromagnetic spectrum, of the at least one garden area. In particular, it is conceivable that the first range and/or the second range of the electromagnetic spectrum are different from the visible light range and/or the infrared range.

Preferably, the camera unit or the computing unit is provided/configured to determine at least one reflectivity value for the respective range of the electromagnetic spectrum for each pixel of the images captured via the camera unit to determine the vegetation index. Preferably, the computing unit is configured to determine at least one value of the vegetation index for each pixel of the image(s) recorded via the camera unit and/or for each pair of reflectivity values for the individual ranges of the electromagnetic spectrum. Alternatively, other areas of the electromagnetic spectrum are also conceivable for determining the vegetation index. Preferably, the computing unit is configured to calculate at least one average value for the vegetation index for the at least one garden area or a detected sub-area of the at least one garden area. It is conceivable that the computing unit is configured to determine at least one health status parameter of the garden, in particular of the at least one garden area, via the captured or determined parameters of the at least one garden area, in particular the vegetation index, a temporal progression of the vegetation index and/or of the at least one garden parameter, and/or as a function of a distribution of the vegetation index, in particular of values of the vegetation index above at least one limit value of the vegetation index. It is conceivable that the computing unit, in particular together with at least one external unit, is configured to determine the health status parameter of the garden, in particular the at least one garden area, via a weighted evaluation of the captured or determined parameters of the at least one garden area, in particular the vegetation index, a temporal progression of the vegetation index and/or garden parameters. It is conceivable that a determination of the health status parameter of the at least one garden area, in particular the garden, is made via a trained machine learning system, preferably an artificial neural network. For example, the health status parameter of the at least one garden area, in particular of the garden, is determined as a function of a ratio of values of the vegetation index determined for the at least one garden area, each exceeding a predefined limit value of the vegetation index, to a total amount of values of the vegetation index determined for the at least one garden area. It is conceivable that the vegetation monitoring system, in particular the vegetation monitoring device, is provided for monitoring and/or maintaining a plurality of garden areas of the garden. It is conceivable that the garden may comprise further areas in addition to the at least one garden area or that the garden area(s) may form the garden. Preferably, the computing unit is configured to detect the garden area(s) of the garden to be monitored and/or maintained based on the captured image data. In particular, a "garden area" is to be understood as an area of the garden, which can be preferably at least substantially completely captured by means of a vegetation monitoring device, in particular the camera unit. The garden may comprise a plurality of garden areas, but is preferably not necessarily formed by the plurality of the garden areas.

A "garden parameter" is to be understood in particular as a parameter that describes at least one state of the garden. Preferably, the garden parameter is recorded in or adjacent to the at least one garden area or can be assigned to the at least one garden area. The garden parameter comprises in particular statements about a condition which comprises and/or relates to the at least one garden area, for example a weather condition or the like, or a weather condition or the like existing in the adjacent or further environment of the at least one garden area. The garden parameter is preferably defined as an environmental parameter, such as a temperature, an air pressure, a humidity, a brightness, a light intensity, an irradiated energy or the like, as a weather parameter, such as a rain condition, a degree of cloudiness or the like, as a position parameter, for example of a person detected in the at least one garden area, from an animal detected in at least one garden area or from a device, in particular a device external to the system or a device of the vegetation device system, or the like, as a user-defined specification for the vegetation device system, such as a set time for the activity or a cutting height of plants, or the like.

The vegetation maintenance device is preferably provided to carry out at least one activity for maintaining plants within the at least one garden area. Preferably, the computing unit is configured to control the vegetation maintenance device to carry out the activity in the at least one garden area as a function of the determined vegetation index and/or the detected value of the at least one garden parameter and/or to set at least one processing parameter for carrying out the activity in the at least one garden area. For example, the activity is designed as a cutting of plants within the at least one garden area, as a mowing of a meadow or a lawn within the at least one garden area, as a fertilizing of plants within the at least one garden area, as an irrigation of plants within the at least one garden area, or the like. It is conceivable that the vegetation monitoring system comprises a plurality of, in particular different, vegetation maintenance devices. For example, the vegetation maintenance device(s) is/are configured as a lawn mower, in particular a robotic lawn mower, in particular an irrigation device, in particular a lawn sprinkler or a mobile robot for irrigation, as a stationary or mobile fertilizer device, or the like. The vegetation monitoring system preferably comprises at least one, in particular wireless, communication unit. In particular, the communication unit is provided for wirelessly transmitting electronic signals by radio, light, or the like. Preferably, the vegetation maintenance device(s) of the vegetation monitoring system are connected to the computing unit and the vegetation monitoring device via the communication unit of the vegetation monitoring system, in particular to exchange electronic data, such as captured image data and/or control instructions for controlling the vegetation maintenance device(s).

The vegetation monitoring device is preferably provided, in particular autonomously, to capture vegetation health in the garden, preferably to assess it and, if necessary to maintain or improve the vegetation health, to carry out activities and/or have them carried out in the at least one garden area. The vegetation monitoring device is preferably provided for use in a garden. Preferably, the vegetation monitoring device is arranged at or in the garden. Preferably, the vegetation maintenance device is arranged in or on the garden. It is conceivable that the vegetation maintenance device is arranged outside the garden, in particular the at least one garden area, wherein preferably the vegetation maintenance device is provided to carry out an activity within the at least one garden area and/or a maintenance of plants within the at least one garden area.

The term "substantially above ground level of the garden" is understood in particular to mean an arrangement of the vegetation monitoring device, in particular the camera unit, with a minimum distance to ground level of at least 1 m, preferably at least 2 m, and particularly preferably at least 3. Preferably, the vegetation monitoring device, in particular the camera unit, is arranged at a distance of at most 20 m, preferably at most 15 m, and particularly preferably at most 12 m, from the ground level, at least substantially above a ground level of the garden. Preferably, the camera unit is provided for an arrangement at least substantially above an imaginary plane extending horizontally through a highest point of the at least one garden area to be monitored. Preferably, the camera unit is provided for an arrangement relative to the ground level of the garden in which a ratio of a mounting height of the camera unit to a minimum distance of the camera unit to a point within the at least one garden area furthest away from the camera unit is at least 0.17, preferably at least 0.25 and particularly preferably at least 0.34. Preferably, the mounting height extends perpendicular to a subsurface, in particular the ground level of the garden. Preferably, the camera unit is provided to be arranged with an inclination angle to a horizontal and/or the imaginary plane of at least 10°, preferably at least 20°, and particularly preferably at least 30°. In particular, the imaginary plane is aligned at least substantially parallel to the horizontal. In particular, the vegetation monitoring device, especially the camera unit, has a main viewing direction that spans the inclination angle, especially with the horizontal. An "essentially stationary arrangement" is to be understood in particular as an arrangement of the vegetation monitoring device, in particular the camera unit, wherein the vegetation monitoring device is arranged stationary in an environment, in particular in or on the at least one garden area, and is immovable within the at least one garden area, wherein in particular a change in an orientation of the vegetation monitoring device relative to the environment, for example in the form of a pivoting or rotating movement, is excluded. It is conceivable that the camera unit may be rotatably and/or pivotably configured. Preferably, the vegetation monitoring device, in particular the camera unit, is provided for mounting on a stationary object in or at the garden, for example a post, a wall, a roof, or the like. The camera unit is preferably attached to the stationary object. Preferably, the camera unit is fixed in an operating state for capturing the at least one garden area, so that it cannot be removed and/or moved without aids or loosening of connecting and/or locking means. The "health of a garden", in particular a garden area of the garden, is to be understood in particular as a state of health of vegetation that grows or is arranged within the garden, in particular garden areas of the garden. The term "maintenance of vegetation" is understood in particular to mean activities that promote growth of the vegetation and/or improve a health state of the vegetation.

The embodiment of the vegetation monitoring system and the vegetation monitoring device according to the invention can enable advantageously automated maintenance of a garden. An advantageously high level of garden health can be made possible, in particular by controlling the vegetation maintenance device depending on the vegetation index. It may be possible for a user to conveniently maintain the garden, in particular as activities to be carried out by the user may be limited to monitoring, and possibly also controlling, the vegetation monitoring system and/or the vegetation monitoring device. The embodiment according to the invention of the vegetation monitoring device allows an advantageously simple monitoring of a garden area or garden, in particular via an advantageously individual device. The vegetation index can be used to accurately monitor the vegetation health of the garden. Advantageously, the garden can be maintained in a way that is tailored to the specific situation. Advantageously, automated monitoring and/or maintenance of the garden can be achieved.

Furthermore, it is proposed that the vegetation monitoring system comprises at least one detection unit intended to capture the at least one garden parameter. Advantageously, the vegetation monitoring system can be operated autonomously. The additional garden parameter may be used to control the activity in a way that is advantageous for the vegetation health. Preferably, the detection unit is arranged in or at the garden area. Preferably, the detection unit is connected to the computing unit via the communication unit, in particular wirelessly. In particular, the detection unit is connected to the at least one vegetation maintenance device and/or the vegetation monitoring device via the at least one communication unit, in particular wirelessly. It is conceivable that the detection unit comprises a plurality of detection elements that are distributed in or at the at least one garden area. Alternatively or additionally, it is conceivable that the vegetation monitoring system comprises a plurality of differently configured detection units, each of which is intended to detect a different garden parameter from a plurality of different garden parameters. For example, the detection unit, in particular a detection element of the detection unit, is designed as a thermometer, as a barometer, as a rain sensor, as a motion sensor, as a camera, as a soil sensor, for example for detecting a moisture level, an acidity level, a temperature and/or a nutrient content of a soil in or at the garden area, as a position determination sensor, for example by means of lidar and/or GPS, or the like, in particular depending on an embodiment of the garden parameter to be detected. It is conceivable that the detection unit is stationary or, in particular, driven and movable. Preferably, the detection unit is intended to transmit the at least one detected garden parameter, in particular via the at least one communication unit of the vegetation monitoring system, to the at least one computing unit, preferably in response to a request by the at least one computing unit or at regular intervals.

In addition, it is proposed that the vegetation monitoring system comprises at least one, in particular the aforementioned, computing unit connected to at least one camera unit of the vegetation monitoring device, to the vegetation maintenance device and to the at least one detection unit, which is configured to generate control signals for controlling the at least one vegetation maintenance device as a function of the vegetation index and/or the garden parameter detected in the at least one garden area, in particular in order to carry out the activity of the at least one vegetation maintenance device in the at least one garden area. An advantageously high degree of automation of the vegetation monitoring system can be achieved. Preferably, the vegetation maintenance device is configured to be controlled via the at least one computing unit or to be controlled or adjusted based on the control signals. Preferably, the at least one computing unit is connected via the at least one communication unit of the vegetation monitoring system, in particular wirelessly, to the camera unit of the vegetation monitoring device, the at least one vegetation maintenance device and the detection unit, in particular for transmitting electronic data and/or control commands, in particular the control signals. It is conceivable that the at least one computing unit is arranged/configured on or as part of the vegetation monitoring device, the at least one vegetation maintenance device and/or the detection unit, in particular at least one detection element of the detection unit. Preferably, the at least one computing unit is configured to receive, in particular to request, captured image data from the at least one camera unit and/or captured values of the garden parameter from the detection unit, in particular via the at least one communication unit, in order to determine the vegetation index.

Furthermore, it is also proposed that the vegetation monitoring system comprises at least one computing unit, in particular the aforementioned computing unit, which is configured to determine at least one temporal progression of the vegetation index for the at least one garden area, wherein the at least one computing unit is configured to generate control signals for controlling the at least one vegetation maintenance device as a function of the temporal progression of the vegetation index, in particular in order to carry out the activity of the at least one vegetation maintenance device in the at least one garden area. It is possible to control the vegetation monitoring system, in particular the vegetation maintenance device, in a manner that is advantageous for the vegetation health. A development of vegetation health can be advantageously closely monitored using the vegetation index. In particular, snapshots of the vegetation index cannot be used to make precise statements about a development of vegetation health and thus also about results of an activity carried out. An objective evaluation of activities carried out and their effect on the vegetation of the garden can advantageously be made possible. Preferably, the at least one computing unit is configured to determine the temporal progression of the vegetation index for the at least one garden area from a plurality of vegetation index values determined for the at least one garden area. Preferably, at least one limit value and/or a limit range for the vegetation index is stored in the computing unit, wherein the at least one computing unit is configured to trigger the vegetation maintenance device to carry out the activity in the at least one garden area depending on whether the limit value/limit range is overshot and/or undershot. Alternatively or additionally, it is conceivable that at least one pattern for the temporal progression of the vegetation index is stored in the computing unit, wherein the at least one computing unit is configured to examine the determined temporal progression of the vegetation index on the stored pattern. In particular, the at least one computing unit is configured to control the vegetation maintenance device to carry out the activity in the at least one garden area and/or to set the at least one processing parameter of the vegetation maintenance device for carrying out the activity, depending on a recognition of the stored pattern in the determined temporal progression of the vegetation index.

It is further proposed that the vegetation monitoring system comprises at least one, in particular the aforementioned, computing unit, wherein the vegetation monitoring device has at least one camera unit which is intended to detect the at least one garden area in at least one range, in particular the first range and/or the second range, of the electromagnetic spectrum in order to determine the vegetation index, wherein the at least one computing unit is configured to recognize the vegetation maintenance device within the at least one garden area on the basis of image data of the at least one garden area provided by the at least one camera unit. It is advantageously possible to localize the vegetation maintenance device easily and precisely when carrying out the activity. A status of an activity to be carried out can advantageously be determined easily and automatically. Advantageously, malfunctions of the vegetation maintenance device can be easily detected, for example by a route of the vegetation maintenance device deviating from an intended route and/or by detection of an activity of the vegetation maintenance device deviating from an intended activity or the like. Preferably, the computing unit is configured to identify the vegetation maintenance device by means of pattern and/or shape recognition from the captured image data. Preferably, the at least one computing unit is configured to determine a position of the at least one vegetation maintenance device in the at least one garden area as a function of a position of the detected vegetation maintenance device within the image data. It is conceivable that the at least one computing unit is configured to control the vegetation maintenance device to carry out the activity as a function of a determined position of the at least one vegetation maintenance device.

It is also proposed that the at least one detection unit is arranged on at least one mobile unit of the vegetation monitoring system and/or on the at least one vegetation maintenance device. The garden parameter can be recorded dynamically, which is advantageous. The vegetation maintenance device can be controlled in an advantageously precise and situation-specific manner, in particular because, for example, the garden parameter can be detected specifically in an area to be processed. For example, the mobile unit of the vegetation monitoring system is designed as a movable, in particular pivotable and/or rotatable, camera, or the like, as a body-worn device, such as a smartwatch, a smartphone, or the like, which is designed as part of the vegetation monitoring system, or as a dedicated movable, in particular mobile or airborne, platform for the detection unit, in particular at least one detection element of the detection unit. Preferably, the mobile unit is connected to the at least one computing unit via the at least one communication unit. In particular, it is conceivable that the at least one computing unit is configured to generate control commands for controlling the mobile unit to detect the/one garden parameter, in particular at different positions within the at least one garden area, and preferably to transmit them to the mobile unit, in particular via the at least one communication unit.

It is further proposed that the vegetation monitoring system comprises at least one computing unit which is configured to recognize foreign objects in the at least one garden area on the basis of image data used to determine the vegetation index, the determined vegetation index and/or the at least one captured garden parameter, wherein the at least one computing unit is configured to generate control signals for controlling at least one mobile unit of the vegetation monitoring system and/or the at least one vegetation maintenance device as a function of a recognized foreign object, in particular in order to examine the foreign object and/or to clear the at least one garden area. Unintentional collisions of the vegetation maintenance device and/or the mobile unit with the foreign object can be advantageously prevented. This may advantageously prevent damage to the vegetation monitoring system. Advantageously, this enables low maintenance costs for the vegetation monitoring system. Advantageously, unwanted damage to the vegetation of the garden caused by the foreign object can be prevented, for example by permanent shading and/or weight loading. Preferably, the at least one computing unit is configured to detect foreign objects in the at least one garden area based on image data used to determine the vegetation index, the determined vegetation index, and/or the captured garden parameter, for example by means of pattern recognition based on the image data. The vegetation monitoring system can achieve an advantageously precise monitoring of the garden. Foreign objects may be, for example, branches, trunks, garden furniture, living or dead animals, other garden equipment, such as brooms, rakes, or the like. It is conceivable that the at least one computing unit, in particular as part of a machine learning system or the like, is trained to identify certain foreign objects or has the image data for identifying foreign objects analyzed with reference data via an external unit, for example a machine learning system such as an artificial neural network, a network, the Internet, a cloud or the like. The at least one computing unit is preferably configured to control the mobile unit and/or the at least one vegetation maintenance device as a function of a type of an identified foreign object. In particular, if an exact identification of the detected foreign object is not possible, the at least one computing unit is configured to move the mobile unit and/or the at least one vegetation maintenance device to a position of the foreign object in the at least one garden area in order to identify the foreign object. It is conceivable that the at least one computing unit is configured to output at least one output signal to warn and/or notify a user when a foreign object is detected in the at least one garden area and/or when a certain type of foreign object is identified. In addition, it is conceivable that the output signal for warning and/or notifying the user comprises, in particular, information about the foreign object, such as a position of the foreign object in the at least one garden area, a section of the image data comprising the foreign object and/or the type of foreign object.

Furthermore, it is proposed that the vegetation monitoring system comprises at least one, in particular the aforementioned, computing unit and at least one, in particular the aforementioned, communication unit, which is configured to transmit electronic data between the at least one computing unit and an external unit or an external network, in particular a smart home system, a cloud or the Internet, wherein the at least one computing unit is configured to switch to an independent operating mode when a connection via the at least one communication unit is interrupted. Advantageously, dependence of the vegetation monitoring system on external systems may be kept to a minimum. In particular, a certain operation or certain activities of the vegetation monitoring system can be ensured independently of communication with external units. It can be advantageous to maintain vegetation health. Preferably, in the independent operating mode, the at least one computing unit is configured to determine the vegetation index exclusively as a function of data and/or parameters, in particular image data and/or garden parameters, acquired via devices and/or devices of the vegetation monitoring system, in particular the vegetation monitoring device, the at least one camera unit, the at least one vegetation maintenance device and/or the at least one detection unit. Preferably, the at least one computing unit is configured in the independent operating mode to control the at least one vegetation maintenance device for carrying out the activity in the at least one garden area solely as a function of data and/or parameters, in particular image data and/or garden parameters, detected via units and/or devices of the vegetation monitoring system, in particular the vegetation monitoring device, the at least one camera unit, the at least one vegetation maintenance device and/or the at least one detection unit. Preferably, the vegetation monitoring system is autonomous in the independent operating mode, in particular with the exception of electrical power for the electrical supply of the vegetation monitoring system. Preferably, the at least one computing unit is configured to switch to the independent operating mode if an interruption of the connection of the at least one communication unit to the external unit is detected, for example via a pending input signal of the external unit or the like. It is conceivable that the computing unit is configured to store control signals for controlling the vegetation maintenance device if a connection with the vegetation maintenance device is interrupted, wherein the computing unit is configured in particular to output stored control signals as soon as the connection with the vegetation maintenance device is re-established. Preferably, the at least one computing unit is configured to determine the vegetation index and/or the temporal progression of the vegetation index even if a connection between the computing unit and the detection unit is interrupted, preferably as a function of a last transmitted value of the at least one garden parameter or independently of the garden parameter(s) that can be determined via the detection unit. It is conceivable that the at least one computing unit is configured to determine the vegetation index and/or the temporal progression of the vegetation index exclusively as a function of the image data of the at least one garden area captured via the vegetation monitoring device, in particular the at least one camera unit, in particular if a connection between the computing unit and the detection unit and/or the external unit is interrupted. This may in particular also ensure a certain degree of monitoring and/or maintenance of the garden, in particular in the event of a fault and/or a failure of the detection unit, or the like.

In addition, it is proposed that the vegetation monitoring system comprises at least one further vegetation monitoring device, wherein the vegetation monitoring devices, in particular camera units of the vegetation monitoring devices, each have different detection ranges, wherein the vegetation monitoring devices are configured to determine a position of the vegetation monitoring devices relative to one another and/or an orientation of the detection ranges, in particular as a function of at least one reference body detected within the detection ranges. It is advantageously easy to associate garden areas with the individual vegetation monitoring systems. Advantageously, this enables efficient monitoring and maintenance of larger gardens and/or garden areas. Advantageously, unintended multiple execution of activities in a single garden area monitored by a plurality of vegetation monitoring systems can be prevented. Preferably, the reference body is intended to be arranged for determining the position of the vegetation monitoring devices and/or the orientation of the detection ranges in a sub-area of the garden which is part of the two detection ranges of the at least two vegetation monitoring devices. Preferably, the computing units of the vegetation monitoring devices are configured to detect the reference body in captured image data and to determine its position within the respective detection range. In particular, it is conceivable that the reference body comprises an optical marking, a reference surface, a particular shape, or the like, which can be detected in captured image data via the computing unit. Alternatively or additionally, it is conceivable that, in particular if the two vegetation monitoring devices are each arranged in the detection range of the respective other vegetation monitoring device, the two vegetation monitoring devices detect and recognize each other, in particular via their camera units, wherein in particular the computing units are each configured to determine the position of the vegetation monitoring devices relative to each other and/or the orientation of the detection ranges in the garden via captured image data. Alternatively or additionally, it is conceivable that the vegetation monitoring devices are each provided to determine a position of the respective vegetation monitoring device in or at the garden and/or an orientation of the detection ranges of the respective vegetation monitoring device via a reference body. In particular, the at least one computing unit is configured to determine the position of the vegetation monitoring devices relative to one another as a function of the determined positions of the vegetation monitoring devices in or on the garden and/or the determined orientations of the detection ranges of the vegetation monitoring devices. It is conceivable that the at least one computing unit is configured to generate at least one virtual map of the at least one garden area, in particular using captured image data, and/or to determine the position of the vegetation monitoring devices relative to one another as a function of a predefined virtual map of the at least one garden area specified by a user and/or an external unit.

It is conceivable that the detection unit preferably has at least one air quality sensor, in particular a pollen sensor or a fine dust sensor. Advantageously comprehensive monitoring of the garden can be achieved, in particular by air quality monitoring. It is advantageously simple to determine the exposure of plants to air pollution. This means that measures to maintain the vegetation's health can be adapted precisely and specifically to the environment. It is advantageously easy to inform and/or warn a user of unpleasant and/or unhealthy air conditions in the garden. Preferably, the air quality sensor is arranged within the garden area. It is conceivable that the computing unit is configured to output at least one output signal to warn a user depending on the air quality detected by the detection unit, in particular a pollen load in the air and/or a fine dust concentration in the air in the garden area.

It is further proposed that the vegetation monitoring system comprises at least one computing unit which is configured to recognize foreign objects, in particular objects, persons and/or animals, in the at least one garden area on the basis of captured image data, wherein the at least one computing unit is configured to take into account at least one area of the image data which comprises a recognized foreign object when determining the vegetation index on the basis of the image data. An advantageously accurate and error-free determination of the vegetation index can be made possible, in particular independently of foreign objects temporarily arranged in the garden area, which obscure a vegetated surface of the at least one garden area to be detected. Preferably, the at least one computing unit is configured to evaluate captured image data for the detection of foreign objects by means of a pattern recognition algorithm and/or by means of image evaluation. Preferably, the at least one computing unit is configured to identify the at least one area of the image data, which is formed in particular from a plurality of pixels and/or other image areas, which comprises, in particular depicts, a recognized foreign object, when the foreign object is recognized. Preferably, the at least one computing unit is configured to discard and/or ignore the at least one area of the image data comprising a detected foreign object when determining the vegetation index of the at least one garden area. Alternatively, it is conceivable that the at least one computing unit is configured to compensate for the at least one area of the image data, which comprises a detected foreign object, when determining the vegetation index of the at least one garden area, wherein, in particular for the at least one area, at least one value of the vegetation index is determined or which corresponds, for example, to a value, preferably an average value, of an area of the image data adjacent to the at least one area and/or corresponds to another value to be expected in the at least one area, which value is determined, for example, by extrapolation of previously determined values of the vegetation index in the at least one garden area, in particular the at least one area of the image data, and/or corresponds to previously determined values of the vegetation index in the at least one area of the image data. In particular, the at least one area of the image data represents at least a sub-area of the at least one garden area. It is conceivable that the at least one computing unit is configured to postpone and/or cancel the determination of the vegetation index if the at least one area of the image data exceeds a stored limit value and/or a certain proportion of the image data representing the at least one garden area.

Furthermore, it is proposed that the at least one vegetation maintenance device is configured as a robotic lawn mower, wherein the at least one computing unit is configured to generate control signals for controlling the at least one vegetation maintenance device for a mowing operation in the at least one garden area as a function of the vegetation index and/or the garden parameter detected in the at least one garden area. The lawn of the garden can be advantageously well maintained. Preferably, the at least one computing unit is configured to control a driven movement of the at least one vegetation maintenance device within the at least one garden area. Preferably, the at least one computing unit is configured to control and/or regulate at least one maintenance and/or processing operation of the at least one vegetation maintenance device for carrying out the activity, in particular via at least one processing parameter. Preferably, the at least one computing unit is configured to control the at least one vegetation maintenance device for changing a value of the processing parameter, preferably as a function of a position, in particular a detected position, of the at least one vegetation maintenance device within the at least one garden area. For example, the processing parameter is configured as a cutting height, as a forward speed, as a degree of opening of an irrigation opening and/or fertilization opening, as a rotational speed, for example of a cutting knife, or the like.

In addition, it is proposed that the vegetation monitoring system comprises at least one computing unit, in particular the aforementioned computing unit, which is configured to detect water accumulations in the at least one garden area on the basis of image data captured by the vegetation monitoring device and/or on the basis of determined values of the vegetation index of the at least one garden area, wherein the at least one computing unit is configured to generate control signals as a function of a detected water accumulation in the at least one garden area, in order to control at least one mobile unit of the vegetation monitoring system and/or the at least one vegetation maintenance device, in particular to prevent and/or remove the water accumulation. The garden can be maintained in an advantageous and comprehensive manner, in particular as additional water accumulations can be taken into account, for example in the event of flooding or heavy rainfall. Unwanted death of plants in the garden due to too much water can be advantageously prevented. A user of the vegetation monitoring system may be advantageously warned easily and quickly, for example, of heavy rainfall and/or flooding. This advantageously allows the user to respond quickly. In addition, countermeasures can be advantageously enabled quickly. Advantageously, unintentional damage to the vegetation maintenance device and/or the mobile unit can be prevented. Preferably, the at least one computing unit is configured to detect water accumulations in the at least one garden area by means of a pattern recognition as a function of the image data captured by the vegetation monitoring device and/or other determined values of the vegetation index of the at least one garden area. In particular, water has negative values of the vegetation index formed as NDVI, especially values between 0 and −1. It is conceivable that the at least one computing unit is set up to recognize water accumulations in the at least one garden area via detected areas within the at least one garden area in which the vegetation index has values that deviate significantly from the surrounding areas of the at least one garden area, in particular are significantly lower, preferably less than 0, compared to the surrounding areas of the at least one garden area. Preferably, the at least one computing unit is configured to output at least one output signal to warn and/or notify a user when a water accumulation is detected, preferably if the detected water accumulation exceeds a certain size and/or if the detected water accumulation cannot be passed or removed by the mobile unit and/or the at least one vegetation maintenance device.

Furthermore, it is proposed that the vegetation monitoring system comprises at least one, in particular the aforementioned, computing unit, which is configured to request a user input relating to a user activity in the at least one garden area as a function of a determined vegetation index, of a temporal progression of the vegetation index, of a detected garden parameter and/or of at least one input signal of the at least one vegetation maintenance device. User interaction can be achieved in an advantageously fast and straightforward manner. The garden may be maintained independently of regular active checking of the vegetation monitoring system by the user, in particular as the user input may be requested via regular mobile devices, for example a user's smartphone. In particular, the user input is provided to capture a user activity carried out by the user in the at least one garden area and to take it into account in particular when monitoring and maintaining the garden. Preferably, the at least one computing unit is configured to request the user input via at least one generated and output signal, which is provided in particular for transmission to a device associated with the user. For example, it is conceivable that the at least one computing unit is configured to request at least one user input as to whether the least one garden area has been mowed or otherwise processed by the user if the vegetation index detected in the at least one garden area drops significantly within a short period of time. For example, the user activity is configured as fertilization, cutting or mowing, watering or the like, each of which may affect the detected vegetation index. Preferably, the at least one computing unit is configured to detect at least one pattern, an overshoot or undershoot of a stored limit value/limit range, or the like, in determined values of the vegetation index, in the determined temporal progression of the vegetation index, in captured and/or determined values of the garden parameter and/or in an input signal of the at least one vegetation maintenance device. In particular, the at least one computing unit is configured to request the user input when the pattern is detected or the limit value/limit range is overshot or undershot, in particular to output the output signal for requesting the user input. Preferably, the at least one computing unit is configured to temporally correlate the detected pattern or the overshooting or undershooting of the limit value/limit range, in particular prior to requesting the user input, with a temporal progression of a captured garden parameter, in particular a rain condition, and/or an input signal of the at least one vegetation maintenance device. For example, it is conceivable that a request for user input by the at least one computing unit may be omitted if the detected pattern or the overshooting or undershooting of the limit value/limit range can be/is linked in time with at least one other parameter, in particular the garden parameter or the input signal. For example, the input signal of the at least one vegetation maintenance device comprises a detection of an obstacle in the at least one garden area, an unexpectedly low load of a cutting or mowing unit, in particular if plants or a lawn in the at least one garden area have already been cut/mowed by the user, or the like.

Furthermore, it is proposed that the at least one computing unit is configured to detect persons and/or animals in the vicinity or within the at least one garden area, preferably based on image data captured by the vegetation monitoring device and/or determined values of the vegetation index of the at least one garden area, wherein the at least one computing unit is configured to take into account at least one position and/or at least one movement path of a detected person and/or an detected animal in the at least one garden area for controlling the activity of the at least one vegetation maintenance device. The garden can be advantageously maintained, in particular as people and/or animals walking on and/or using the garden can be taken into account during maintenance. This enables an advantageously high and uniform vegetation health. In particular, garden areas frequently used by persons and/or animals can be specifically taken into account when maintaining the garden and/or carrying out activities within the garden, for example fertilizing, mowing and/or protecting. Preferably, the computing unit is configured to detect persons and/or animals in the vicinity or within the at least one garden area based on captured image data. In particular, the at least one computing unit is configured to check image data captured via the vegetation monitoring device and transmitted to the computing unit, in particular automatically when the image data is transmitted, for persons and/or animals in the vicinity of or within the at least one garden area. Alternatively or additionally, it is conceivable that the vegetation monitoring system, in particular the at least one detection unit, comprises at least one further camera and/or at least one motion sensor, which is/are intended to detect persons and/or animals in the vicinity of or within the at least one garden area and to transmit their position and/or movement path to the at least one computing unit. Preferably, the at least one computing unit is configured to take into account the position and/or movement path of the detected person and/or detected animal in the at least one garden area for controlling the activity of the at least one vegetation maintenance device. It is conceivable that the at least one computing unit is configured to control the at least one vegetation maintenance device, such that areas of the at least one garden area in which a person and/or animal is/was captured are avoided or separately controlled by the at least one vegetation maintenance device to carry out the activity. For example, it is conceivable that areas of the at least one garden area in which a person and/or an animal is detected are excluded from an intended path of the at least one vegetation maintenance device for carrying out the activity in the at least one garden area in order to avoid a collision with the at least one vegetation maintenance device. Alternatively or additionally, it is conceivable that areas of the at least one garden area in which people and/or animals are frequently captured, for example walkways within the at least one garden area, are more frequently or less frequently controlled by the at least one vegetation maintenance device during the activity, in particular in order to counteract a burden on plants in these areas caused by the persons/animals. For example, it is conceivable that such walkways are mowed less frequently by a vegetation maintenance device configured as a robotic lawn mower compared to other areas of the at least one garden area in order to promote the regrowth of the lawn or meadow in these areas. For example, it is conceivable that walkways are controlled more frequently by a vegetation maintenance device designed as an irrigation or fertilization device compared to other areas of the at least one garden area in order to promote the regrowth of lawn or meadow in these areas.

In addition, a method for monitoring vegetation health in a garden using a vegetation monitoring system according to the invention is proposed. In particular, the method is provided for maintaining vegetation of the garden, preferably by means of controlling the at least one vegetation maintenance device.

The embodiment of the method according to the invention enables advantageous automated maintenance of a garden. It is possible to achieve an advantageously high level of garden health. It can be advantageously convenient for a user to maintain the garden, in particular because activities to be carried out by the user can be limited to monitoring the vegetation monitoring system.

Furthermore, a method for an intelligent extension of a vegetation monitoring system for monitoring a vegetation health and/or for maintaining a vegetation in a garden, in particular a vegetation monitoring system according to the invention, is proposed, which comprises at least the following method steps:

providing image data from at least one garden area of the garden, and/or determining at least one vegetation index of the at least one garden area based on, in particular, the aforementioned image data depending on the determined vegetation index and/or the image data provided: proposing at least one device to be integrated into the vegetation monitoring system.

Preferably, the image data of the at least one garden area is provided by a/the vegetation monitoring device, in particular the at least one camera unit of the vegetation monitoring device, of the vegetation monitoring system. Preferably, the vegetation index is determined using at least one/the computing unit of the vegetation monitoring device. Alternatively, it is conceivable that the vegetation index is determined by means of an external unit, for example a network, a server, or the like. In particular, the image data is transmitted to the external unit by means of at least one/the communication unit of the vegetation monitoring system in order to determine the vegetation index. Preferably, in particular by means of the at least one computing unit and/or via an external unit, for example a network, a server or the like, at least one size of the at least one garden area is determined or estimated as a function of the determined vegetation index and/or the image data. It is conceivable that at least one vegetation type within the at least one garden area and/or a frequency of particular vegetation types in the at least one garden area is determined by means of the at least one computing unit and/or via the external unit as a function of the determined vegetation index and/or the image data. Preferably, in particular by means of the at least one computing unit and/or the external unit, at least one garden health parameter of the at least one garden area is determined as a function of the image data and the determined vegetation index, which in particular describes a health state of the at least one garden area and/or is intended to enable a classification of a health state of the at least one garden area. Particularly preferably, at least one device to be integrated into the vegetation monitoring system is selected from a list of a plurality of possible devices to be integrated into the vegetation monitoring system for suggesting a device to be integrated into the vegetation monitoring system, in particular by means of the at least one computing unit and/or the external unit, depending on the determined vegetation index, the size of the at least one garden area, the determined type of vegetation type within the at least one garden area, the determined frequency of certain vegetation types in the at least one garden area and/or on the determined garden health parameter. For example, the device to be integrated into the vegetation monitoring system and/or the devices that can be integrated into the vegetation monitoring system are each configured as a detection unit to capture a garden parameter, as a vegetation maintenance device, as a further vegetation monitoring device, in particular a further camera unit, or the like. For example, when determining a large lawn area within the at least one garden area from the image data and/or the vegetation index, one or a plurality of vegetation maintenance device(s) designed as robotic lawn mower are proposed as device(s) to be integrated into the vegetation monitoring system. For example, if a large garden area is determined, a further vegetation monitoring device, in particular a further camera unit, is proposed for improved monitoring of the at least one garden area. For example, in the case of a low determined value of a garden health parameter and/or in the case of a low determined value of the vegetation index, at least one vegetation maintenance device configured as a fertilization device and/or at least one vegetation maintenance device configured as an irrigation device is proposed as device(s) to be integrated into the vegetation monitoring system. Preferably, the device to be integrated into the vegetation monitoring system is selected from a list of a plurality of possible devices that can be integrated into the vegetation monitoring system stored in the vegetation monitoring system. Alternatively or additionally, it is conceivable that the list of a plurality of possible devices that can be integrated into the vegetation monitoring system is retrieved from an external unit for a proposal of a device to be integrated into the vegetation monitoring system. Preferably, the device to be integrated into the vegetation monitoring system is proposed to a user by means of an output unit of the vegetation monitoring system and/or via a communication unit of the vegetation monitoring system on a device associated with the user. It is particularly conceivable that the method is carried out again after integration of a device, in particular a proposed device, into the vegetation monitoring system, wherein in particular further devices can be proposed for integration into the vegetation monitoring system, in particular for improved and more comprehensive monitoring and maintenance of the garden. It is conceivable that the device to be integrated into the vegetation monitoring system is proposed when an operating mode of the vegetation monitoring system, in particular the vegetation monitoring device, is activated. In particular, the operating mode for proposing devices to be integrated into the vegetation monitoring system is activated by means of a user input, a control signal from an external unit, in particular one associated with the user, and/or coupled to an undershoot or overshoot of a predefined limit value/limit range of the vegetation index and/or the garden health parameter. It is conceivable that the method for intelligently expanding a vegetation monitoring system determines a device to be integrated solely on the basis of the image data provided or of a determined vegetation index. Preferably, it is conceivable that the method for intelligently expanding a vegetation monitoring system is carried out at least in part, in particular entirely, via an application on a mobile device/external unit, such as a smartphone or the like. In particular, the image data is captured via a detection unit, in particular a camera, and evaluated via the application. In particular, the vegetation index is determined based on the image data using the application The embodiment of the method according to the invention makes it possible to achieve an advantageously fast and environment-specific composition of a vegetation monitoring system required for the maintenance of the garden. Advantageously, a high level of user convenience can be achieved when creating a vegetation monitoring system for a garden, in particular as the user only needs one vegetation monitoring device and all other required devices can be automatically proposed.

Furthermore, it is proposed that the at least one camera unit is configured to generate at least one output signal to be transmitted to at least one computing unit, which in particular comprises captured image data, wherein the at least one camera unit has at least one first camera for detecting the at least one garden area in the first range of the electromagnetic spectrum and at least one second camera for detecting the at least one garden area in the second range of the electromagnetic spectrum, wherein the at least one camera unit is set up to adapt an exposure time of the second camera at least substantially to an exposure time of the first camera in order to generate the at least one output signal. Advantageously, the vegetation index may be precisely determined. An advantageous automated synchronization of the cameras of the camera unit can be achieved. In particular, the at least one output signal is provided for determining the vegetation index based on the image data. Preferably, the at least one camera unit is configured to capture the at least one garden area from an at least substantially identical position, in particular distance and viewing angle, in the first range and the second range of the electromagnetic spectrum. Preferably, the at least one camera unit is provided to capture the at least one garden area with a temporal distance of at most 10 s, preferably at most 5 s, and particularly preferably at most 2 s, in the first range and the second range of the electromagnetic spectrum. Preferably, the first camera and the second camera are coupled to each other, wherein with the second camera is provided to take over an exposure time of the first camera. In particular, the second camera is provided to capture the at least one garden area after the first camera. Alternatively, it is conceivable that the first camera and the second camera are provided to capture the at least one garden area at least substantially simultaneously, in particular, wherein an exposure time of the second camera is ended directly at an end of the exposure time of the first camera or an exposure time for the first and second camera is predefined. It is conceivable that the at least one computing unit and/or the at least one camera unit are/is configured to adjust an exposure time of the cameras, in particular the first camera and/or the second camera, to capture the at least one garden area as a function of lighting conditions in the garden or in the at least one garden area, in particular a brightness and/or an illumination of the at least one garden area, in particular during or before capturing the at least one garden area via the at least one camera unit. Alternatively, it is conceivable that the at least one camera unit has only one camera for capturing the at least one garden area in the first range and the second range of the electromagnetic spectrum, wherein the at least one camera unit is configured to capture the at least one garden area in the first range and the second range of the electromagnetic spectrum with a time delay or at least substantially simultaneously. It is conceivable that the at least one camera unit is configured to capture the at least one garden area in more than two different areas of the electromagnetic spectrum, preferably to determine the vegetation index of the at least one garden area.

In addition, it is proposed that the at least one camera unit comprises at least one camera, in particular an RGB-IR camera, which is configured to capture the at least one garden area at least substantially simultaneously in the first range of the electromagnetic spectrum and in the second range of the electromagnetic spectrum. An advantageously compact embodiment of the camera unit can be achieved. A synchronization of a plurality of different cameras can be advantageously dispensed with. Preferably, the at least one camera comprises a plurality of detection elements, for example photodiodes or sensor pixels, for detecting radiation in the first range of the electromagnetic spectrum and a plurality of further detection elements, for example photodiodes or sensor pixels, for detecting radiation in the second range of the electromagnetic spectrum. Preferably, the detection elements and the further detection elements are each arranged at least substantially uniformly distributed on a sensor surface of the at least one camera. Preferably, the detection elements and the further detection elements are arranged offset from each other, in particular adjacent to or spaced apart from each other, on the sensor surface of the at least one camera, in particular each in a matrix-shaped arrangement. Preferably, the detection elements and the further detection elements are each configured in an arrangement on the sensor surface of the at least one camera, which are in particular nested within the sensor surface.

Furthermore, it is proposed that the at least one camera unit comprises at least one first camera for capturing the at least one garden area in the first range of the electromagnetic spectrum and at least one second camera for capturing the at least one garden area in the second range of the electromagnetic spectrum, wherein a minimum distance between the first camera and the second camera is at most 10 cm, preferably at most 5 cm, particularly preferably at most 3 cm, and more particularly preferably at most 1 cm. An advantageously precise and position-resolved determination of the vegetation index can be achieved. In particular, the minimum distance between the first camera and the second camera is aligned at least substantially perpendicular to a main viewing direction of the at least one camera unit and/or to main extension planes of the sensor surfaces of the first camera and/or the second camera. Preferably, the first camera and the second camera are arranged at least substantially parallel to each other for capturing the at least one garden area. In particular, the sensor surfaces of the first camera and the second camera have a common main extension plane for capturing the at least one garden area. Preferably, the first camera and the second camera each have an at least substantially identical distance to the at least one garden area to be captured.

Furthermore, it is proposed that the at least one camera unit is housed in a camera housing of the vegetation monitoring device. An advantageously compact vegetation monitoring device can be achieved. An advantageously low number of components of the vegetation monitoring device can be achieved, in particular for connecting cameras of the camera unit. Advantageously, low production costs can thereby be made possible. Advantageously high protection of the camera unit can be achieved. In particular, the camera(s) of the at least one camera unit is/are accommodated in the camera housing, in particular arranged at least for the most part within the camera housing. Preferably, the camera housing comprises at least one window element, which is provided in particular to enable the at least one camera unit arranged within the camera housing, in particular the camera(s), to capture the at least one garden area. Preferably, the at least one window element is at least substantially translucent, in particular for light from the first range and the second range of the electromagnetic spectrum. Preferably, the camera housing encloses the at least one camera unit, in particular the camera(s) of the camera unit, at least for the most part, in particular at least substantially completely. Preferably, the camera housing is water-tight under normal conditions. In particular, the camera housing can only be opened by a user with a tool. It is conceivable that the camera housing is designed such that fastening means of the vegetation monitoring device, for example screws or the like, for opening the camera housing in a mounted state are at least largely, in particular at least substantially completely, concealed from a user.

It is also proposed that the vegetation monitoring device comprises at least one environmental protection unit, which is provided to protect the at least one camera unit from environmental effects, in particular from wildlife damage and/or weather conditions. Advantageously high protection of the camera unit can be achieved. An advantageously robust vegetation monitoring device can be achieved. A vegetation monitoring device that is advantageously flexible in terms of installation can be enabled. Unintentional damage and/or a reduction of the service life of the vegetation monitoring device due to an unfavorable and/or incorrect installation of the vegetation monitoring device by a user can be advantageously prevented. It is possible to achieve an advantageously high level of operating convenience for a user, in particular as the user has fewer specifications to consider when installing the vegetation monitoring device properly. It is conceivable that the at least one environmental protection unit is at least partially integrally formed with the camera housing. Preferably, the at least one environmental protection unit comprises at least one shading element, which is provided to protect the at least one window element of the camera housing and/or the at least one camera unit, in particular at least one lens of a camera of the at least one camera unit, from direct sunlight at a certain angle range, in particular to cover it from direct sunlight. In particular, the at least one shading element is formed integrally with the camera housing. For example, the at least one shading element is configured as an extension, a screen or the like. Preferably, the at least one shading element is arranged on a upper side of the camera housing, in particular an outer wall of the camera housing. It is conceivable that the at least one shading element is intended to protect the at least one window element of the camera housing and/or the at least one camera unit, in particular the lens of the camera, from direct sunlight regardless of the position of the sun, in particular to cover it from direct sunlight, for example by a corresponding embodiment of the at least one shading element and/or by a movable mounting of the at least one shading element relative to the at least one window element of the camera housing and/or the at least one camera unit, in particular the lens of the camera. Preferably, the at least one shading element is provided to protect the at least one window element and/or the lens from rain. Alternatively, it is conceivable that the at least one environmental protection unit comprises at least one rain protection element. In particular, the at least one shading element or the at least one rain protection element is provided to cover the at least one window element and/or the at least one lens of the at least one camera unit, in particular in a mounted state of the vegetation monitoring device, from above over an angle range about a perpendicular of at least 10°, preferably at least 20°, and preferably at least 30°. Alternatively or additionally, it is conceivable that the at least one environmental protection unit comprises at least one reflection and/or glare protection unit, which is provided to counteract reflection effects and/or glare effects at the at least one camera unit that interfere with capturing the at least one garden area. For example, the at least one reflection and/or glare protection unit comprises at least one coating, which is arranged on at least one surface, in particular the external surface, of the at least one window element and/or at least one lens of a camera of the at least one camera unit and is in provided in particular to prevent reflection effects and/or glare effects on the surface. Alternatively or additionally, it is conceivable that the at least one reflection and/or glare protection unit comprises at least one algorithm configured to detect reflection effects and/or glare effects within the captured image data and, in particular by using correction factors for individual affected pixels of the image data, to remove them from the image data. Alternatively, it is conceivable that the algorithm of the at least one reflection and/or glare protection unit is configured to take into account detected reflection effects and/or glare effects when determining the vegetation index. It is conceivable that the at least one environmental protection unit comprises at least one substantially water-repellent and/or directionally water-dissipating coating and/or surface, which is in particular arranged on a upper side of the vegetation monitoring device, in particular of the camera housing.

It is also proposed that the vegetation monitoring device comprises at least one mounting part for mounting the vegetation monitoring device on a vertical surface, in particular a wall, and at least one connection part, wherein the camera housing is connected to the at least one mounting part via the at least one connection part, wherein the at least one connection part is provided to adjust a position of the camera housing relative to the at least one mounting part. An advantageously flexible mounting of the vegetation monitoring device can be achieved. The vegetation monitoring device may be used for an advantageously high number of differently formed surfaces in gardens, on objects, and/or on buildings. This makes it possible to provide users with an advantageously high level of operating convenience. Preferably, the at least one mounting part is provided to be fastened to the vertical surface via fastening means, for example screws, anchors, hooks, nails, or the like. Preferably, the at least one mounting part comprises an electrical interface to an electrical supply of the vegetation monitoring device. Preferably, the electrical interface is configured to connect to a power grid and/or to connect to a replaceable and/or rechargeable energy store. In particular, the vegetation monitoring device is configured to be mains-connected and/or operated with a battery or rechargeable battery with regard to an electrical power supply. Preferably, the at least one connection part is movably or rigidly connected to the at least one mounting part. It is conceivable that the at least one connection part is mounted on the mounting part so that it can rotate or pivot about an axis or point. Alternatively, it is conceivable that the at least one connection part is provided to be connected to the at least one mounting part in a positive and/or non-positive manner, in particular in at least one position or one of a plurality of possible positions. Alternatively, it is conceivable that the at least one connection part is integrally formed with the at least one mounting part. Preferably, the camera housing is provided to be movably or rigidly connected to the at least one connection part, in particular for fastening to the at least one mounting part and/or the vertical surface. It is conceivable that the camera housing is mounted on the at least one connection part so that it can rotate or pivot about an axis or point and/or is mounted on the at least one mounting part so that it can rotate or pivot about an axis or point via the at least one connection part. Alternatively, it is conceivable that the camera housing is intended to be positively and/or non-positively connected to the at least one connection part, in particular in at least one position or one of a plurality of possible positions. Alternatively, it is conceivable that the camera housing is integrally formed with the at least one connection part and/or the at least one mounting part. Particularly preferably, at least one camera housing, in particular via the at least one connection part and/or the at least one mounting part, is configured to be rotatable or pivotable relative to the vertical surface about at least one transverse axis aligned at least substantially parallel to a horizontal. Preferably, at least one camera housing, in particular via the at least one connection part and/or the at least one mounting part, is configured to be rotatable or pivotable relative to the vertical surface about at least one vertical axis aligned at least substantially perpendicular to a horizontal. In particular, it is conceivable that the at least one mounting part is provided to be arranged, in particular fastened, to the vertical surface at different inclination angles relative to the vertical surface, for example via an adjustable arrangement of fastening points, or the like. As a result, the orientation of the at least one camera unit when mounting the vegetation monitoring device on the vertical surface can be adapted easily and individually to the embodiment of the garden to be monitored or the at least one garden area.

Furthermore, it is proposed that the vegetation monitoring device comprises at least one actuation unit for a motor-driven adjustment of a position and/or an orientation of the camera housing relative to the at least one mounting part and/or the vertical surface via the at least one connection part. An advantageously large garden area can be monitored. An advantageously low number of vegetation monitoring devices may be achieved for complete monitoring of a garden. This makes it possible to achieve advantageously low capture costs for a user. Preferably, the at least one actuation unit is arranged at least for the most part, in particular at least substantially completely, at or preferably within the at least one mounting part, the at least one connection part and/or the camera housing. Preferably, the at least one actuation unit comprises a motor, in particular an electric motor, for a driven movement of the camera housing relative to the at least one mounting part. Alternatively, it is conceivable that the at least one actuation unit is provided to move the camera housing and the at least one connection part relative to the vertical surface. Alternatively, an embodiment of the vegetation monitoring device is conceivable, wherein a position and/or an orientation of the camera housing relative to the vertical surface must be carried out by a user and/or the camera housing is not provided for driven movement.

Furthermore, a vegetation monitoring system is proposed having at least one, in particular the aforementioned vegetation monitoring device according to the invention, and having at least one, in particular the aforementioned, computing unit, which is configured to determine values of the vegetation index for the at least one garden area as a function of image data captured by the at least one camera unit, wherein the at least one computing unit is configured to generate at least one temporal progression of the vegetation index in the at least one garden area.

The embodiment of the vegetation monitoring system according to the invention allows an advantageously automated and/or autonomous monitoring of a garden to be achieved, in particular independently of external units.

Furthermore, it is proposed that the at least one computing unit is integrated into a housing, in particular a camera housing, of the vegetation monitoring device. An advantageously compact vegetation monitoring system can be achieved. Preferably, the at least one computing unit is arranged at least partially, in particular at least for the most part, preferably at least substantially completely, within the vegetation monitoring device, in particular a housing of the vegetation monitoring device, preferably the camera housing. Preferably, the at least one computing unit is at least substantially completely enclosed by the housing, in particular the camera housing. Preferably, the at least one computing unit is electrically and/or electronically connected directly to the at least one camera unit, in particular at least partially integrally formed with the at least one camera unit. In particular, cameras of the at least one camera unit and/or their supply electronics and/or control electronics of the at least one camera unit are arranged with the at least one computing unit on or on a common circuit board. Alternatively, it is conceivable that the at least one computing unit is arranged at least partially spaced apart from the vegetation monitoring device, for example, as part of another device and/or another device of the vegetation monitoring system.

Furthermore, it is proposed that the at least one computing unit comprises an algorithm to identify at least one specific vegetation type, in particular grass, in the at least one captured outdoor area based on image data captured by the at least one camera unit, wherein the at least one computing unit, in particular the algorithm, is configured to divide the at least one garden area into a plurality of garden areas of the garden to determine the vegetation index as a function of the specific vegetation type. Advantageously precise monitoring of vegetation health can be made possible, in particular as captured data can be interpreted as a function of vegetation types in individual garden areas. In addition, advantageously good maintenance of the individual garden areas can be made possible, in particular as maintenance activities can be tailored to the vegetation types identified in the individual garden areas. In particular, the at least one computing unit is configured to carry out the algorithm to identify at least one specific vegetation type in the at least one captured garden area. Preferably, the algorithm for identifying at least one specific vegetation type in the at least one captured garden area is stored in the at least one computing unit, in particular a memory of the computing unit. In particular, the at least one computing unit, in particular the algorithm, is configured to determine the plurality of garden areas for division from the at least one captured garden area. It is conceivable that the at least one computing unit, in particular the algorithm, is configured to divide the at least one captured garden area into a plurality of garden areas, in particular of at least substantially the same size in relation to a surface to be maintained, in order to determine the vegetation index. Preferably, the at least one computing unit, in particular the algorithm, is configured to determine and/or estimate a size of the garden area(s) from the captured image data, in particular as a function of a mounting height and/or an inclination angle of the at least one camera unit. Preferably, the at least one computing unit, in particular the algorithm, is configured to associate a different weighting with a proportion of the at least one specific vegetation type, in particular as a function of a size of the proportion and/or a size of the garden area to be determined for a division of the garden area(s), depending on which the division of the garden area(s) takes place. For example, it is conceivable that a garden area is selected to be larger when dividing the at least one captured garden area by means of the at least one computing unit, in particular the algorithm, if the latter has a proportion of a specific vegetation type, for example grass, which exceeds a predefined threshold value for the specific vegetation type over the size/area to be selected for the garden area to be determined. Alternatively, it is conceivable that the at least one computing unit, in particular the algorithm, is configured to divide the garden area(s) exclusively or independently of a size of the garden areas to be determined as a function of proportions of specific vegetation types within the garden areas. Alternatively or additionally, it is conceivable that the at least one computing unit, in particular the algorithm, is configured to divide the at least one captured garden area into different garden areas as a function of the captured values of the vegetation index within the at least one captured garden area. Preferably, the at least one computing unit, in particular the algorithm, is configured to divide the at least one captured garden area into contiguous garden areas, which in particular each comprise exactly one closed area. It is conceivable that the at least one computing unit, in particular the algorithm, is configured to divide the at least one captured garden area into garden areas each with an at least substantially identical basic shape, for example a rectangular, square, n-cornered, round, basic shape, or the like. For example, the at least one computing unit, in particular the algorithm, is configured to divide contiguous areas within the at least one captured garden area with a proportion of lawn above a predefined limit value, for example 60%, preferably 70%, and particularly preferably 80%, and/or with a value of the vegetation index averaged over the individual areas above a predefined limit value into at least one garden area in each case. Preferably, the at least one computing unit is configured to control at least one vegetation maintenance device of the vegetation monitoring system as a function of a division of the at least one captured garden area into garden areas, for example in order to carry out one/the activity in individual garden areas. For example, it is conceivable that individual determined and/or divided garden areas are selected as a function of a/the specific vegetation type, in particular a proportion of a/the specific vegetation type in the respective garden area, and/or values of the vegetation index determined within the respective garden area for carrying out the/an activity by means of the vegetation maintenance device. For example, it is conceivable that the at least one captured and/or determined garden area with low captured values of the vegetation index relative to other garden areas is more frequently fertilized, more frequently watered, and/or less frequently mowed/cut than the other garden areas.

In addition, it is proposed that the at least one computing unit has an algorithm, in particular the aforementioned algorithm, for identifying garden areas having grass on the basis of image data captured by the at least one camera unit, wherein the at least one computing unit, in particular the algorithm, is set up to discard garden areas which do not have grass and/or which have a certain proportion of at least one other specific vegetation type, in particular different from grass, in order to determine the vegetation index. Advantageously efficient monitoring of lawn areas of the garden can be made possible. An advantageously precise assessment of the vegetation health of a lawn in the garden can be made possible, in particular as a proportion of other vegetation types that are to be captured and assessed can be kept advantageously low by dividing the garden areas. In particular, the at least one computing unit, in particular the algorithm, is configured to discard garden areas having a proportion of lawn that is less than a predefined limit value for a proportion of lawn within a garden area in order to determine the vegetation index. Preferably, the at least one computing unit, in particular the algorithm, is provided to examine image data of the at least one garden area for identifying lawn and/or determining a proportion of at least one specific vegetation type for specific patterns, wherein at least one specific pattern is associated with each vegetation type to be detected. Preferably, the specific patterns of the vegetation types are stored in the at least one computing unit and/or can be retrieved from an external unit via the at least one computing unit.

It is further proposed that the at least one computing unit comprises a pattern recognition algorithm which is configured to recognize foreign objects located in the at least one detected garden area on the basis of image data captured via the at least one camera unit in the first range of the electromagnetic spectrum and/or in the second range of the electromagnetic spectrum and/or on the basis of a determined vegetation index. Advantageously, foreign objects in the garden area can be easily and automatically detected. This can advantageously prevent a falsification of a value for the vegetation health of the garden by the foreign object(s), in particular as the areas with the foreign object(s) can be excluded from the determination of the vegetation index. An advantageously early and automatic warning of a user and/or a vegetation monitoring system or devices of the vegetation monitoring system can be made possible. This can advantageously prevent unintentional damage to the vegetation of the garden caused by the foreign object, for example through prolonged shading and/or weight loading. Advantageously precise monitoring of the garden can be achieved via the vegetation monitoring device. In particular, the at least one computing unit is configured to carry out the pattern recognition algorithm to detect foreign objects located in the at least one captured garden area. Preferably, the pattern recognition algorithm for detecting foreign objects located in the at least one captured garden area is stored in the at least one computing unit, in particular a memory of the computing unit.

Furthermore, it is proposed that the at least one camera unit is configured to capture a plurality of distinguishable garden areas of the garden, wherein the at least one computing unit is configured to separately determine the vegetation index and/or a temporal progression of the vegetation index for individual captured garden areas. An advantageous division of the garden into garden areas can be achieved. A range-specific advantageously high-resolution monitoring of the garden can be made possible. As a result, activities in the garden or an assessment of vegetation health can be determined and/or carried out advantageously in a targeted manner for the individual garden areas. This makes it possible to maintain the garden in an advantageously efficient manner, in particular as only areas of the garden that are relevant or in need of maintenance and/or an activity can be determined and selected separately. In particular, the at least one computing unit is configured to associate at least one garden area with each pixel of the captured image data, wherein in particular the at least one computing unit is configured to determine at least one value of the vegetation index for each pixel or each garden area. Preferably, the at least one computing unit is configured to use only image data and/or values of the vegetation index, which are captured via pixels associated with the respective garden area, to determine the vegetation index for a garden area. In particular, it is conceivable that, for example, in the case of a change in position and/or orientation of the at least one camera unit relative to the at least one garden area and/or in the case of a change in vegetation health and/or vegetation distribution, at least one computing unit is configured to change and/or adjust an association of pixels with individual garden areas.

In addition, it is also proposed that the at least one computing unit is configured to retrieve and/or request at least one rain condition parameter from a rain sensor and/or a weather station for determined values of the vegetation index and/or for image data transmitted to the at least one computing unit for determining the vegetation index, in particular for determining a temporal progression of the vegetation index. An advantageously reliable assessment of vegetation health can be achieved using the vegetation indices, in particular as a determined vegetation index can have deviating values when it rains. The term "rain condition parameter" is to be understood in particular to mean a parameter that describes a rain condition for the respective garden area, wherein in particular the rain condition is present in the garden or in an environment of the garden, in particular the garden area. For example, the at least one rain condition parameter is configured as an amount of precipitation per area and time. It is conceivable that the at least one computing unit comprises one or a plurality of different value range(s) and/or limit value(s) of the rain condition parameter, which are in particular stored in the computing unit. In particular, the at least one computing unit is configured to determine a rain condition by means of a value of the rain condition parameter transmitted by the rain sensor and/or the weather station, in particular as a function of the limit range(s) and/or limit value(s). Preferably, the at least one computing unit is configured to associate a value of the rain condition parameter and/or a determined rain condition with determined values of the vegetation index and/or captured image data provided to determine the vegetation index as a function of a capture time of the image data and/or the image data used for determining the value of the vegetation index as a function of a capture time of the rain condition parameter. In particular, the at least one computing unit is configured to associate a value of the rain condition parameter and/or a determined rain condition with determined values of the vegetation index and/or captured image data provided to determine the vegetation index, wherein the value of the rain condition parameter and/or a value of the rain condition parameter used to determine the rain condition has a capture time or capture period, which is within a predefined time period from a capture time or capture period of the respective determined value of the vegetation index and/or the respective detected image data provided for determining the vegetation index, or is at least substantially identical to a capture time of the respective determined value of the vegetation index and/or the respective captured image data provided to determine the vegetation index. Preferably, the at least one computing unit is configured to specify a capture time or a time period for a capture time of the rain condition parameter for transmission to the at least one computing unit when the rain condition parameter is retrieved and/or requested, which, in particular, is within a predefined time interval from a capture period or capture time of the respective determined value of the vegetation index and/or the respective captured image data provided for determining the vegetation index, or is at least substantially identical to a capture period or capture time of the respective determined value of the vegetation index and/or the respective captured image data provided for determining the vegetation index. In particular, the at least one camera unit is configured to associate captured image data with a respective capture time. Alternatively, it is conceivable that the at least one computing unit is configured to associate a capture period or capture time with image data captured by the at least one camera unit and transmitted, in particular directly, to the at least one computing unit. It is conceivable that the rain sensor and/or weather station may be configured as part of the vegetation monitoring system and/or the vegetation monitoring device or may be configured externally to the system. In particular, the at least one computing unit is configured to generate at least one output signal to retrieve and/or request the rain condition parameter. In particular, the at least one computing unit is configured to transmit the output signal for retrieving and/or requesting the rain condition parameter to the rain sensor and/or the weather station via the at least one communication unit. Preferably, the at least one computing unit is configured to receive and evaluate the rain condition parameter by means of input signals via the at least one communication unit. In particular, the output signal and/or the input signal are configured as electronic data packet(s). It is conceivable that the at least one computing unit is configured to query and/or request the rain condition parameter at regular time intervals.

Furthermore, it is also proposed that the at least one computing unit is configured to determine a temporal progression of the vegetation index as a function of at least one rain condition parameter, wherein the at least one computing unit is configured to discard or select values of the vegetation index to determine the temporal progression of the vegetation index in each case as a function of a rain condition parameter of the at least one garden area, which has at least substantially the same capture period or capture time as captured image data to determine the respective value of the vegetation index. An advantageously precise determination of a progression of vegetation health can be achieved, in particular as values of the vegetation index can each be used to determine the temporal progression of the vegetation index, which were captured under similar conditions, in particular under similar rain conditions. Preferably, the at least one computing unit is configured to use exclusively determined values of the vegetation index and/or image data to determine a temporal progression of the vegetation index, to each of which an identical or similar value of the rain condition parameter and/or the rain condition is associated or to each of which a value of the rain condition parameter is associated which is below a predefined limit value of the rain condition parameter. For example, the at least one computing unit is configured to use exclusively determined values of the vegetation index and/or image data to determine a temporal progression of the vegetation index, wherein no rain was detected at a respective capture time of the values and/or the image data, in particular via a determination of the rain condition, or a value for the rain condition parameter was detected below a predefined limit value.

Furthermore, it is proposed that the at least one computing unit is configured to detect an occlusion of the at least one camera unit, in particular a camera of the camera unit, based on image data provided by the at least one camera unit. It is possible to achieve advantageously simple and automated detection of soiling, in particular without a user's activity. The camera unit can be cleaned advantageously quickly, in particular as a user can be directly warned and/or another device of the vegetation monitoring system can be controlled to clean the camera unit. Advantageously reliable monitoring of the garden can be ensured. In addition, additional maintenance of the camera unit may be advantageously reduced. This may advantageously achieve low maintenance costs. In particular, an occlusion of the at least one camera unit can be formed as a deposit of dirt, dust, or other residues on a lens of the camera unit and/or on the window element. For example, an occlusion of the at least one camera unit may be configured as a movement and/or arrangement of a person or a foreign object in the detection range, in particular within a short range in front of the at least one camera unit. Preferably, the at least one computing unit is configured to detect an occlusion of the at least one camera unit, in particular at least one camera of the camera unit, as a function of changes in image data captured with a time offset relative to one another, for example if image values within the image data change significantly over a significant range of a detection range and/or captured image and/or if there is a change in image values in image data of a detection range and/or captured image within a time period, which is below a limit value of the time period stored for a proportion of the changing image values. For example, an occlusion of the camera unit is detected when, for example, 40% of all image values in image data of a detection range and/or captured image change within, for example, less than 3 seconds. Alternatively or additionally, it is conceivable that the at least one computing unit is configured to detect an occlusion of the at least one camera unit by means of pattern recognition of captured image data. Alternatively or additionally, it is conceivable that the at least one computing unit is configured to detect an occlusion of the at least one camera unit as a function of detected movements and/or foreign objects in an unobscured part of the at least one garden area. For example, it is conceivable that an occlusion of the at least one camera unit is detected if an object, for example a person and/or the vegetation maintenance device, can move unhindered from an unobscured area of the detection range and/or the captured image into an obscured area and in particular can no longer be detected. It is conceivable that the at least one computing unit is configured to distinguish a device of the vegetation monitoring system, in particular the vegetation maintenance device, for detection of an occlusion of the at least one camera unit, in particular for distinguishing an occlusion of the at least one camera unit and a foreign object or an optical effect within the at least one captured garden area. In particular, the at least one computing unit is configured to control a device of the vegetation monitoring system, in particular the at least one vegetation maintenance device, upon detection of an obscured area in a captured image to detect an occlusion of the at least one camera unit, such that the device moves into an area of the at least one garden area projected onto the at least one garden area via the obscured area, in particular from an area of the at least one garden area projected onto the at least one garden area via an obscured area in the captured image.

In addition, a method for intelligently cutting vegetation in a garden is proposed, in particular by means of the vegetation monitoring system according to the invention and/or by means of the vegetation monitoring device according to the invention, which comprises the following method steps:

providing image data of at least one garden area of the garden, determining at least one vegetation index of the at least one garden area as a function of, in particular based on, the image data, determining a required pruning activity to intelligently cut plants in the garden, in particular the at least one garden area as a function of the determined vegetation index and/or image data.

Preferably control signals are generated, in particular by means of the at least one computing unit, to control a vegetation maintenance device, in particular configured as a cutting machine or robotic lawn mower, to carry out the required pruning activity that is determined. In particular, the control signals are configured as electrical and/or electronic signals, which are in particular provided for controlling a device, in particular the at least one vegetation maintenance device. Preferably, the image data of the garden area(s) is provided by means of the vegetation monitoring device, in particular the at least one camera unit. Preferably, the determined vegetation index, in particular determined values of the vegetation index, is provided by means of the at least one computing unit. Preferably, the vegetation index is determined as a function of the provided/captured image data. Preferably, the control signals for controlling the vegetation maintenance device are generated by means of the computing unit. Preferably, the control signals for controlling the vegetation maintenance device are transmitted from the at least one computing unit to the at least one vegetation maintenance device by means of the at least one communication unit. It is conceivable that the method for intelligently cutting plants is configured as a purely computer-implemented method and can be executed in particular by means of the at least one computing unit. In particular, the image data of the garden area(s) is provided as input signals to the at least one computing unit.

Preferably, the control signals for controlling the at least one vegetation maintenance device comprise control commands for moving the at least one vegetation maintenance device within the at least one garden area and/or for a cutting movement of the at least one vegetation maintenance device for carrying out the pruning activity in the at least one garden area. Alternatively or additionally, it is conceivable that one or a plurality of processes for carrying out the pruning activity are specified by the at least one vegetation maintenance device and are in particular stored in the at least one computing unit or the at least one vegetation maintenance device, wherein, in particular, one of the sequences is selected by means of the control signals or the at least one vegetation maintenance device is controlled by means of the control signals to carry out one of the sequences for the pruning activity. Alternatively or additionally, it is conceivable that the control signals comprise control commands to adjust at least one processing parameter of the at least one vegetation maintenance device when carrying out the pruning activity. The term "processing parameter" is to be understood in particular to mean a parameter of the at least one vegetation maintenance device, which describes at least one characteristic of the pruning activity, for example a cutting angle, a cutting height, a rotational speed of at least one cutting edge, a movement speed or the like. For example, the processing parameter is configured as a height of a cutting tool of the at least one vegetation maintenance device, as an orientation of a storage unit for cutting tools of the at least one vegetation maintenance device, as a control current for a motor of the at least one vegetation maintenance device, in particular a drive unit and/or a work unit of the at least one vegetation maintenance device, or the like. In particular, the processing parameter is set via the at least one vegetation maintenance device by means of the control signals for carrying out the pruning activity. For example, it is conceivable that the at least one vegetation maintenance device moves at least substantially independently of the at least one computing unit within the at least one garden area, wherein in particular the processing parameter is configured by means of the control signals via the at least one computing unit, in particular to perform a pruning activity in a/the at least one garden area. The pruning activity is in particular configured as a mowing of grass and/or lawn, a trimming of a bush and/or other plants, as a removal of branches of a tree, or the like.

The design of the method according to the invention can enable advantageous automated planning of cutting operations in the garden. Advantageously, cutting processes can be easily and directly adapted to a growth behavior or a vegetation health of the plants. An advantageously high vegetation health of the plants in the garden can be achieved, particularly without the intervention of a user.

Furthermore, it is proposed that, in at least one method step, at least one growth pattern of plants in the at least one garden area is detected based on the image data and/or the vegetation index, wherein control signals for carrying out the determined pruning activity are generated as a function of the at least one detected growth pattern. Advantageously, a growth pattern for pruning activities in the garden can be automatically taken into account. As a result, advantageously individual maintenance of the plants can be achieved. The term "growth pattern" is understood in particular to mean a naturally grown or artificially generated pattern formed by plants within the garden area. It is conceivable that an identification of vegetation types within the at least one garden area, in particular by means of the at least one computing unit, occurs as a function of at least one detected growth pattern. Preferably, a plurality of growth patterns are stored in the at least one computing unit, in particular values and/or patterns of image data and/or the vegetation index associated with the growth patterns. In particular, the image data and/or determined values of the vegetation index are examined by means of the at least one computing unit for the detection of growth patterns in the at least one garden area on the values and/or patterns associated with the stored growth patterns. Preferably, control signals for controlling the at least one vegetation maintenance device are generated as a function of a type of the detected growth pattern, a form of the detected growth pattern and/or a position of the detected growth pattern within the at least one garden area. Preferably, control signals for controlling the at least one vegetation maintenance device, in particular by means of the at least one computing unit, are generated such that the required pruning activity is carried out in at least one garden area in which the growth pattern is detected, or that at least one garden area in which the growth pattern is detected is avoided when carrying out the pruning activity. Alternatively or additionally, it is conceivable that a setting of a processing parameter may be carried out by means of the control signals for controlling the at least one vegetation maintenance device as a function of the detected growth pattern and/or a position of the detected growth pattern.

In addition, it is proposed that in at least one method step, control signals for executing the determined pruning activity are generated such that a certain growth pattern is achieved in the at least one garden area and/or that a temporal progression of the vegetation index in the at least one garden area is optimized, wherein control signals comprise at least one processing parameter of the vegetation maintenance device, which is set as a function of the determined vegetation index. By controlling the vegetation maintenance device, an advantageously high vegetation health of the plants in the garden can be achieved, in particular without the intervention of a user. It is conceivable that the control signals for carrying out the pruning activity are generated such that a predefined growth pattern is created in the at least one garden area by means of the pruning activity of the vegetation maintenance device. In particular, the predefined growth pattern is stored by a user and/or determined by means of the at least one computing unit, in particular for an optimization of a temporal progression of the vegetation index in a garden area. For example, it is conceivable that plants in a certain garden area of the garden are processed at a different cutting height relative to plants in other garden areas of the garden, for example to influence a regeneration capacity of the plants in the certain garden area and/or to increase a resistance of the plants in the certain garden area in the event of an impending flood, storm or the like, for example if the certain garden area is susceptible to water accumulation. Alternatively or additionally, it is conceivable that the determined pruning activity is provided to introduce growth patterns formed as predefined motifs, for example lettering or images, into a planting surface, for example a lawn, of the at least one garden area. The term "optimization of a temporal progression of the vegetation index" is understood in particular to mean as an increase of a vegetation index averaged over a time interval, which can in particular reflect an advantageous vegetation health in the at least one garden area.

Furthermore, it is proposed that in at least one method step for generating the control signals, a machine learning method and/or a machine learning system is used in order to optimize the temporal progression of the vegetation index, wherein provided image data and/or recorded values of the vegetation index are taken into account. An advantageously large amount of different data can be used to assess and plan pruning activities in the garden. Advantageously accurate evaluation of the captured data can be achieved. Advantageously preventive planning of cutting processes can be made possible, in particular as growth progressions of the plants and/or other developments in the garden can be advantageously detected and evaluated. This can enable advantageous good maintenance of the plants of the garden. Preferably, in the machine learning method and/or by means of the machine learning system, a plurality of captured image data, determined values of the vegetation index and determined progressions of the vegetation index as well as pruning activities carried out in the at least one garden area are used to determine an influence of different pruning activities and/or different times for carrying out the pruning activities on the temporal progression of the vegetation index. It is conceivable that in the machine learning method and/or by means of the machine learning system, captured and/or determined data from a plurality of vegetation monitoring systems and/or from a plurality of different gardens are used, which are queried and/or received in particular by means of the at least one computing unit via the at least one communication unit. Alternatively, it is conceivable that the machine learning method is carried out substantially by an external unit, such as a server, a data center a machine learning system, such as an artificial neural network, or the like and/or that the machine learning system comprises external devices, wherein, in particular, captured and/or determined data, in particular values of the vegetation index, temporal progressions of the vegetation index, pruning activities that are carried out, or the like, are transmitted from the at least one computing unit via the at least one communication unit to the external unit and/or the external devices. Preferably, one or a plurality of pruning activity/ activities, processing parameters for carrying out a pruning activity, and/or a time for carrying out a pruning activity are determined by means of the machine learning method and/or by means of the machine learning system for which an optimization of the temporal progression of the vegetation index is to be expected. Preferably, the control signals are generated such that the at least one vegetation maintenance device is controlled by means of the control signals for carrying out the specific pruning activity/activities, carrying out a pruning activity with the specific processing parameter, and/or carrying out the pruning activity at the specific time.

Furthermore, it is proposed that, in at least one method step, the control signals for carrying out the pruning activity are generated such that the pruning activity is carried out when the determined vegetation index reaches a specific threshold value for the vegetation index. A favorable time for pruning activity can be determined automatically depending on plant growth. In particular, the recorded vegetation index typically decreases over time, when plants are cut, in particular for meadows and/or lawns, and increase again with plant regrowth. Preferably, by controlling the pruning activity over the threshold value for the vegetation index, an advantageously consistently high vegetation health can be ensured in the garden area. It is conceivable that the specific threshold value for the vegetation index for carrying out the pruning activity is determined by means of the machine learning method and/or the machine learning system. Alternatively, it is conceivable that the specific threshold value for the vegetation index for executing the pruning activity is specified and stored by a user. Alternatively, it is conceivable that the specific threshold value for the vegetation index for carrying out the pruning activity is determined by means of the at least one computing unit as a function of a vegetation type occurring in the at least one garden area. Alternatively or additionally, it is conceivable that the specific threshold value for the vegetation index for carrying out the pruning activity is adjusted, preferably step by step, by means of the at least one computing unit and/or the machine learning method/system, in particular to optimize the temporal progression of the vegetation index. It is conceivable that different specific threshold values for the vegetation index are set and/or determined for different garden areas of the garden in order to carry out the pruning activity. In particular, depending on the specific threshold value for the vegetation index, the control of the vegetation maintenance device can be used to determine a time for carrying out the pruning activity that is advantageous for vegetation health and future high plant growth, in particular different from identical time intervals between the pruning activities and individual for the at least one garden area and the environmental conditions present there.

In addition, it is proposed that in at least one method step for the at least one garden area, at least one leaf area index is provided, wherein control signals for carrying out the pruning activity are generated as a function of a ratio between the leaf area index and the vegetation index of the at least one garden area. Drainage in the garden area can be advantageously determined and taken into account when planning pruning activities. It is advantageous to determine a time interval for determining the vegetation index after precipitation in the garden area, in particular to prevent deviations caused by water on the plants in the recorded values of the vegetation index to be used for planning pruning activities. In addition, pruning activities in the garden, in particular plant debris arranged in the garden area, can be easily recognized by a change in the leaf area index over time. Preferably, the leaf area index is determined and provided as a function of captured image data of the at least one garden area, in particular by means of the at least one computing unit or an external unit. In particular, at least one limit value/limit range is specified and/or stored for the ratio between the leaf area index and the vegetation index of the at least one garden area. Alternatively or additionally, it is conceivable that at least one limit value/limit range for the ratio between the leaf area index and the vegetation index of the at least one garden area is determined or adjusted by means of the/a machine learning method or the/a machine learning system as a function of captured data, in particular image data and values of the vegetation index. Preferably, control signals for controlling the at least one vegetation maintenance device are generated such that the at least one vegetation maintenance device is controlled at or during the execution of the pruning activity as a function of the ratio between the leaf area index and the vegetation index of the at least one garden area. For example, the at least one vegetation maintenance device is controlled by means of the control signals for carrying out the pruning activity if a determined ratio between the leaf area index and the vegetation index of the at least one garden area exceeds or falls below the predefined limit value/limit range. For example, the control signals are generated such that a/the processing parameter of the at least one vegetation maintenance device for carrying out the pruning activity is adjusted as a function of the ratio between the leaf area index and the vegetation index of the at least one garden area. For example, if a comparatively high value of the leaf area index is determined for the at least one garden area, a cutting height of the pruning activity is reduced, in particular in order to keep the quantity of grass clippings, or the like, of the pruning activity low and, in particular, to reduce the burden on the plants.

Furthermore, it is proposed that in at least one method step, a proposal for an activity to be carried out by a user is generated as a function of at least one determined vegetation index, at least one detected growth pattern, and/or at least one determined leaf area index of the at least one garden area. Advantageously, simple and automated interaction with a user can be enabled, for example, to initiate additional activities that cannot be carried out by the at least one vegetation maintenance device to eliminate errors and/or obstacles and/or to monitor an activity. Advantageously, a high level of ease of use can be achieved, in particular as it can be provided with precise instructions on what is currently required for optimum plant maintenance. For example, it is conceivable that the activity to be performed by the user is designed as a removal of grass clippings or other residues of the pruning activity, as a removal of a foreign body/object in a garden area to be worked on, as an activity on the at least one vegetation maintenance device, for example a positioning within the at least one garden area or the like, to a start or a resumption of the pruning activity or the like. Preferably, the proposal for the activity to be carried out by a user is generated by the at least one computing unit. Preferably, the proposal for the activity to be carried out by a user is output to the user, in particular via the at least one communication unit which transmits an electronic signal comprising the proposal, by means of the vegetation monitoring device, the at least one vegetation maintenance device, an output unit of the vegetation monitoring system, an external unit, such as a device associated with the user, or the like, and/or another device of the vegetation monitoring system.

Furthermore, it is proposed that in at least one method step, in particular when a pruning activity in the at least one garden area is detected and/or upon receipt of a user input regarding a pruning activity to be carried out by the user, a temporal progression of the vegetation index and/or a growth pattern of the at least one garden area is analyzed with regard to activities that are carried out in the at least one garden area. Advantageously, an activity of the user can be simply and automatically detected and taken into account for further planning of pruning activities. Advantageously high user friendliness can be achieved, in particular as user inputs can be advantageously dispensed with, if necessary. Preferably, in particular by means of the at least one computing unit, the control signals for carrying out the pruning activity are generated as a function of a pruning activity detected in the at least one garden area and/or a pruning activity carried out by the user detected by the user input. Preferably, by generating the control signals as a function of a pruning activity detected in the at least one garden area and/or a pruning activity carried out by the user detected by the user input, a time of the pruning activity to be carried out by the at least one vegetation maintenance device is adjusted, in particular postponed to a later date and/or limited to one or more particular garden areas, which in particular are not affected by the pruning activity detected in the at least one garden area and/or the pruning activity carried out by the user detected by the user input. Preferably, a temporal progression of the vegetation index is determined continuously, in particular by means of the at least one computing unit, wherein in particular drops in the vegetation index are detected over time and compared with pruning activities carried out in the at least one garden area. In particular, if a drop in the vegetation index over time is detected, which cannot be correlated in time with a carried out pruning activity in the at least one garden area, at least one output signal to notify and/or warn the user is preferably generated, in particular by means of the at least one computing unit.

In addition, it is proposed that in at least one method step at least one, in particular additional, garden parameter, in particular a weather condition, a temperature, a soil content parameter, etc., is provided, wherein the pruning activity for the at least one garden area is determined or is proposed to a user as a function of the garden parameter. Advantageously good maintenance of the plants during a pruning activity can be achieved, in particular as further environmental conditions, which can each describe a cutting behavior, plant regeneration and/or vegetation health, can be advantageously taken into account when planning pruning activities. Preferably, in particular by means of the at least one computing unit, a temporal progression of the at least one garden parameter is determined and taken into account for generation of the control signals for controlling the at least one vegetation maintenance device. Preferably, a time and/or a value of the at least one processing parameter for carrying out the pruning activity is determined by means of the at least one vegetation maintenance device or by the user as a function of the garden parameter and/or the temporal progression of the garden parameter. Preferably, the garden parameter is provided and/or detected by means of the detection unit, in particular at least one detection element of the detection unit, at or in the at least one garden area and/or by means of an external unit. It is conceivable that at least one limit value/limit range is specified for the garden parameter, wherein the at least one vegetation maintenance device is only controlled to carry out the pruning activity, in particular by means of control signals, and/or a pruning activity to be carried out by the user is only proposed if a value of the garden parameter provided, in particular currently or recently, is below or above the limit value or within the limit range.

It is further proposed that in at least one method step, the at least one garden area is divided into a plurality of individual maintenance areas of the garden based on the image data, wherein control signals are generated for the maintenance areas or for a selection of the maintenance areas for carrying out a determined pruning activity in the respective maintenance area(s). An advantageously individual control of the vegetation maintenance device, in particular as a function of a maintenance area to be processed, can be enabled. As a result, various maintenance areas can be advantageously easily and automatically individually processed. The term "maintenance area" is understood in particular to mean an area of the garden that differs from other areas of the garden, in particular maintenance areas, due to differing maintenance requirements and/or a different vegetation health. Preferably, the at least one garden area is divided such that different control signals are generated for each of the maintenance areas, in particular to carry out a time-shifted pruning activity in the different maintenance areas and/or to set different values of at least one processing parameter for pruning activities in the different maintenance areas.

In addition, a method for determining a vegetation index in a garden is proposed, which comprises the following method steps:

providing image data of at least one garden area of the garden, providing at least one illumination parameter for an area located within or in the vicinity of the garden, in particular for the at least one garden area and/or which comprises the garden, in particular the at least one garden area, wherein the illumination parameter is provided for a capture time or capture period of the image data, determining at least one vegetation index of the at least one garden area as a function of the image data and the at least one illumination parameter, wherein a determination of the vegetation index as a function of a value of the at least one illumination parameter is adjusted.

Preferably, the method is intended to enable monitoring of a health of the garden by determining the vegetation index, in particular by determining a temporal progression of the vegetation index, and preferably, the method is intended to enable maintenance of a vegetation of the garden by determining the vegetation index, in particular by determining the temporal progression of the vegetation index, in particular by controlling a vegetation maintenance device as a function of the determined vegetation index. Preferably, the at least one illumination parameter is provided by means of the vegetation monitoring device, the at least one computing unit, the at least one detection unit, in particular at least one detection element of the detection unit, and/or an external unit. It is conceivable that the method for determining a vegetation index for the garden can be configured as a purely computer-implemented method and can in particular be executed by means of the at least one computing unit. The term "illumination parameter" is in particular to be understood to mean a parameter that quantifies and/or describes a lighting and/or illumination of the garden area, preferably in the range of visible light and/or in the infrared range. For example, the illumination parameter is configured as a brightness value averaged over a specific captured area, as a proportion of directly illuminated areas within the area, as a ratio of directly illuminated areas and shaded areas detected within the area, or the like. Preferably, the determination of the vegetation index is adapted, in particular by means of the at least one computing unit, by selecting a time for capturing the image data for determining the vegetation index, wherein in particular the time is selected as a function of a value of the illumination parameter at the time, and/or by using at least one correction factor in determining the vegetation index as a function of the image data, wherein in particular the correction factor is determined as a function of a value of the illumination parameter at a time of capturing the image data. Preferably, image data provided is associated with a value of the at least one illumination parameter provided for a capture period of the image data. It is conceivable that a determined value of the vegetation index is discarded if a value of the at least one illumination parameter associated with the image data used to determine the value of the vegetation index undershoots or overshoots a predefined limit value for the at least one illumination parameter. For example, a determined value of the vegetation index is discarded, a determination of the vegetation index is postponed, and/or a correction factor is used to determine the vegetation index if insufficient illumination of the at least one garden area and/or an insufficient proportion of visible light within the at least one garden area is determined via the at least one illumination parameter.

The design of the method according to the invention enables an advantageously reliable and accurate determination of the vegetation index, in particular in case of changing lighting of the garden. An advantageously reliable and accurate assessment of a vegetation health of the garden can be achieved. It is advantageous to create a reliable and dependable temporal progression with regard to the development of a vegetation health, in particular by taking into account the lighting, which can strongly affect the vegetation index independently of the vegetation health.

Furthermore, it is proposed that in at least one method step, the at least one illumination parameter is identified and/or determined based on the image data. An advantageously autonomous determination of the vegetation index can be achieved, in particular independent of additional data and/or external sources. Preferably, the method may be advantageously carried out using a vegetation monitoring device, which in particular captures the image data. Preferably, the at least one illumination parameter is identified and/or determined as a function of an averaged or a lowest captured brightness value of pixels of the image data. It is conceivable that an area within the at least one garden area that can be captured by means of the at least one camera unit and/or at least one pixel of the image data is used as a reference for determining the at least one illumination parameter, wherein brightness values and/or color values captured for the area and/or the pixel are assigned possible values of the illumination parameter via a calibration. Alternatively, it is conceivable that the at least one illumination parameter is determined by means of a sensor element of the vegetation monitoring system, in particular the detection unit, and/or by means of an external unit and is preferably transmitted to the at least one computing unit, in particular by means of the at least one communication unit.

In addition, it is proposed that at least one reference object and/or at least one reference area in the at least one garden area is captured in at least one process step for identifying the at least one illumination parameter based on the image data. An advantageously simple and reproducible determination of the illumination parameter can be achieved. In particular, an advantageously low computing power requirement can be made possible. Preferably, the at least one reference object and/or the at least one reference area and/or a position of the at least one reference object and/or the at least one reference area in a captured garden area are specified by a user or detected/determined by means of the at least one computing unit and/or the at least one camera unit based on captured image data. It is conceivable that the at least one reference object and/or the at least one reference area is selected by means of the at least one camera unit and/or the at least one computing unit using the captured image data as a function of at least one stored characteristic value of the at least one reference object and/or the at least one reference area, for example a shape, a pattern a location within the at least one garden area, a color or the like, wherein the characteristic value can in particular be detected in the image data. Alternatively, it is conceivable that the at least one reference object and/or the at least one reference area is determined by means of the at least one camera unit and/or the at least one computing unit using the captured image data as a function of an illumination of the reference object and/or the reference area over an observation period, wherein in particular only stationary objects and areas in the at least one garden area are used. For example, the image data is used to determine a surface on a wall of an object within the at least one garden area as a reference area if it is illuminated over a capture period on one day or on several consecutive days and was captured at one position in each case. Preferably, an identification of the at least one illumination parameter is calibrated with different degrees of lighting of the at least one reference object and/or the at least one reference area, wherein at least one value of the at least one illumination parameter is determined in particular to determine the vegetation index as a function of a lighting of the reference object and/or the reference area.

It is further proposed that in at least one method step, an orientation of a vegetation monitoring device capturing the image data relative to the at least one garden area and a global position of the vegetation monitoring device and/or the at least one garden area are provided, wherein the at least one illumination parameter is determined as a function of the orientation of the vegetation monitoring device relative to the at least one garden area and of the global position of the vegetation monitoring device and/or the at least one garden area. An advantageously simple and cost-effective determination of the illumination parameter can be achieved. In particular, the orientation of the vegetation monitoring device and the global position of the vegetation monitoring device and/or the garden area can be used to determine a position of the sun and an angle of the sun relative to the garden area and relative to a main detection direction of the vegetation monitoring device, which preferably each affect the illumination parameter at a time of day. Preferably, the orientation of the vegetation monitoring device capturing the image data relative to the at least one garden area and the global position of the vegetation monitoring device and/or the at least one garden area is provided by means of a user, in particular via a user input, via a device external to the vegetation monitoring system, such as a positioning sensor or camera, or via an external unit. It is conceivable, for example, that the global position is determined via captured image data of the garden area and/or via an IP address of the vegetation monitoring system/vegetation monitoring device by means of an external unit. Alternatively or additionally, it is conceivable that the orientation of the vegetation monitoring device capturing the image data relative to the at least one garden area is determined via a camera of the vegetation monitoring system capturing the vegetation monitoring device, which is configured, for example, as part of the vegetation maintenance device or other device of the vegetation monitoring system.

Furthermore, it is proposed that in at least one method step, interfering light sources within or in the vicinity of the garden area are identified as a function of a temporal progression of the illumination parameter, wherein at least one time interval for which an interfering light source has been identified is taken into account when determining the vegetation index. Preferably, time intervals in which interfering light sources were identified can be excluded for determining the vegetation index. A flexibility of the method with respect to an environment of the garden can be advantageously increased, in particular as requirements for lighting in or in the vicinity of the garden can be advantageously kept to a minimum to ensure interference-free performance of the method. It may be possible to determine a temporal progression of the vegetation index that is advantageously accurate and relevant with regard to an assessment of a vegetation health within the garden, in particular as changing lighting conditions due to interfering light sources can strongly affect values of the vegetation index independently of an actual vegetation health. Preferably, interfering light sources within or in the vicinity of the at least one garden area are identified by detection of specific patterns in the temporal progression of the illumination parameter, wherein the specific patterns are in particular configured as a spontaneous increase or decrease of the illumination parameter. Preferably, the specific patterns differ from a regular and even change of the illumination parameter by the sun. It is conceivable that a temporal progression of the illumination parameter, which is usual or intended due to a course of the sun and/or known artificial light sources at or in the at least one garden area, is stored, wherein in particular the identification of interfering light sources within or in the vicinity of the at least one garden area takes place via a detection of deviations of a detected temporal progression of the illumination parameter from the stored temporal progression of the illumination parameter, wherein the deviations exceed a certain predefined limit value of the illumination parameter or a rate of change of the illumination parameter. In particular, interfering light sources are identified by means of the at least one computing unit based on the image data and/or the determined vegetation index. Due to the fact that a time interval determined for an identified interfering light source "is taken into account when determining the vegetation index", it is understood in particular that this time interval is avoided when capturing image data to determine the vegetation index and/or image data captured within this time interval is discarded to determine the vegetation index.

In addition, it is proposed that at least one weather parameter is provided in at least one method step, wherein the vegetation index, in particular a time to determine the vegetation index, is determined as a function of the weather parameter and the illumination parameter. An advantageously accurate determination of a vegetation index relevant to a vegetation health in the garden can be achieved, in particular as weather events can be taken into account. Lighting effects caused by weather events, which can affect determined values of the vegetation index, can be advantageously taken into account when determining the vegetation index. In particular, a illumination parameter can be advantageously determined in a rudimentary manner, in particular as spontaneous and short-term weather-related effects on the lighting of the garden can be taken into account via the weather parameter. As a result, advantageously simple and fast determination of the illumination parameter can be achieved with a substantially consistent accuracy of the determined vegetation index. Preferably, the at least one weather parameter is provided from an external unit or the at least one detection unit. Preferably, at least one limit value or limit range of the weather parameter is stored for the at least one weather parameter for determining the vegetation index. Preferably, to determine the vegetation index, a time/time interval is selected, which in particular corresponds to a capture period or a capture time of the image data to be used to determine the vegetation index, wherein a value of the weather parameter provided for this time/time interval is below or above the limit value or within or outside the limit range. For example, the limit value/limit range is selected such that a determination of the vegetation index is prevented in the event of potentially strongly and/or rapidly changing light conditions due to the weather, for example during a storm, a thunderstorm or a heavy cloud cover.

It is further proposed that in at least one method step, determined values of the vegetation index are each associated with at least one value of the at least one illumination parameter, wherein the image data used to determine the respective value of the vegetation index and the value of the at least one illumination parameter associated with the value of the vegetation index each have an at least substantially similar capture time or capture period, wherein the associated values of the at least one illumination parameter are taken into account when comparing values of the vegetation index, in particular for generating a temporal progression of the vegetation index. An advantageously accurate and reliable assessment of a vegetation health over the determined temporal progression of the vegetation index can be achieved. The term "substantially similar" time periods, in particular capture periods, are understood in particular to mean time periods whose start times and end times are separated at most no more than 30 min, preferably at most 15 min, particularly preferably at most 5 min, and most preferably at most 1 min. In particular, the time periods at least partially overlap each other. Preferably, only values of the vegetation index whose associated values of the at least one illumination parameter do not exceed a certain maximum deviation from one another or from a predefined limit value are used and/or compared when comparing values of the vegetation index, in particular for generating a temporal progression of the vegetation index. It is conceivable that an average value of the values of the at least one illumination parameter associated with the values of the vegetation index is formed for all values of the vegetation index determined and/or to be used for the comparison, wherein, in particular when comparing values of the vegetation index, in particular for generating the temporal progression of the vegetation index, only values of the vegetation index are used and/or compared whose associated value of the at least one illumination parameter is in each case within a maximum limit range around the average mean value. Alternatively, it is conceivable that a specific value range for the at least one illumination parameter is specified and stored, wherein only values of the vegetation index whose associated value of the at least one illumination parameter is within the predefined value range are used and/or compared when comparing values of the vegetation index, in particular to generate the temporal progression of the vegetation index.

Furthermore, it is proposed that in at least one method step for determining the vegetation index, at least one control signal for activating at least one artificial light source for the garden area is generated. An advantageously simple determination of the illumination parameter can be achieved. A determination of the vegetation index under advantageously consistent light conditions can be ensured.

Preferably, a determination of the vegetation index can be made advantageously independent of weather conditions and/or solar irradiation. It is conceivable that the garden area to be captured is illuminated by means of the artificial light source. Preferably, the at least one artificial light source is activated by means of the control signal for detecting the at least one garden area via the at least one camera unit. Preferably, the at least one artificial light source is designed as part of the vegetation monitoring system, in particular the vegetation monitoring device. Preferably, the at least one artificial light source is provided for radiating light at least in the visible range and the infrared range, in particular in the near-infrared range of the electromagnetic spectrum. It is also conceivable that the control signal is provided for activating a plurality of artificial light sources, which in particular are distributed over the at least one garden area and/or are provided for radiating light in different ranges of the electromagnetic spectrum. Preferably, the at least one garden area is detected when illuminated by the at least one artificial light source in an absence of the sun/at night. However, it is also conceivable that the at least one artificial light source is used in addition to lighting by the sun. Preferably, the vegetation index is determined via image data that was captured during activation of the at least one artificial light source by means of the control signal.

In addition, it is proposed that in at least one method step, the vegetation index is determined using at least one correction factor depending on a value of the at least one illumination parameter, wherein the image data used to determine the vegetation index and the at least one illumination parameter each have an at least substantially similar capture time or capture period. An advantageously accurate and reliable assessment of a vegetation health over the determined temporal progression of the vegetation index can be achieved. Preferably, the value of the at least one illumination parameter for determining the vegetation index is compared with a predefined and stored limit value of the illumination parameter, wherein in particular the correction factor is determined as a function of a ratio or of a difference between the value of the at least one illumination parameter and the limit value of the illumination parameter. It is conceivable that the value of the at least one illumination parameter is determined from the captured image data. Alternatively or additionally, it is conceivable that a temporal progression of the vegetation index is determined from a plurality of determined values of the vegetation index as a function of at least one correction factor or a plurality of correction factors, wherein in particular values of the vegetation index are each associated with a correction factor for determining the temporal progression of the vegetation index as a function of the respective values of the vegetation index associated with the values of the at least one illumination parameter. Preferably, the correction factor(s) are each associated as a function of a ratio of a respective value of the at least one illumination parameter with a predefined limit value of the illumination parameter and/or an average value of the illumination parameter. In particular, values of the vegetation index to determine the temporal progression of the vegetation index are associated with a correction factor if a value of the at least one illumination parameter is associated with the respective value of the vegetation index, which is below or outside the limit value/limit range or average value of the illumination parameter. It can be conceivable that a correction factor is associated when a value of the vegetation index is determined.

Furthermore, it is proposed that in at least one method step, the vegetation index is determined in a specific time interval before sunset or after sunrise, in particular in a periodic daily interval. An advantageously simple determination of the vegetation index can be achieved, in particular independent of a complex configuration of the illumination parameter. As a result, an advantageously low computing power requirement for carrying out the method can be realized. Preferably, image data is captured to determine the vegetation index in the specific time interval before sunset or after sunrise, particularly in a periodic daily interval. Preferably, the vegetation index is determined with a predefined minimum time interval from to sunset or sunrise, in particular in a periodic daily interval. In particular, a time for determining the vegetation index and/or for capturing image data to determine the vegetation index is selected each day, such that a time interval between the time of sunset or sunrise is each at least substantially identical in each case. For example, the vegetation index is determined 1 hour or 2 hours before sunset or after sunrise, particularly in a periodic daily interval.

Furthermore, it is proposed that in at least one method step, a temporal progression of the vegetation index is determined from a plurality of determined values of the vegetation index, wherein the plurality of determined values of the vegetation index are each selected as a function of a value of the at least one illumination parameter associated with the respective determined value of the vegetation index, wherein in particular determined values of the vegetation index are selected, which are each associated with an at least substantially similar value of the at least one illumination parameter. An advantageously accurate and reliable assessment of a vegetation health over the determined temporal progression of the vegetation index can be achieved. Preferably, a determined value of the vegetation index to determine the temporal progression of the vegetation index is discarded if its associated value of the illumination parameter exceeds a limit value for a difference from an average value of other values of the vegetation index associated with values of the illumination parameter.

In addition, a method for determining a vegetation index in a garden is proposed, which comprises the following method steps:

providing image data captured by at least one vegetation monitoring device of at least one garden area of the garden illuminated by at least one light source, providing at least one position parameter of the vegetation monitoring device, providing at least one position parameter of the at least one light source, determining at least one vegetation index of the at least one garden area as a function of the image data, of the at least one position parameter of the vegetation monitoring device, and of the at least one position parameter of the at least one light source.

It is conceivable that the method for determining a vegetation index for the garden can be configured as a purely computer-implemented method and can in particular be executed by means of the at least one computing unit. The term "position parameter" is in particular to be understood to mean a parameter that describes a position and/or orientation of an object, in particular the vegetation monitoring device or the light source, in space. For example, the position parameter(s) of the vegetation monitoring device and/or the at least one light source are configured as a distance to another object, for example the at least one garden area, as a direction in which the vegetation monitoring device and/or the at least one light source is arranged relative to another object, as coordinates in a coordinate system, for example a reference system of the vegetation monitoring system, or the like. Preferably, the position parameter of the vegetation monitoring device is provided by means of the at least one camera unit, for example based on captured image data of the at least one garden area, by means of another camera or the detection unit of the vegetation monitoring system, for example a camera on the at least one vegetation maintenance device that captures the vegetation monitoring device, or via a user input. Alternatively, it is conceivable that the position parameter of the vegetation monitoring device is provided by means of at least one external unit, for example, by a smartphone, which captures the vegetation monitoring device via an image or a position determination. The at least one position parameter of the at least one light source is preferably determined by means of the at least one computing unit, for example by means of captured image data, as a function of a time of day and a global position of the at least one garden area or the like, by means of the at least one detection unit or provided via an external unit.

Preferably, the method is provided to enable monitoring and maintenance of the health of the garden via the determination of the vegetation index, in particular the determination of at least one temporal progression of the vegetation index. Preferably, the method is provided to enable a vegetation of the garden to be maintained by determining the vegetation index, in particular by determining the temporal progression of the vegetation index, in particular by controlling a vegetation maintenance device as a function of the determined vegetation index. It is conceivable that at least one illumination parameter of the at least one garden area is determined to determine the vegetation index as a function of the at least one position parameter of the vegetation monitoring device and the at least one position parameter of the at least one light source. Alternatively or additionally, it is conceivable that, in order to determine the vegetation index, at least one orientation parameter of the at least one garden area is determined as a function of the at least one position parameter of the vegetation monitoring device and the at least one position parameter of the at least one light source, wherein in particular the vegetation index of the at least one garden area is determined as a function of the image data and of the at least one orientation parameter.

The design of the method according to the invention can enable an advantageously reliable and accurate determination of the vegetation index, in particular taking into account an angle of illumination and/or viewing angle of the garden area, which can influence a determined value of the vegetation index. An advantageously reliable and accurate assessment of a vegetation health of the garden can be achieved. It is advantageous to be able to create a reliable and dependable temporal progression with regard to the development of vegetation health. Preferably, identical lighting conditions for determining values of the vegetation index can be advantageously ensured by taking into account the position parameters, in particular as, depending on a lighting direction and a viewing direction of the garden area, different values for the vegetation index can be measured for an individual garden area even with the same illumination parameter, in particular by lighting other parts of the plants or another captured portion of ground.

Furthermore, it is proposed that determined values of the vegetation index are each associated with at least one value for the at least one position parameter of the at least one light source and for the at least one position parameter of the vegetation monitoring device, wherein associated values for the position parameters of the vegetation monitoring device and of the at least one light source have each been provided for a time that is at least substantially similar to a capture time of the image data used to determine the vegetation index, wherein, in at least one method step, a temporal progression of the vegetation index is determined from a plurality of determined values of the vegetation index, wherein the plurality of determined values of the vegetation index is selected, such that at least substantially similar, in particular at least substantially identical, values for the at least one position parameter of the at least one light source and/or for the at least one position parameter of the vegetation monitoring device are associated with them in each case. An advantageously accurate and reliable assessment of a vegetation health over the determined temporal progression of the vegetation index can be achieved, in particular for a plurality of several garden areas arranged differently to the vegetation monitoring device. Preferably, values of the position parameters of the vegetation monitoring device and the at least one light source are associated with determined values of the vegetation index by means of the at least one computing unit, in particular when determining the determined values of the vegetation index or when providing the position parameters of the vegetation monitoring device and of the at least one light source. Alternatively or additionally, it is conceivable that limit values are respectively stored for the at least one position parameter of the vegetation monitoring device and/or the at least one position parameter of the at least one light source, wherein in particular only determined values of the vegetation index whose associated values of the at least one position parameter of the vegetation monitoring device and/or the at least one position parameter of the at least one light source are below or above a respective stored limit value for the respective position parameter are used to determine the temporal progression of the vegetation index. For example, a position parameter of the vegetation monitoring device is used to limit an inclination angle of the vegetation monitoring device relative to a horizontal to a correspondingly predefined angle range, below which reliable values for the vegetation index can in particular still be determined.

It is also proposed that, in at least one method step, a temporal progression of the vegetation index is determined from a plurality of determined values of the vegetation index, wherein at least one correction factor is used to take into account differences between the individual values of the vegetation index associated with values of the at least one position parameter of the at least one light source and/or differences between the individual values of the vegetation index associated with values of the at least one position parameter of the vegetation monitoring device. A selection of values of the vegetation index to be taken into account, in particular for a creation of a temporal progression of the vegetation index, can advantageously be made independently of the position parameters of the vegetation monitoring device and the light source. An advantageously accurate determination of the vegetation index can be achieved, which is relevant for an assessment of vegetation health. In particular, the temporal progression of the vegetation index is determined as a function of the determined values of the vegetation index and the respective determined correction factors. In particular, the at least one correction factor is intended to provide a corresponding determined value of the vegetation index, for which the at least one correction factor is determined, when determining the temporal progression of the vegetation index corresponding to a difference between a value of the at least one position parameter of the vegetation monitoring device assigned to the value of the vegetation index and a stored limit value or an average value for the values of the at least one position parameter of the vegetation monitoring device assigned to the other values of the vegetation index to be used to determine the temporal progression of the vegetation index and/or a difference between a value of the at least one position parameter of the at least one assigned to the value of the vegetation index Light source and a stored limit value or an average value for the values of the at least one position parameter of the at least one light source assigned to the other values of the vegetation index to be used to determine the temporal progression of the vegetation index. Preferably, a correction factor is determined for each value of the vegetation index to be used to determine the temporal progression of the vegetation index. Alternatively, it is conceivable that a correction factor is only determined for values of the vegetation index to be used to determine the temporal progression of the vegetation index, for which a difference between a value of the at least one position parameter of the vegetation monitoring device associated with the respective value of the vegetation index and a stored limit value or an average value for the values of the at least one position parameter of the vegetation monitoring device associated with the other values of the vegetation index to be used to determine the temporal progression of the vegetation index and/or a difference between a value of the at least one position parameter of the at least one light source associated with the respective value of the vegetation index and a stored limit value or an average value for the values of the at least one position parameter of the at least one light source associated with the other values of the vegetation index to be used to determine the temporal progression of the vegetation index exceed a predefined stored limit value. It is conceivable that the limit value may be dynamically adjusted by means of the at least one computing unit as a function of captured image data of the at least one garden area or may be predefined during assembly or manufacture, in particular and/or by a user. The correction factor(s) are preferably determined using a predefined stored calibration and/or using a machine learning method, wherein in particular various differences between a value of the at least one position parameter of the vegetation monitoring device associated with the value of the vegetation index and a stored limit value or an average value for the values of the at least one position parameter of the vegetation monitoring device associated with the other values of the vegetation index to be used for determining the temporal progression of the vegetation index and/or different correction factors are associated with a difference between a value of the at least one position parameter of the at least one light source associated with the value of the vegetation index and a stored limit value or an average value for the values of the at least one position parameter of the at least one light source associated with the other values of the vegetation index to be used to determine the temporal progression of the vegetation index.

Furthermore, it is proposed that in at least one method step, an orientation of at least one camera of the vegetation monitoring device is provided as a position parameter of the vegetation monitoring device. An advantageously simple determination of the vegetation index as a function of the position parameters can be achieved. Advantageously simple and fast determination of the position parameter of the vegetation monitoring device can be enabled. Preferably, a new value of the at least one position parameter of the vegetation monitoring device is requested, in particular via an output signal, or determined, for example via captured image data and/or a calibration of a driven movement to a position of the at least one camera unit in space, when the orientation of the at least one camera unit or vegetation monitoring device is changed, for example, during assembly and/or a driven movement of the at least one camera unit, in particular by means of the at least one computing unit.

Furthermore, it is proposed that in at least one method step, at least one shade parameter of a reference object in the at least one garden area is identified from the image data, wherein the at least one position parameter of the vegetation monitoring device and/or the at least one position parameter of the at least one light source is determined as a function of the identified shade parameter of the reference object. Advantageously simple and at the same time accurate determination of the position parameters of the vegetation monitoring device and/or the position parameters can be achieved from the image data. A determination of the position parameters of the vegetation monitoring device and/or the position parameters may be advantageously enabled independent of data of an external unit and/or a user, for example a global position, or the like. It may be advantageously possible to carry out the method by means of the vegetation monitoring device. The term "shade parameter" is in particular to be understood to mean a parameter of an object, in particular the reference object, which describes at least one optical or spatial property of a shadow of the object generated by a lighting of the object. For example, the at least one shade parameter is formed as a shape, a size of a shadow of the reference object or an orientation of edges of the shadow within the at least one captured garden area and/or within captured image data of the at least one garden area. Alternatively, it is conceivable that the at least one shade parameter is formed as a time change, for example a position, a size or shape or an orientation, the shadow of the reference object within the at least one captured garden area and/or within captured image data of the at least one garden area. Preferably, the position parameter of the vegetation monitoring device, configured as the orientation of the vegetation monitoring device relative to the at least one light source and/or relative to the at least one garden area, is determined via the at least one shade parameter and a provided global position of the vegetation monitoring device and/or the at least one garden area, in particular together with an indication of the time of day. In particular, the global position of the vegetation monitoring device and/or the at least one garden area and the indication of the time of day are used to determine the position parameters of the light source formed by the sun. Alternatively or additionally, it is conceivable that lighting of the at least one garden area occurs via an artificial light source of the vegetation monitoring system and, in particular, a position of the artificial light source in or on the at least one garden area is provided, for example during assembly and/or by a user, the detection unit or an external unit, wherein, in particular, a position and orientation of the vegetation monitoring device capturing the image data is determined in particular via the identified shade parameter of the reference object.

In addition, it is proposed that in at least one method step, at least one position parameter of the at least one garden area is provided relative to the vegetation monitoring device and/or to the at least one light source and taken into account when determining the vegetation index. The position parameter of the garden area can be advantageously used to take into account an inclination or orientation of the captured garden area, which in particular specifies an inclination angle of the vegetation monitoring device, in particular the camera, to the garden area and can thus affect a determined value of the vegetation index. An advantageously accurate determination of the vegetation index which is relevant for a determination of a vegetation health can be achieved, in particular for a at least partially uneven garden. Preferably, an advantageously high flexibility of the method can be achieved with regard to use for differently configured gardens. Preferably, the at least one position parameter of the at least one garden area is determined via captured image data of the at least one garden area and/or via a captured or known position of a device of the vegetation monitoring system, in particular of the at least one vegetation maintenance device, of a detection element of the detection unit, or the like, preferably in the at least one garden area. Preferably, at least one position parameter or a value of the position parameter is provided for each garden area to be captured, for which the vegetation index is to be determined in particular. Preferably, a captured or known location of the device of the vegetation monitoring system is determined via a positioning system or via captured image data. For example, it is conceivable that the detected or known position of a device of the vegetation monitoring system is determined as a function of a provided movement characteristic, for example a speed or acceleration, of the device of the vegetation monitoring system and a distance of the device traveled by the vegetation monitoring system within the image data. Alternatively or additionally, it is conceivable that the detected or known position of a device of the vegetation monitoring system is determined as a function of a contour or shape of the device of the vegetation monitoring system in the at least one garden area within the image data, wherein, in particular, stored dimensions and/or a stored shape of the device of the vegetation monitoring system are used to determine the position parameter of the at least one garden area. In a preferred configuration, the position parameter of the at least one garden area is configured as an orientation of a surface of the at least one garden area in space and/or relative to the vegetation monitoring device and/or the at least one light source.

Furthermore, it is proposed that in at least one method step for determining the at least one position parameter of the vegetation monitoring device and/or the at least one position parameter of the at least one light source, at least one input prompt for a user to transmit to an external device and/or to an output device of a vegetation monitoring system is generated. The position parameter of the vegetation monitoring device and/or the position parameter of the light source can be provided advantageously quickly and easily. An advantageously low computing power requirement of a vegetation monitoring system and/or a vegetation monitoring device for carrying out the method can be realized. As a result, an advantageously cost-effective embodiment of the vegetation monitoring system and/or a vegetation monitoring device can be enabled. Preferably, the at least one input prompt is transmitted to the output device and/or to the external device, such as a smartphone, a smartwatch, a computer or the like, associated in particular with the user, by means of the at least one communication unit. In particular, the at least one input prompt is generated such that an acoustic, visual, and/or haptic signal is output via the output device and/or the external device, which is particularly provided to prompt the user to provide the at least one position parameter of the vegetation monitoring device and/or the at least one position parameter of the at least one light source.

Furthermore, it is proposed that in at least one method step at least one dimension parameters of a reference object within the at least one garden area is provided, in particular captured by the vegetation monitoring device via image data, wherein the at least one position parameter of the vegetation monitoring device is determined as a function of the at least one dimension parameter of the reference object. Advantageously simple and at the same time accurate determination of the position parameters of the vegetation monitoring device and/or the position parameters can be achieved. A determination of the position parameters of the vegetation monitoring device and/or the position parameters may be advantageously enabled independent of data of an external unit and/or a user, for example a global position, or the like. It may be advantageously possible to carry out the method by means of the vegetation monitoring device and/or the vegetation monitoring system. The term "dimension parameter" is in particular to be understood to mean a parameter of an object, in particular the reference object, which describes a dimension, in particular dimensions, such as a main longitudinal extension, a main transverse extension, or the like, or a three-dimensional shape of the object. Preferably, the at least one dimension parameter of the reference object is captured via the image data. Preferably, a size of a detection range of the at least one garden area captured via the image data is stored. In particular, the at least one dimension parameter for determining the at least one position parameter of the vegetation monitoring device is compared with a stored absolute dimension parameter of the reference object, which in particular describes a distance-independent embodiment of the reference object. It is conceivable that a plurality of absolute dimension parameters of the reference object are provided, preferably as a function of an orientation of the reference object to a viewer. It is conceivable that the reference object is configured as a different device and/or device of the vegetation monitoring system, for example as a detection element of the at least one detection unit, as the at least one vegetation maintenance device, or the like. For example, a chair is captured in the at least one garden area, wherein in particular at least one dimension parameter configured as a height of the chair is captured. In particular, by calibrating the height of the chair captured via the image data by means of an absolute dimension parameter configured as the actual height of the chair, in particular together with a known detection angle of the vegetation monitoring device, it is possible to estimate a position parameter of the vegetation monitoring device configured as the distance of the at least one garden area, in particular the position of the at least one garden area in which the reference object was captured, to the vegetation monitoring device. Preferably, a position parameter of the at least one garden area, in particular an orientation of a surface of the at least one garden area on which the reference object is arranged, can be determined as a function of the at least one captured dimension parameter of the reference object.

In addition, it is proposed that in at least one method step, the captured image data is integrated into at least one output signal for transmission to an external device, wherein, in at least one further method step, at least one input signal of the external device is processed, which, in particular based on the transmitted image data, provides the position parameter of the vegetation monitoring device and/or the position parameter of the light source. Advantageously fast and simple but simultaneously provision of the position parameter of the vegetation monitoring device and/or the position parameter of the light source for the individual configuration of the garden captured via the image data can be achieved. An advantageously low computing power requirement of a vegetation monitoring system and/or a vegetation monitoring device for carrying out the method can be realized. As a result, an advantageously cost-effective embodiment of the vegetation monitoring system and/or a vegetation monitoring device can be enabled. The at least one output signal and/or the at least one input signal are each configured as electrical and/or electronic signals. Preferably, the at least one position parameter of the vegetation monitoring device and/or the at least one position parameter of the at least one light source is determined as a function of the captured image data by means of the external device, for example a server, a machine learning system, for example an artificial neural network, a computer, or the like. Preferably, the at least one output signal is generated with the image data by means of the at least one computing unit. Preferably, the at least one output signal is transmitted from the vegetation monitoring system, in particular the at least one computing unit, to the external device by means of the at least one communication unit. Preferably, the at least one input signal is processed by means of the at least one computing unit and/or the at least one communication unit. In particular, the at least one input signal is received from the external device by means of the at least one communication unit. It is conceivable that to determine the at least one position parameter of the vegetation monitoring device and/or the at least one position parameter of the at least one light source by means of the external device, further data of the vegetation monitoring system, in particular of the detection unit, are used, which are in particular integrated into the at least one output signal, and/or further data from other systems and/or devices, in particular from other gardens and/or garden areas.

Furthermore, it is proposed that in at least one method step, the at least one position parameter of the vegetation monitoring device and/or the at least one position parameter of the at least one light source is determined based on the image data by means of a machine learning method, which in particular uses additional image data provided by at least one external device and/or an external system. An advantageously accurate determination of the position parameters of the vegetation monitoring device and/or the light source can be achieved. Preferably, to determine the at least one position parameter of the vegetation monitoring device and/or the at least one position parameter of the at least one light source, further image data and/or position parameters of the vegetation monitoring device and/or position parameters of the at least one light source determined from the further image data are used by the external device and/or external systems in addition to the image data acquired via the vegetation monitoring device. Preferably, the machine learning method is carried out by means of the at least one computing unit and/or by means of other external devices and/or systems, for example via a machine learning system, in particular an artificial neural network, a network, a server, or the like. In particular, image data and/or position parameters of the vegetation monitoring device determined via the image data and/or position parameters of the at least one light source are transmitted to the at least one external device and/or external system by means of the at least one computing unit and/or the at least one communication unit in order to carry out the machine learning method. It is conceivable that, in order to determine the at least one position parameter of the vegetation monitoring device and/or the at least one position parameter of the at least one light source, limit values, weighting factors, patterns to be detected, or the like, determined by the machine learning method are transmitted from the at least one external device and/or external system to the at least one computing unit for an evaluation of captured image data.

In addition, a method for determining a vegetation index in at least one garden area of a garden is proposed, which comprises the following method steps:

providing image data of the at least one garden area of the garden captured by the at least one vegetation monitoring device, providing at least one orientation parameter of the at least one garden area describing an orientation of the garden area relative to a main viewing direction of the vegetation monitoring device, determining at least one vegetation index of the at least one garden area as a function of the image data and the at least one orientation parameter.

It is conceivable that the method for determining a vegetation index for the garden can be configured as a purely computer-implemented method and can in particular be executed by means of the at least one computing unit. The term "main viewing direction" of the vegetation monitoring device is in particular to be understood to mean a straight direction extending within a central axis of a detection range of the camera unit of the vegetation monitoring device, which faces away from the camera unit towards the at least one garden area to be captured. It is conceivable that the at least one garden area comprises at least partially an orientation that is differently oriented relative to the main viewing direction of the vegetation monitoring device, for example an overgrown slope. In particular, the at least one vegetation index of the at least one garden area is determined in each area as a function of the orientation relative to the main viewing direction of the vegetation monitoring device, in particular the at least one orientation parameter. In particular, it is conceivable that a plurality of orientation parameters and/or values of the orientation parameter are provided for the at least one garden area. Alternatively, it is conceivable that each garden area of the garden, in particular the garden area to be monitored, has an at least substantially identical orientation relative to the main viewing direction of the vegetation monitoring device and/or the inclination relative to a horizontal line over a main extension of the respective garden area. Preferably, the garden captured by means of the vegetation monitoring device, in particular the camera unit, preferably via the at least one garden area, is divided into garden areas as a function of an orientation relative to the main viewing direction of the vegetation monitoring device and/or of an inclination of a surface relative to a horizontal line, in particular by means of the at least one computing unit. Alternatively or additionally, it is conceivable that for at least one garden area, an orientation parameter averaged over an entire surface of the at least one garden area is provided. For example, the at least one orientation parameter is configured as an inclination angle of a surface of the at least one or the respective garden area relative to a horizontal line, to the main viewing direction of the vegetation monitoring device and/or to a main extension plane of the garden or the at least one garden area, or the like.

Preferably, the at least one orientation parameter is determined by the at least one computing unit, in particular as a function of the captured image data and/or further data captured via the vegetation monitoring system, in particular the at least one detection unit and/or the vegetation maintenance device, or provided by means of an external unit and/or a user. It is also conceivable that information is provided by means of an external unit and/or a user, via which the at least one orientation parameter for the at least one garden area can be determined, for example via a virtual map of the garden and/or the garden area(s) of the garden.

Preferably, the method is provided to enable monitoring and maintenance of a health of the garden via the determination of the vegetation index, in particular the determination of a temporal progression of the vegetation index. Preferably, the method is provided to enable a vegetation of the garden to be maintained by determining the vegetation index, in particular by determining the temporal progression of the vegetation index, in particular by controlling a vegetation maintenance device as a function of the determined vegetation index. It is conceivable that the at least one orientation parameter of the at least one garden area is determined as a function of the at least one position parameter of the vegetation monitoring device, at least one position parameter of the at least one light source and/or the at least one position parameter of the at least one garden area. It is conceivable that the at least one position parameter of the at least one garden area comprises the at least one orientation parameter of the at least one garden area. In particular, it is conceivable that the at least one position parameter of the vegetation monitoring device comprises the main viewing direction of the vegetation monitoring device. In particular, it is conceivable that a position parameter of the vegetation monitoring device can be provided via the at least one orientation parameter.

By configuring the method, an advantageously reliable and accurate determination of the vegetation index can be made possible, in particular taking into account the orientation of the garden area relative to the camera capturing the image data, which can affect a determined value of the vegetation index. Preferably, a viewing angle of an overgrown surface, in particular the garden area, affects the determination of the vegetation index, in particular as a vegetation density is captured differently under different viewing angles. By taking into account the orientation of the garden area when determining the vegetation index, an advantageously reliable and accurate assessment of a vegetation health of the garden can be achieved. It is advantageous to be able to create a reliable and dependable temporal progression with regard to the development of vegetation health. In particular, values of the vegetation index for different inclined garden areas relative to the camera unit may be advantageously compared with one another.

Furthermore, it is proposed that in at least one method step, a distance of the vegetation monitoring device to the at least one garden area and a mounting height of the vegetation monitoring device relative to the ground is provided, wherein the main viewing direction of the vegetation monitoring device, in particular for determining the at least one orientation parameter of the vegetation monitoring device, is determined as a function of the distance of the vegetation monitoring device to the at least one garden area and of the mounting height of the vegetation monitoring device relative to the ground. An advantageously simple determination of the orientation parameter of the vegetation monitoring device can be achieved, in particular as the distance of the vegetation monitoring device to the garden area and the mounting height of the vegetation monitoring device can be easily determined or measured. In particular, the main viewing direction of the vegetation monitoring device is determined via a trigonometric function from the distance of the vegetation monitoring device to the at least one garden area and the mounting height of the vegetation monitoring device relative to the ground. Preferably, the distance of the vegetation monitoring device to the at least one garden area is determined from the captured image data, for example via a reference object captured in or at the at least one garden area. Alternatively or additionally, it is conceivable that the distance of the vegetation monitoring device to the at least one garden area is determined as a function of further data captured via the vegetation monitoring system, in particular the at least one detection unit and/or the at least one vegetation maintenance device. For example, it is conceivable that the vegetation monitoring device is detected by means of the at least one detection unit and/or the at least one vegetation maintenance device from the at least one garden area and/or is detected by means of the vegetation monitoring device within the at least one garden area as a reference object, wherein in particular additional data of the captured detection unit and/or vegetation maintenance device can be used to determine the distance of the vegetation monitoring device to the at least one garden area. Alternatively or additionally, it is conceivable that the distance of the vegetation monitoring device to the at least one garden area is provided by an external unit and/or a user or is determined via data from an external unit, for example a virtual map of the garden, which in particular comprises the at least one garden area. Preferably, the mounting height of the vegetation monitoring device relative to the ground is stored by a user during mounting of the vegetation monitoring device. For example, it is conceivable that the vegetation monitoring device is configured or localized in the garden by the user during mounting or commissioning using a configuration procedure. Alternatively, it is conceivable that the mounting height of the vegetation monitoring device relative to the ground is captured and/or determined by means of the vegetation monitoring device, the detection unit, the vegetation maintenance device, and/or another device of the vegetation monitoring system. For example, it is conceivable that the detection unit and/or the vegetation maintenance device capture the vegetation monitoring device from the garden and/or the at least one garden area, and, for example using a triangulation method or the like, determine the mounting height of the vegetation monitoring device and/or transmit captured data to the at least one computing unit to determine the mounting height of the vegetation monitoring device by means of the at least one computing unit.

In addition, it is proposed that in at least one method step, an orientation of the at least one garden area is provided relative to a horizontal plane, wherein the at least one orientation parameter is determined as a function of the orientation of the at least one garden area relative to the horizontal plane. A determination of the orientation parameter can advantageously be enabled by a detection of an inclination of the respective garden area. Preferably, the orientation of the at least one garden area relative to the horizontal plane is captured by means of a device of the vegetation monitoring system arranged in the at least one garden area, for example, a detection element of the detection unit and/or the at least one vegetation maintenance device, and/or determined via an external unit, for example by means of a virtual map of the garden, in particular the at least one garden area, provided by the external unit. For example, it is conceivable that the device of the vegetation monitoring system, in particular the detection element of the detection unit and/or the at least one vegetation maintenance device, captures the orientation of the at least one garden area relative to the horizontal plane by means of an inclinometer in the at least one garden area and in particular transmits it to the at least one computing unit. Alternatively or additionally, it is conceivable that the device of the vegetation monitoring system, in particular the detection element of the detection unit and/or the at least one vegetation maintenance device, is captured via the vegetation monitoring device, in particular the at least one camera unit, in the at least one garden area, wherein preferably the orientation of the at least one garden area relative to the horizontal plane is determined from the captured image data as a function of a position of the device in space. In particular, the shape and/or dimensions of the device are stored in the at least one computing unit, wherein preferably the location of the device in the at least one garden area for determining the orientation of the at least one garden area relative to the horizontal plane is determined by comparing a shape and/or size of the device in the captured image data to a stored shape and/or dimension of the device. The term "orientation of the garden area relative to a horizontal plane" is in particular to be understood to mean an inclination angle between the horizontal plane and a surface of the at least one garden area and/or a main extension plane of a maximum surface of the at least one garden area.

Furthermore, it is proposed that in at least one method step, a mounting angle of the vegetation monitoring device is provided, wherein the main viewing direction of the vegetation monitoring device, in particular to determine the at least one orientation parameter, is determined as a function of the mounting angle of the vegetation monitoring device. An advantageously simple and direct determination of the orientation parameter can be made possible, in particular as the mounting angle of the vegetation monitoring device can be obtained by capturing a mounting object, such as a wall or a post, or by measuring or specifying the mounting angle via a user. The mounting angle of the vegetation monitoring device is preferably determined by means of the at least one computing unit from captured image data, stored by a user during mounting of the vegetation monitoring device and/or determined as a function of data captured by other devices of the vegetation monitoring system, in particular a detection element of the detection unit and/or the at least one vegetation maintenance device. For example, the mounting angle is determined as a function of an arrangement of a known reference object in the captured image data. Alternatively or additionally, it is conceivable that the vegetation monitoring device or directly the mounting angle of the vegetation monitoring device is captured by a device of the vegetation monitoring system, in particular the detection element of the detection unit and/or the at least one vegetation maintenance device, and in particular transmitted to the at least one computing unit. Preferably, the mounting angle of the vegetation maintenance device corresponds to an angle between the main viewing direction of the vegetation maintenance device and a vertical line.

Furthermore, it is proposed that in at least one method step, at least one reference object, in particular at least one orientation parameter and/or at least one dimension parameter of a reference object, is identified in the at least one garden area based on the image data, wherein an orientation of the at least one garden area relative to a horizontal line, the main viewing direction of the vegetation monitoring device and/or the orientation parameter is determined as a function of the reference object, in particular the orientation parameter and/or the dimension parameter of the reference object. It may be advantageously possible to carry out the method by means of the vegetation monitoring device or the vegetation monitoring system. It may be advantageously possible to determine the orientation parameter independent of external data and/or independent of an external unit.

In addition, it is proposed that in at least one method step, the at least one orientation parameter is determined as a function of an input signal transmitted from an external device or a device of a vegetation monitoring system, which in particular comprises an orientation of the at least one garden area, a position of the vegetation monitoring device, and/or an orientation of the vegetation monitoring device. Advantageously fast and automatic determination of the orientation parameter can be achieved, in particular as the vegetation monitoring device can typically be captured from a large proportion of the garden. An advantageous high level of automation can be achieved. An advantageously high level of user-friendliness can be achieved, in particular as the orientation parameter can be captured without the intervention of a user and/or without observing a special mounting angle, or the like.

Furthermore, it is proposed that in at least one method step, at least two images captured in different positions of the vegetation monitoring device are provided via the image data, wherein the distance of the vegetation monitoring device to the at least one garden area is determined by means of a triangulation method as a function of the at least two images. A determination of the orientation parameter can advantageously be made independent of external data and/or an external unit. Preferably, the method can be advantageously carried out by means of the vegetation monitoring device. Preferably, in an embodiment in which the at least one camera unit is configured to be movable, in particular driven, it is conceivable that the camera unit is moved to the two different positions of the vegetation monitoring device, in particular via a control of the actuation unit by the at least one computing unit, in order to capture the at least two images. Alternatively, it is conceivable that the two images are each captured by means of one of two vegetation monitoring devices spaced apart from each other in or at least one garden area. In particular, the positions of the two vegetation monitoring devices in at least one garden area and/or relative to one another are stored. Preferably, to determine the distance of the vegetation monitoring device(s) to the at least one garden area, distinctive comparison points are identified in each of the two images by means of the triangulation method and a position in the at least one garden area and/or a distance of the comparison points relative to each other is captured. The distance of the vegetation monitoring device(s) to the at least one garden area can then preferably be determined as a function of a distance and a direction between the two positions of the vegetation monitoring device in which the images have been captured. Alternatively, the distance of the vegetation monitoring device(s) to the at least one garden area from the two captured images is determined by means of an optical odometry method, for example as used with vacuum robots, or the like.

Furthermore, it is proposed that in at least one method step, the distance of the vegetation monitoring device to the at least one garden area and/or the mounting height of the vegetation monitoring device relative to the ground is determined by means of at least one, in particular mobile, device of a vegetation monitoring system with a camera, in particular a detection element, the detection unit and/or the at least one vegetation maintenance device, wherein the vegetation monitoring device is captured by the camera and localized relative to the device. Advantageously fast and automatic determination of the orientation parameter can be achieved, in particular as the vegetation monitoring device can typically be captured from a large proportion of the garden. An advantageous high level of automation can be achieved. An advantageously high level of user-friendliness can be achieved, in particular as the orientation parameter can be captured without the intervention of a user and/or without observing a special mounting angle, or the like.

Preferably, a position of the device of the vegetation monitoring system in the garden and/or in the at least one garden area is determined at least substantially simultaneously with a detection of the vegetation monitoring device, in particular the distance of the vegetation monitoring device and/or the mounting height of the vegetation monitoring device. Particularly preferably, the vegetation monitoring device is captured by means of the device of the vegetation monitoring system from the at least one garden area, wherein in particular the device is arranged in the at least one garden area when captured. Alternatively, it is conceivable that a captured position of the device is determined relative to the at least one garden area at a time when the vegetation monitoring device is captured by the device. It is conceivable that the position of the device in the garden and/or in the at least one garden area is determined by means of the vegetation monitoring device via captured image data or by means of a positioning system of the device. In particular, it is conceivable that a position of devices of the vegetation monitoring system in or at the at least one garden area, in particular relative to one another, is determined via the at least one communication unit, for example via radio waves, Bluetooth, ultra-wideband technology (UWB) or the like. Alternatively or additionally, it is conceivable that a position of devices of the vegetation monitoring system in or at the at least one garden area, in particular relative to one another, is determined via a satellite-based position detection system, for example GPS or Galileo.

It is also proposed that in at least one method step, at least one input prompt for a user to enter the mounting height of the vegetation monitoring device relative to the ground is generated. Advantageously quick and easy determination of the orientation parameter can be achieved, in particular as the mounting height can be predefined directly by the user. Advantageously, inaccuracies can be prevented by technical means for capturing the mounting height. At the same time, an advantageously cost-effective vegetation monitoring device and/or an advantageously cost-effective vegetation monitoring system for determining the orientation parameter can be provided. Preferably, the at least one input prompt is generated by means of the at least one computing unit. Preferably, the at least one input prompt is transmitted to a/the output device of the vegetation monitoring system and/or to an external device, such as a smartphone, a smartwatch, a computer or the like, associated in particular with the user, by means of the at least one communication unit. In particular, the at least one input prompt is generated such that an acoustic, visual, and/or haptic signal is output via the output device and/or the external device, which is particularly provided to prompt the user to provide the mounting height of the vegetation monitoring device relative to the ground.

Furthermore, a method for determining the health of at least one garden area of a garden by determining a garden health parameter comprising the following method steps is proposed:

providing at least one value of a vegetation index for the at least one garden area of the garden, providing at least one value of at least one environmental parameter, in particular an environmental parameter of the at least one garden area, wherein the value of the environmental parameter is associated with the value of the vegetation index over a capture period, determining a value of the garden health parameter for the at least one garden area as a function of the provided vegetation index and the at least one provided environmental parameter using a machine learning system, in particular an artificial neural network, which is trained to determine a value of the garden health parameter from a plurality of predefined values of the garden health parameter as a function of the at least one vegetation index and the at least one, in particular a plurality of, environmental parameter(s).

It is conceivable that the method for determining the health of the at least one garden area by determining the garden health parameter can be configured as a purely computer-implemented method and can in particular be executed by means of the at least one computing unit. Preferably, the value of the garden health parameter is determined as a function of at least one determined temporal progression of the vegetation index for the at least one garden area. Preferably, in at least one method step, prior to determining the value of the garden health parameter, the at least one determined temporal progression of the vegetation index is determined based on provided values of the vegetation index. The term "garden health parameter" is in particular to be understood to mean a parameter that describes the health of the garden or of the at least one garden parameter, wherein the health of certain predefined plants/vegetation types in the garden areas to be captured are taken into account. It is conceivable that the health parameter is only specified for one or more plant/vegetation types in the garden areas of the garden to be captured, for example for lawns and/or meadows, in particular certain varieties of grass. The garden health parameter preferably has at least two, preferably a plurality of, different possible values, which are in particular each configured as a numerical value on a scale. It is conceivable that each possible value of the garden health parameter is associated with a word or phrase describing the health state of the garden, in particular the garden areas and/or the respective plants and/or vegetation types, preferably when output to a user. The various possible values of the garden health parameter are stored in particular, preferably in the at least one computing unit. Preferably, the method for assessing the health of the garden is carried out by determining the at least one garden health parameter, in particular at least in part, by means of the at least one computing unit, which is preferably part of the machine learning system.

In particular, image data of the at least one garden area is captured to determine or provide the at least one value of the vegetation index. Preferably, the at least one value of the vegetation index for the at least one garden area is determined, in particular by means of the at least one computing unit. The at least one environmental parameter is preferably provided by means of the vegetation monitoring device, the at least one detection unit, the at least one vegetation maintenance device and/or another device of the vegetation monitoring system and/or provided by means of an external unit. It is conceivable that a plurality of differently configured environmental parameters are provided to determine the garden health parameter. By the fact that at least one value of the at least one environmental parameter is "related to the garden area", it should be understood in particular that the value of the environmental parameter was captured in or at the garden area and/or is approximately valid for the garden area, for example if the environmental parameter is designed as the amount of precipitation or solar time, which can each be regarded as valid for a larger area around the garden area and do not necessarily have to be captured directly in or at the garden area. Particularly preferably, the at least one value of the at least one environmental parameter is captured in or at the at least one garden area and/or determined from data captured in or at the at least one garden area. For example, the at least one environmental parameter is defined as a lighting of the at least one garden area, in particular as a illumination parameter, as a temperature, as an air pressure, as an air or ground moisture, as a time of day/time, as a global position of the at least one garden area, in particular in the form of an IP address of a device of the vegetation monitoring system, of GPS coordinates or the like, as an orientation, in particular the main viewing direction, of the vegetation monitoring device, in particular the camera unit, as a mounting angle, in particular a viewing angle of the camera unit, as a position parameter or an orientation parameter of the at least one garden area, as a position parameter of at least one light source illuminating the at least one garden area, or the like. The fact that "the value of the environmental parameter is associated with the value of the vegetation index over a capture period" is to be understood in particular to mean that the value of the at least one environmental parameter or captured data used to determine the value of the at least one environmental parameter and the value of the vegetation index, preferably captured image data of the at least one garden area used to determine the value of the vegetation index, have an at least substantially similar, in particular at least substantially identical, capture period and/or at least partially, in particular at least for the most part, overlapping capture periods.

The machine learning system is preferably configured as an artificial neural network, in particular a convolutional neural network (CNN). Preferably, a value of the garden health parameter determined by means of the machine learning system in each case for a specific predefined determination period, wherein in particular values of the vegetation index and of the at least one environmental parameter used to determine a value of the garden health parameter, in particular captured data used to determine the individual values of the vegetation index and the at least one environmental parameter, are captured within the determination time or determination period. It is conceivable that the value of the garden health parameter is determined at the determination time or within the determination period or after the determination time or determination period. It is conceivable that precisely one value of the garden health parameter is determined for all captured garden areas of the garden, that a value of the garden health parameter is determined for a selection of one or more garden areas of the garden, or that a value of the garden health parameter is determined for individual garden areas of the garden.

The embodiment of the method according to the invention makes it possible to determine the garden health parameter advantageously automatically and at the same time accurately, in particular as a function of a plurality of different parameters. In particular, an advantageous situational and environmental assessment of the health of the garden can be achieved. Preferably, a vegetation health can be advantageously taken into account via the vegetation index. By using a trained machine learning system, an advantageously high amount of captured data can be taken into account as the basis for an assessment of a health of the garden, which can occur in particular independently of specific particulars of the respective garden.

Furthermore, it is proposed that in at least one method step, a plurality of values for the vegetation index and the at least one environmental parameter of a plurality of different garden areas and/or for a plurality of different capture periods or capture times are provided and taken into account when determining the garden health parameter. An advantageously accurate determination of the garden health parameter can be achieved. Preferably, a temporal progression of the vegetation index is provided and taken into account when determining the garden health parameter by means of the machine learning system. In particular, it is conceivable that the temporal progression of the vegetation index comprises values of the vegetation index that are outside of the determination period for determining the garden health parameter. Preferably, at least one value of the vegetation index from the temporal progression of the vegetation index is within the determination period. In particular, the determination period represents a time period within which the machine learning system determines the value of the garden health parameter. Alternatively or additionally, it is conceivable that at least one temporal progression of the at least one environmental parameter is provided and taken into account when determining the garden health parameter by means of the machine learning system. In particular, it is conceivable that the temporal progression of the at least one environmental parameter comprises values of the at least one environmental parameter that are outside the determination period for determining the garden health parameter. Preferably, at least one value of the at least one environmental parameter from the temporal progression of the at least one environmental parameter is within the determination period. It is conceivable that values for the vegetation index and/or the at least one environmental parameter are each provided for one of a plurality of different garden areas 35 and used to determine the garden health parameter, wherein in particular the value of the garden health parameter is determined for the different garden areas together or for the entire garden, in particular all the garden areas that can be captured.

In addition, it is proposed that in at least one method step a plurality of values for the vegetation index and the at least one environmental parameter of several different garden areas of the garden are provided, wherein at least one value of the garden health parameter is determined separately for each of these garden areas to assess the health of the garden areas. An advantageously evaluation of a health of the garden can be carried out in areas. This makes it advantageously possible to initiate measures to improve the health of the garden quickly and purposefully in individual garden areas for which a comparatively low value of the garden health parameter has been determined. Preferably, at least one value of the vegetation index determined for the respective garden area is used to determine the garden health parameter for the individual garden areas. In particular, it is conceivable that a plurality of values of the vegetation index is determined for each of the garden area(s). In addition, it is conceivable that an average value, a maximum value or a minimum value of the plurality of determined values of the vegetation index is determined for the garden area(s) to determine the garden health parameter, which is in particular used by the machine learning system to determine the garden health parameter as a value of the vegetation index. In particular, it is conceivable that the method for assessing a health of the garden areas is carried out separately by determining at least one garden health parameter for each captured garden area of the garden, wherein in particular a value of the garden health parameter is determined for each of the garden areas of the garden.

Furthermore, it is proposed that in at least one method step, the garden health parameters are determined as one of at least four different values indicative of the health of the garden. Advantageously, many categories for assessing the health of the garden can be realized. As a result, an advantageously detailed assessment of the health of the garden can be achieved. In addition, an advantageously step-by-step catalog of measures for improving the health of the garden, in particular individual garden areas, can be made possible in response to the individual values of the garden health parameter. As a result, advantageously efficient maintenance of the garden, in particular individual garden areas, can be made possible depending on a determined value of the garden health parameter. Alternatively, it is conceivable that the at least four different values are stored and selected as a function of a determined value of the garden health parameter and the value ranges of the garden health parameter associated with the individual values. In particular, a value of the stored values is selected if the determined value of the garden health parameter is within the value range of the garden health parameter associated with the respective value. Preferably, the at least four different values are classified according to a scale or within a value range, wherein in particular the health of the at least one garden area can be evaluated using the at least four different values. For example, the four different values of the garden health parameter are specified in an unambiguous order, for example "1, 2, 3, 4", or have an assignable ascending nomenclature, for example "poor, neutral, good, very good".

Furthermore, it is proposed that in at least one method step for determining the garden health parameter, at least one individual determination parameter, in particular weighting factor, for the vegetation index and/or for the at least one environmental parameter is taken into account. It may be advantageously possible to take into account differently configured contributions of individual parameters to the health of the garden when determining the garden health parameter. Preferably, at least one individual determination parameter for the value of the vegetation index and/or for the value(s) of the environmental parameter(s) is taken into account to determine the garden health parameter. Preferably, a determination parameter stored in the trained machine learning system is used to determine the garden health parameter for values of the vegetation index and the at least one environmental parameter to be taken into account, in particular for a different consideration, in particular a weighting, of the respective value of the vegetation index or the respective environmental parameter when determining the garden health parameter. In particular, each value of the vegetation index and the at least one environmental parameter to be taken into account for determining the garden health parameter is associated with exactly one determination parameter, in particular a weighting factor, by means of the machine learning system.

In addition, it is proposed that in at least one method step, when determining the garden health parameter, the parameters for determining the garden health parameter, in particular the vegetation index and the at least one environmental parameters, are weighted against each other in at least two successive consecutive steps, which in particular each comprise a plurality of nodes of the machine learning system. An advantageously accurate determination of the garden health parameter can be achieved. In addition, different combinations of individual parameters can be weighted against each other in different consecutive steps depending on their weighting. As a result, additional consideration of a relevance of individual parameters for assessing the health of the garden can advantageously be enabled. Preferably, the values of the vegetation index and the at least one environmental parameter used to determine the garden health parameter are weighted against each other in the at least two consecutive steps using a determination parameter, in particular the weighting factor associated with the values. In particular, two of the values of the vegetation index and the at least one environmental parameter used to determine the garden health parameter are compared with one another in a node of the machine learning system. Preferably, two consecutive steps are followed by an output step in which, in particular, a value of the garden health parameter is determined.

It is further proposed that in at least one method step at least one temperature parameter, which can be associated with the at least one garden area or an environment of the at least one garden area, is provided as an environmental parameter and taken into account when determining the garden health parameter. Advantageously, an influence of an environmental temperature for assessing the health of the garden can be taken into account. In particular, the temperature parameter describes an environmental, ground and/or air temperature of the at least one garden area or the environment of the at least one garden area. Preferably, the temperature parameter is provided by means of the at least one detection unit and/or an external unit.

It is further proposed that in at least one method step, at least one air pressure parameter, which can be associated with the at least one garden area or an environment of the at least one garden area, is provided as an environmental parameter and taken into account when determining the garden health parameter. Advantageously, an influence of the air pressure for assessing the health of the garden can be taken into account. In particular, the air pressure parameter describes an air pressure within the at least one garden area or in the environment of the garden. Preferably, the air pressure parameter is provided by means of the at least one detection unit and/or an external unit.

In addition, it is further proposed that in at least one method step at least one humidity parameter, which can be associated with the at least one garden area or an environment of the at least one garden area, is provided as an environmental parameter and taken into account when determining the garden health parameter. Advantageously, an influence of the humidity for assessing the health of the garden can be taken into account. The humidity parameter particularly describes a humidity of the ground of the garden area or a humidity within the at least one garden area or in the environment of the garden. Preferably, the humidity parameter is provided by means of the at least one detection unit and/or an external unit.

Furthermore, it is proposed that in at least one method step, at least one capture time of the vegetation index, in particular a capture time of captured image data used to determine the value of the vegetation index, and at least one capture time of the at least one environmental parameter are provided as additional parameters for determining the garden health parameter. It may be advantageously possible to take into account an influence of environmental conditions at a time of capture of the vegetation index and/or the environmental parameter, which may in particular affect the captured values of the vegetation index and/or the environmental parameter, in order to assess the health of the at least one garden area. Preferably, the capture time is provided from the vegetation index or the captured image data used to determine the value of the vegetation index by means of the at least one camera unit. Preferably, the capture time of the at least one environmental parameter is provided by means of an external unit or a unit that captures the respective environmental parameter.

It is also proposed that in at least one method step, at least one orientation parameter of a vegetation monitoring device configured to capture image data to determine the vegetation index is provided and taken into account when determining the garden health parameter. It may be advantageous to take into account an influence of the orientation of the vegetation monitoring device on a value of the vegetation index to assess the health of the at least one garden area. Preferably, the at least one orientation parameter of the vegetation monitoring device describes an orientation and/or a position of the vegetation monitoring device in space when capturing the image data. In particular, the at least one orientation parameter of the vegetation monitoring device is configured as the position parameter of the vegetation monitoring device, as the mounting angle/inclination angle of the vegetation monitoring device, in particular the at least one camera unit, as the main viewing direction of the vegetation monitoring device, in particular the at least one camera unit, as the global position of the vegetation monitoring device and/or as the orientation of the vegetation monitoring device, in particular of the at least one camera unit, or at least partially comprises these.

Furthermore, it is proposed that in at least one method step, at least one, in particular the aforementioned, orientation parameter of the at least one garden area is provided as the environmental parameter and is taken into account when determining the garden health parameter. It may be advantageous to take into account an influence of the inclination of a garden area relative to the vegetation monitoring device on a value of the vegetation index to assess the health of the at least one garden area. Preferably, the orientation parameter of the at least one garden area is weighted as an environmental parameter in at least one subsequent step with the value of the vegetation index and/or with the temporal progression of the vegetation index.

Furthermore, it is proposed that in at least one method step, a global position of the at least one garden area and a time of the year to which the parameters, in particular the vegetation index and the environmental parameter(s), can be associated over a respective capture period are provided and taken into account when determining the garden health parameter. Advantageously an influence of weather effects, a position of the sun and/or other events that can be associated with the position and/or the time can be taken into account on an assessment of the health of the at least one garden area and/or on a vegetation index value to be taken into account to assess the health of the at least one garden area.

In addition, a method for training a machine learning system, in particular the aforementioned machine learning system, in particular an artificial neural network, is proposed, wherein the machine learning system is configured to carry out the method for determining the health of the garden by determining a garden health parameter, wherein the method comprises the following method steps:

providing training data comprising a plurality of values of the vegetation index from a plurality of different garden areas and/or from a plurality of different gardens, as well as a plurality of values for each environmental parameter to be taken into account when determining the garden health parameter, wherein each value of the environmental parameter(s) can be associated or is associated over a capture period of at least one of the provided values of the vegetation index, providing training output data comprising at least one value of the garden health parameter for each associated set of values of the vegetation index and the environmental parameter(s) included in the training data, training of the machine learning system, wherein at least one value of the garden health parameter associated with the extracted values and provided via the training output data is determined as a function of values for the vegetation index and the environmental parameter(s) extracted from the training data, wherein at least one determination parameter of the machine learning system is adapted such that the machine learning system determines the respectively associated training output data on the basis of the at least one determination parameter and the training input data provided.

Preferably, in at least one method step, in particular when training the machine learning system, at least one determination parameter configured as a weighting factor is determined, which is applied to a value obtained from the training data, wherein in particular the at least one determination parameter configured as a weighting factor is stored for determining a garden health parameter. The term "determination parameter" is in particular to be understood to mean a parameter which is used by means of the machine learning system, in particular the artificial neural network, to determine the garden health parameter or to determine a value of the garden health parameter provided via the training output data. In particular, the at least one determination parameter is configured as a weighting factor, a bias, or a threshold value of the machine learning system.

Preferably, the method for training the machine learning system is carried out at least once prior to the method for determining the health of the garden by determining the garden health parameter. In particular, it is conceivable that the method of training the machine learning system is carried out periodically between a repeated execution of the method for determining the health of the garden, wherein in particular determined values of the garden health parameter are used as training output data and/or values of the vegetation index and of the at least one environmental parameter used to determine the garden health parameter as training data. In particular, the method for training the machine learning system is carried out by means of the at least one computing unit and/or by means of an external unit, for example a plurality of other vegetation monitoring systems, a server, a network, or the like. Preferably, the training data and/or the training output data are provided at least in part, in particular for the most part, via an external unit.

Preferably, in each case at least one determination parameter, in particular a weighting factor, is determined for the vegetation index and the environmental parameter(s) to be taken into account as a function of at least a value range associated with the respective parameter, in particular the vegetation index or the respective environmental parameter. In particular, for parameters to be used to determine the garden health parameter, in particular the vegetation index, the environmental parameters, at least some or at least one value range of the respective parameter is stored for each of these parameters. Preferably, values of the respective parameter, in particular the vegetation index or the respective environmental parameter, that are within the value range associated with this parameter, are preferably associated with a higher or lower determination parameter, in particular weighting factor, depending on the respective parameter. For example, a higher determination parameter, in particular a weighting factor, is associated with an environmental parameter configured as a temperature if a value of the temperature outside a value range is between, for example, 5° C. and 30° C., as is the case if a value of the temperature is between 5° C. and 30° C. In particular, a value-dependent weighting of the individual parameters can be used to take into account special requirements of vegetation, in particular plants, in the at least one garden area for determining the garden health parameter. It is conceivable that at least one predefined value range is associated with the vegetation index, wherein in particular values of the vegetation index that are outside of the associated value range are associated with a higher or lower determination parameter, in particular weighting factor, for determining the garden health parameter and/or for training the machine learning system. For example, it is conceivable that values of the vegetation index below a limit value and/or below an average value or a minimum value of a temporal progression of the vegetation index are associated with a higher or lower determination parameter, in particular weighting factor, in particular in order to achieve a negative assessment of the health of the garden.

The design of the method according to the invention makes it possible to train the machine learning system advantageously efficiently for determining the garden health parameter. It may be advantageously possible to train the machine learning system between an active use in a garden, in particular as data collected therein can additionally be used as training data. In particular, an assessment of a determined garden health parameter can be derived from a determined temporal progression of the vegetation index. As a result, additional user interaction for training of the machine learning system may be dispensed with.

Furthermore, it is proposed that the method comprises the following method steps:

providing at least one user evaluation for determined values of the garden health parameter and/or for a value of a determined parameter, in particular a weighting factor, adapting at least one determined value of the garden health parameter associated and/or stored with the determination parameter evaluated via the user evaluation, as a function of the user evaluation.

Advantageously intuitive individual adaptation of the machine learning system can be achieved by a user. It is advantageously simple to integrate user interaction into the training of the machine learning system. Preferably, when training the machine learning system and/or determining the garden health parameter, a user evaluation is requested and/or provided for each determined values of the garden health parameter. Preferably, the user evaluation is provided via the at least one communication unit and/or an input device of the vegetation monitoring system. It is conceivable that the at least one computing unit is provided to request a user evaluation for determined values of the garden health parameter and/or for a particular value of a specific determination parameter, in particular via the at least one communication unit and/or the output device. Preferably, the user evaluation is provided to evaluate the respective determined value of the garden health parameter and/or the respective determined value of the determination parameter as positive or negative. Preferably, the user is provided with exactly two evaluation options for entering the user evaluation, preferably by means of the at least one computing unit, for a determined value of the garden health parameter and/or a specific value of the determination parameter. In particular, the at least one stored determination parameter is only adjusted, in particular by means of the at least one computing unit, if the user evaluation for the determined parameter and/or for a determined value of the garden health parameter that can be associated with the determination parameter is negative. In particular, a plurality of determination parameters can be associated with a determined value of the garden health parameter, which in particular are used to determine the value of the garden health parameter via the machine learning system.

In addition, a computing unit, in particular the aforementioned one, which is configured to carry out the method/method steps according to the invention is proposed. The computing unit is preferably configured as part of the vegetation monitoring system. Preferably, the computing unit is configured to carry out the method for evaluating the health of the garden by determining the garden health parameter. The computing unit is preferably configured to carry out the method for training the machine learning system. In particular, the computing unit is configured to carry out one of the methods for determining the vegetation index.

The design according to the invention of the computing unit advantageously enables automated monitoring and/or maintenance of the garden.

Furthermore, a vegetation monitoring system, in particular the aforementioned vegetation monitoring system, is proposed having at least one vegetation monitoring device, which in particular has at least one camera unit for capturing at least one garden area of a garden in at least a first range of the electromagnetic spectrum, in particular in the visible light range, and in at least a second range of the electromagnetic spectrum, in particular in the infrared range, and/or which in particular is provided for an arrangement at least substantially above ground level of the garden and for an at least substantially stationary arrangement within or in the vicinity of the garden, and with at least one computing unit according to the invention.

The embodiment of the vegetation monitoring system according to the invention enables advantageous automated monitoring and/or maintenance of a garden as a function of a vegetation index.

It is also proposed that the vegetation monitoring system comprises at least one light sensor for detecting at least one lighting parameter, preferably one that can be assigned to the aforementioned, in particular to the garden area. An advantageously accurate determination of the vegetation index can be achieved taking into account a lighting of a garden area to be captured independent of an external unit. Preferably, the light sensor is configured as part of the detection unit, the vegetation monitoring device and/or the vegetation maintenance device. Preferably, the at least one light sensor is arranged in or at the at least one garden area. For example, the at least one light sensor is configured as a photocell, as a photomultiplier, as a camera, in particular with CMOS and/or CCD sensors, as a photo-diode, as a phototransistor, or the like.

Furthermore, it is proposed that the vegetation monitoring system comprises at least one artificial light source for lighting at least one garden area of the garden. A determination of the vegetation index can be advantageously enabled independent of light conditions and/or weather effects. Preferably, an advantageously simple determination of the illumination parameter for determining the vegetation index can be achieved, in particular as it can at least for the most part be predefined via the light source. Preferably, the at least one artificial light source is provided for an at least substantially stationary arrangement relative to the at least one garden area. It is conceivable that the at least one artificial light source is configured as part of the vegetation monitoring device or the vegetation maintenance device. Preferably, the at least one artificial light source is provided for an arrangement at least substantially above ground level of the at least one garden area. Preferably, the at least one computing unit is configured to control the at least one artificial light source for lighting the at least one garden area, in particular via at the least one communication unit. For example, the at least one artificial light source is configured as a lamp/luminaire, as a headlight, as garden lighting, as one or more light emitting diode(s) and/or as a laser. Preferably, the at least one artificial light source is provided to illuminate the at least one garden area for determining the vegetation index, preferably at least in the visible range and/or in the infrared or near-infrared range of the electromagnetic spectrum. It is conceivable that the vegetation monitoring system comprises a plurality of artificial light sources, which are in particular distributed in the at least one garden area and/or are provided to illuminate the at least one garden area in different areas of the electromagnetic spectrum.

Furthermore, it is proposed that the at least one computing unit is configured to determine at least one garden health parameter for the at least one garden area, wherein the at least one computing unit is configured to request at least one value of a vegetation index and/or at least one value of an environmental parameter from an external unit to determine the garden health parameter and/or to train a machine learning system. It is possible to take into account data captured from other gardens or other vegetation monitoring systems. An advantageously accurate assessment of the health of the garden can be achieved, in particular as a larger sampling size for determining the garden health parameter and/or for training a machine learning system can detect and compensate for inaccuracies, measurement errors, and/or interference effects of individual parameters if necessary. It is conceivable that the external unit may be configured as part of the machine learning system and/or as another vegetation monitoring system.

In addition, a computer program comprising instructions that, when the computer program is executed by a computing unit, cause the computing unit to execute the method/method steps of the method according to the invention is proposed.

The design of the computer program according to the invention can advantageously enable automated monitoring and/or maintenance of the garden, in particular as a function of a vegetation index.

In addition, a machine readable storage medium with a stored computer program according to the invention is proposed. Preferably, the machine readable storage medium is configured as part of the computing unit.

The design of the machine readable storage medium according to the invention can advantageously enable automated monitoring and/or maintenance of the garden, in particular as a function of a vegetation index.

The vegetation monitoring system according to the invention, the vegetation monitoring device according to the invention, the computing unit according to the invention, the computer program according to the invention, the storage medium according to the invention and/or one of the method(s) according to the invention should not be limited to the application and embodiment described above. In particular, the vegetation monitoring system according to the invention, the vegetation monitoring device according to the invention, the computing unit according to the invention, the computer program according to the invention, the storage medium according to the invention and/or one of the method(s) according to the invention for carrying out a mode of operation described herein may have a number of individual elements, components and units as well as method steps which differs from a number mentioned herein.

Moreover, regarding the ranges of values indicated in this disclosure, values lying within the limits specified hereinabove are also intended to be considered as disclosed and usable as desired.

The vegetation monitoring system according to the invention, the vegetation monitoring device, the computing unit, the computer program, the storage medium and/or the method according to the invention should not be limited to the application and embodiment described above. In particular, for fulfilling a functionality described herein, the vegetation monitoring system according to the invention, the vegetation monitoring device, the computing unit, the storage medium and/or one of the method(s) according to the invention can comprise a number of individual elements, components, units, and method steps that deviates from a number mentioned herein. Moreover, regarding the ranges of values indicated in this disclosure, values lying within the limits specified hereinabove are also intended to be considered as disclosed and usable as desired.

DRAWINGS

Further advantages follow from the description of the drawings hereinafter. Multiple exemplary embodiments of the invention are illustrated in the drawings. The drawings, the description, and the claims contain numerous features in combination. A person skilled in the art will appropriately also consider the features individually and combine them into additional advantageous combinations.

Figure 2:
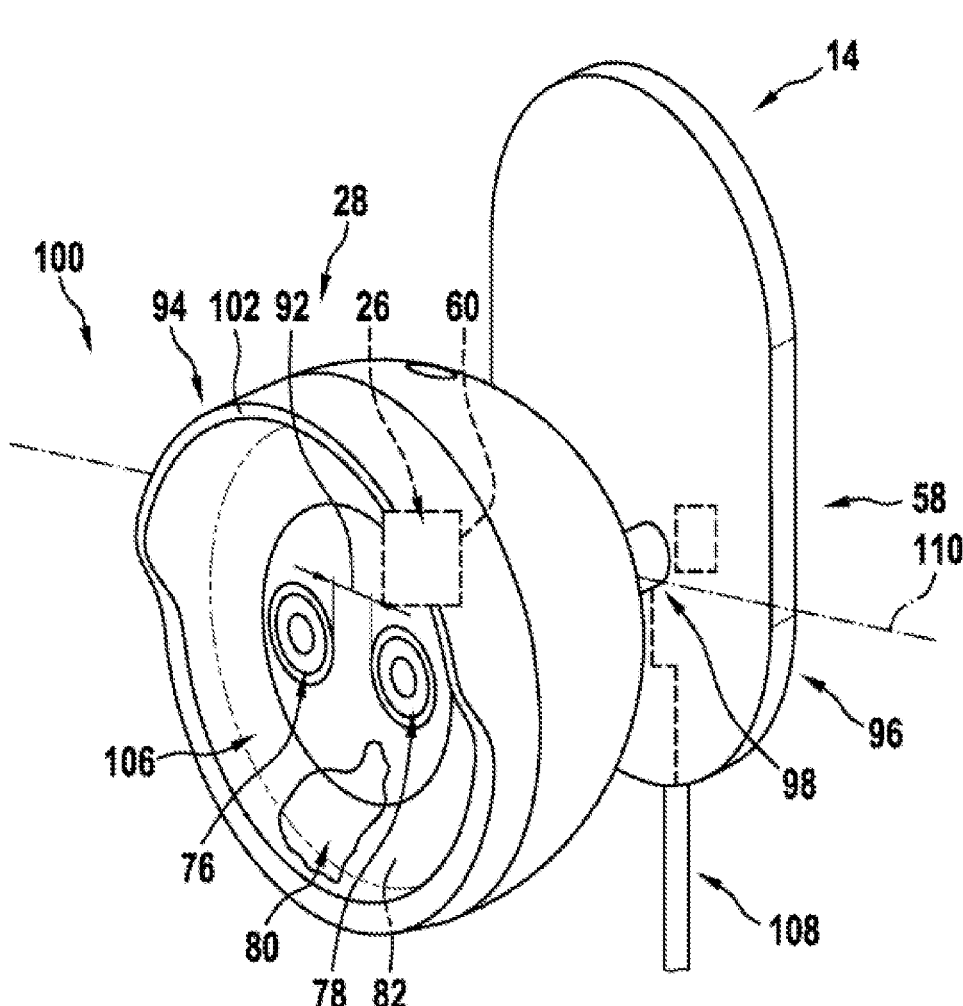
Figure 3:
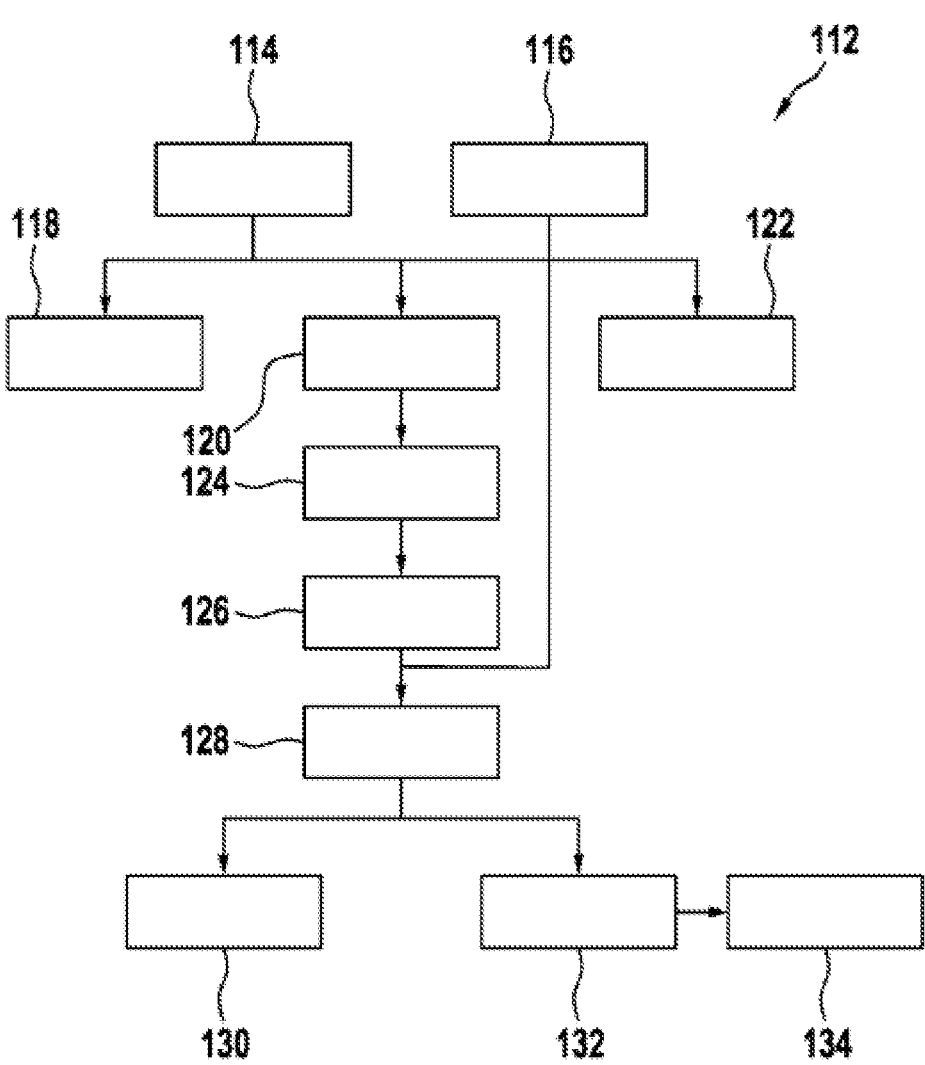
Figure 5:
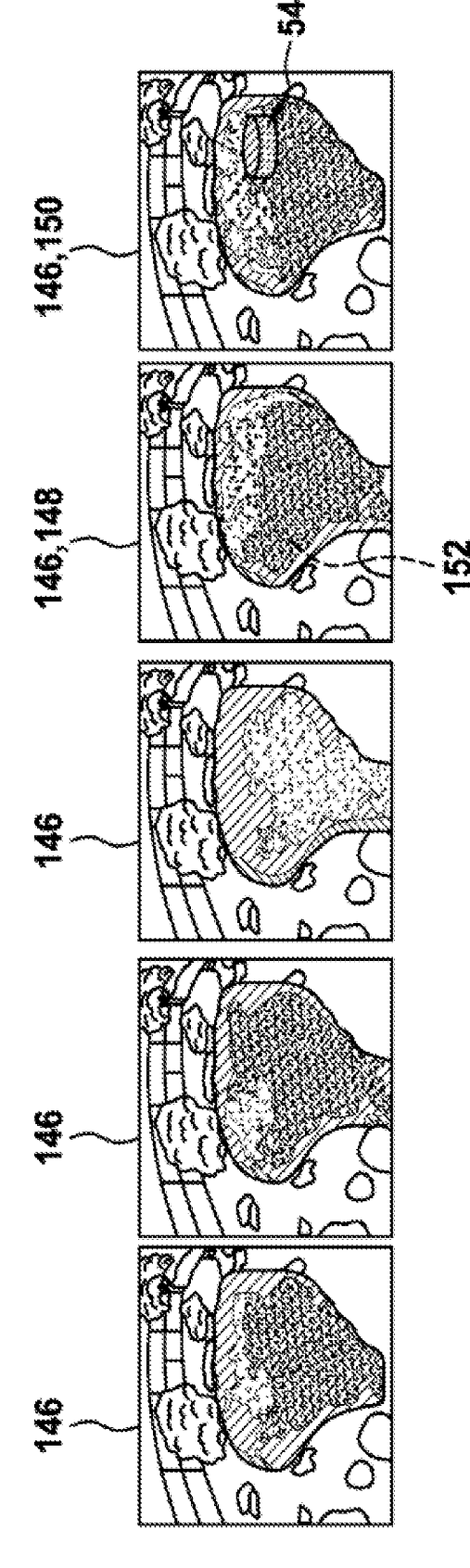
Figure 6:
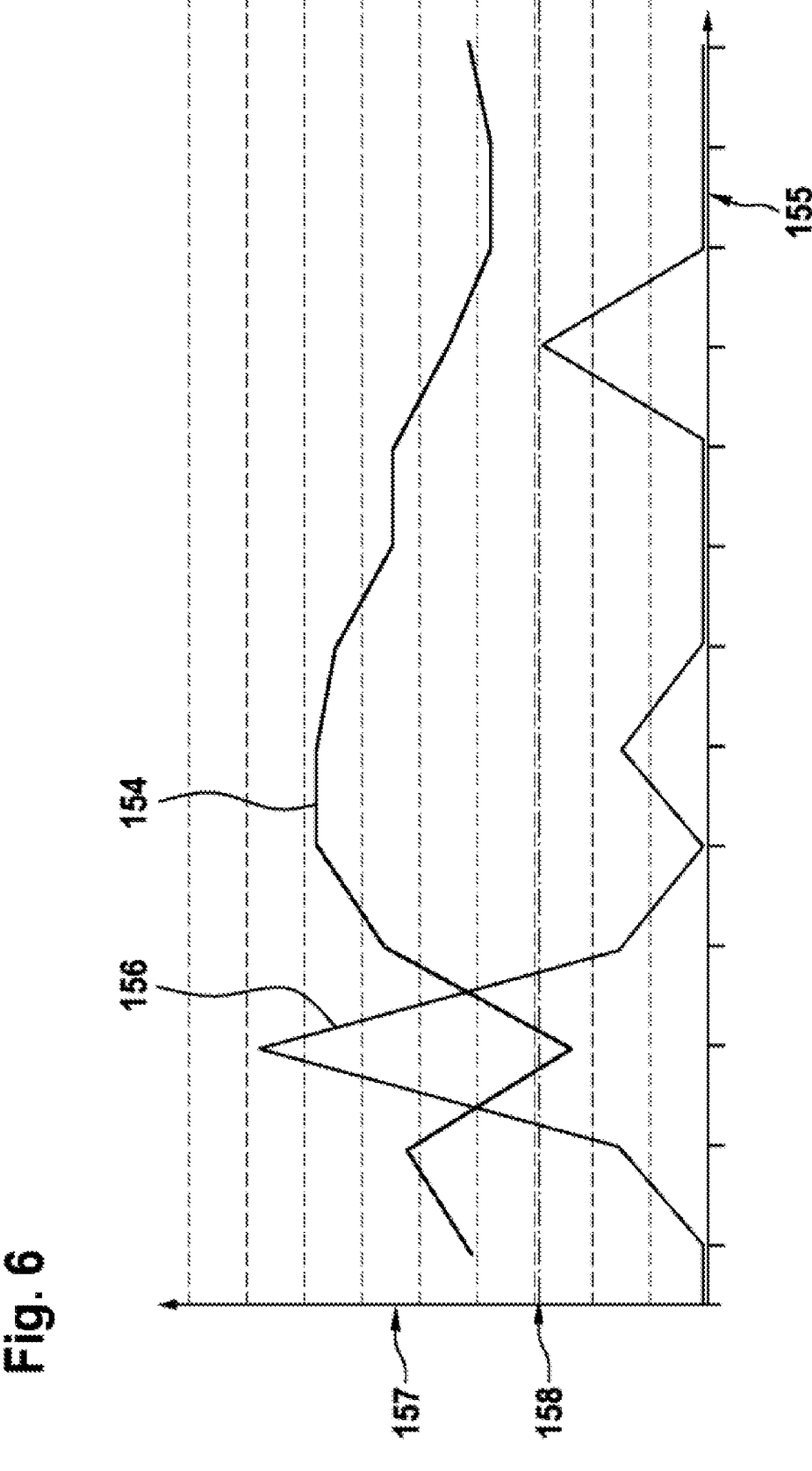
Figure 8:
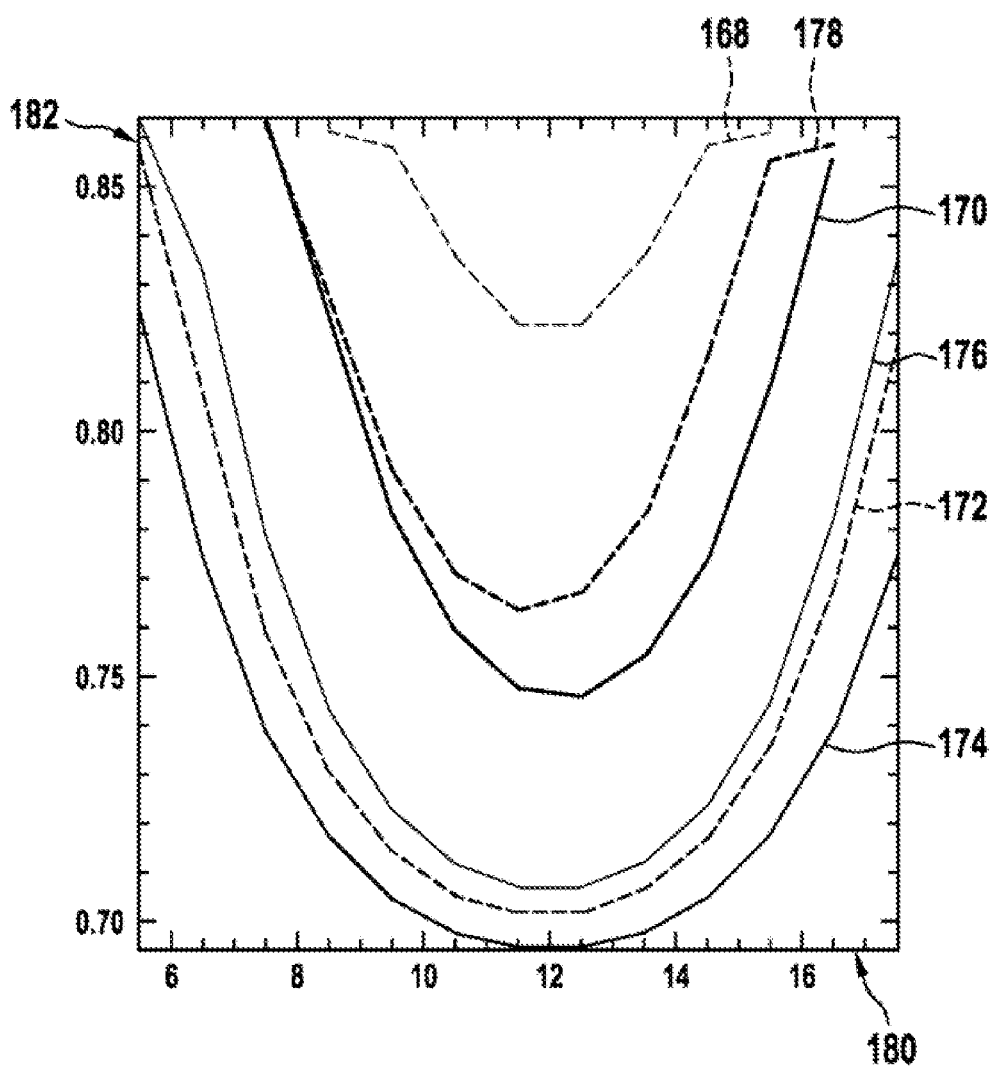
Figure 10:
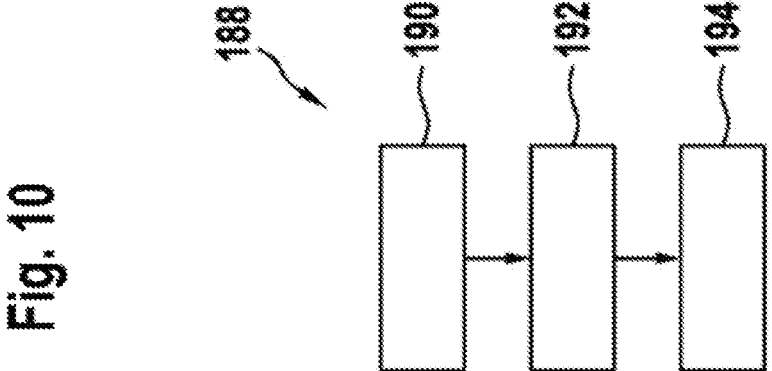
Figure 9:
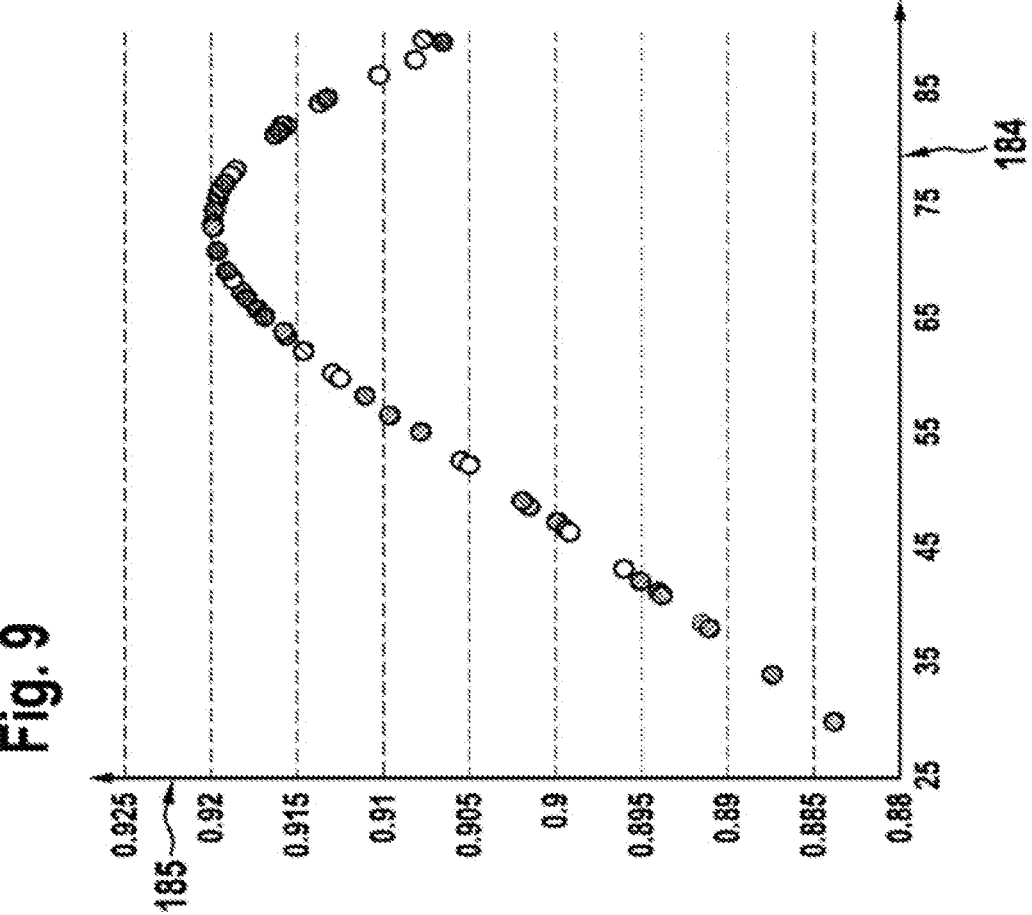
Figures 11, 12:
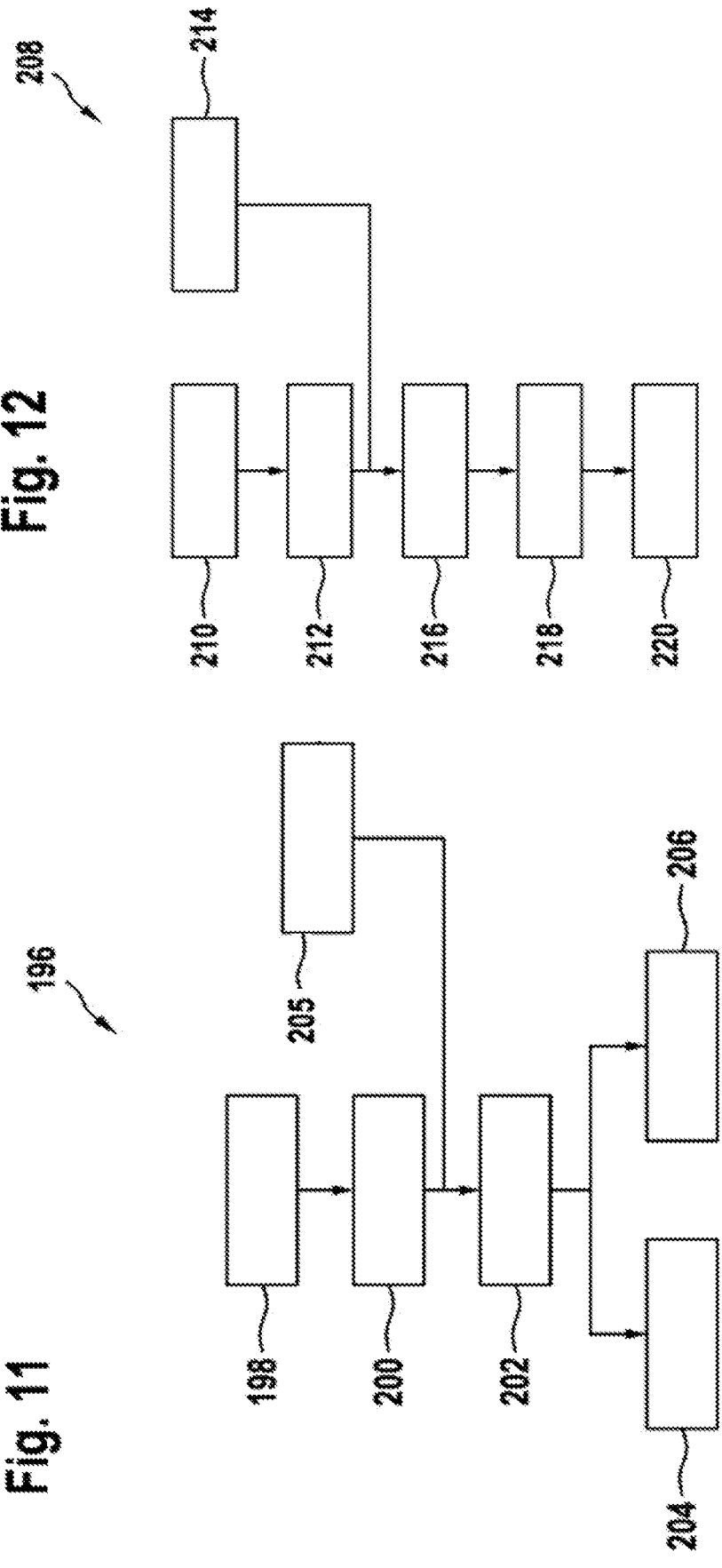
Figures 13, 14:
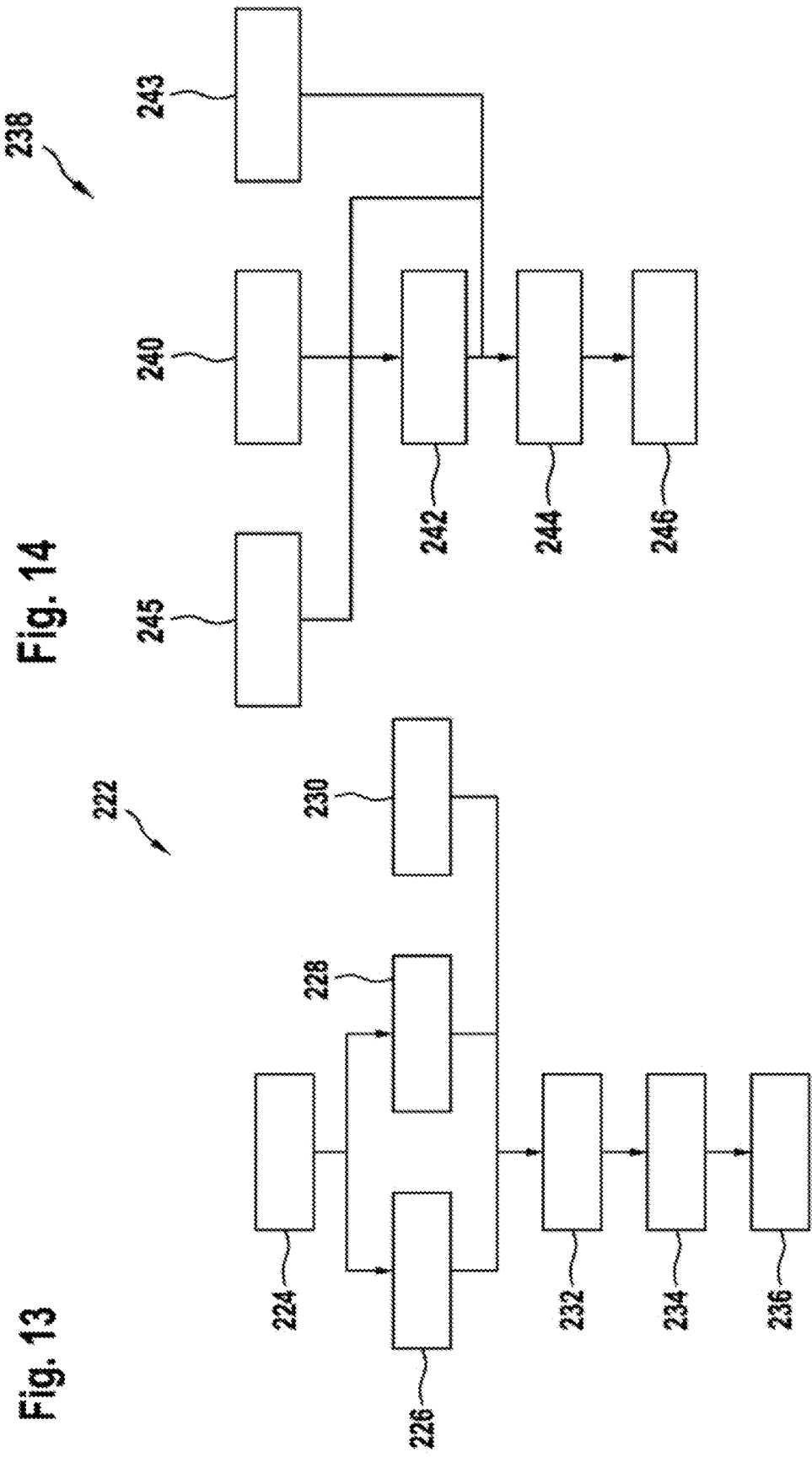
Figures 15, 16:
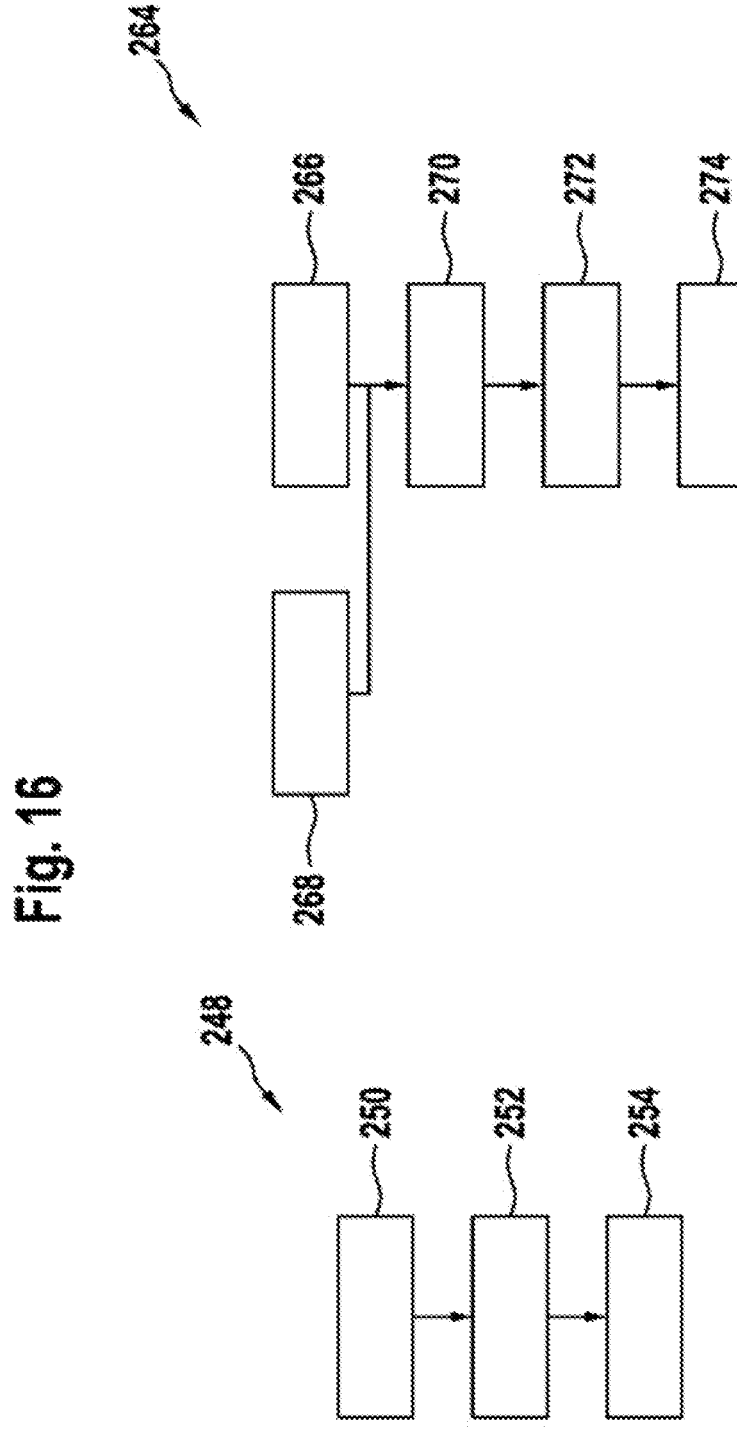
Figure 17:
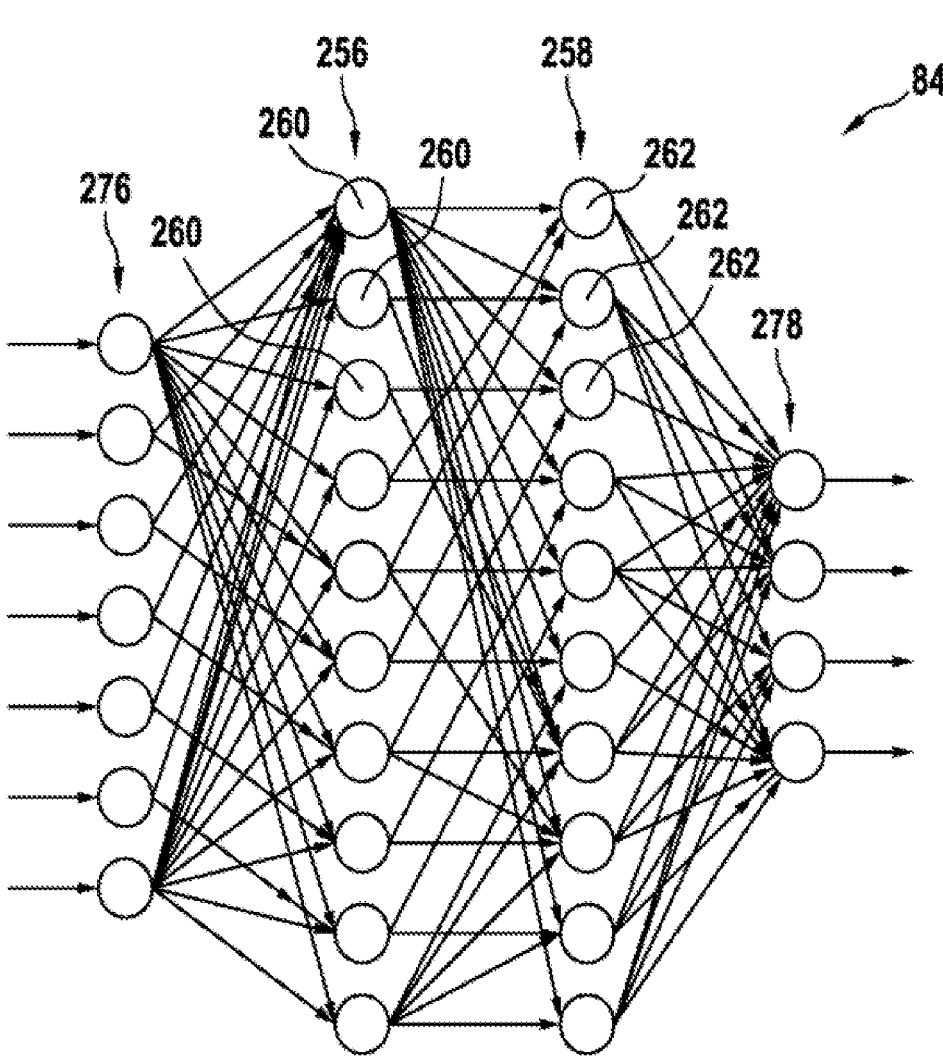

Here:

FIG. 1 a schematic illustration of a vegetation monitoring system according to the present invention for monitoring vegetation health and for maintaining vegetation in a garden, having a vegetation monitoring device according to the invention and a computing unit, FIG. 2 a schematic representation of the vegetation monitoring device according to the invention, FIG. 3 a schematic representation of an exemplary sequence of a method according to the invention for monitoring a vegetation health and for maintaining vegetation in a garden by means of the vegetation monitoring system according to the invention, FIG. 4 a schematic diagram of a capture of a garden area of the garden by means of the vegetation monitoring device according to the invention for determining a vegetation index as a function of an arrangement of the vegetation monitoring device and/or an orientation of the garden area, FIG. 5 an exemplary representation of a garden area detected via the vegetation monitoring device according to the invention, FIG. 6 an exemplary temporal progression of a garden health parameter of a garden and a precipitation in the garden determined by means of the vegetation monitoring system according to the invention and/or by means of a method according to the invention, FIG. 7 an exemplary temporal progression of a vegetation index of a garden area determined by means of the vegetation monitoring system according to the invention and/or by means of a method according to the invention for different frequencies of a mowing operation in the garden area, FIG. 8 a schematic representation of different temporal progressions of a determined vegetation index formed as NDVI over a day for different times within a calendar year, FIG. 9 a schematic representation of a plurality of determined values of a vegetation index configured as NDVI as a function of a sun position angle at a respective capture time of the values of the vegetation index for different times within a calendar year, FIG. 10 a schematic illustration of an exemplary sequence of a method according to the invention for intelligently extending a vegetation monitoring system according to the present invention, wherein at least one device to be integrated into the vegetation monitoring system is proposed to a user, FIG. 11 a schematic representation of an exemplary sequence of a method according to the invention for intelligently cutting vegetation in the garden by means of the vegetation monitoring system according to the invention and/or the vegetation monitoring device according to the invention as a function of a determined vegetation index, FIG. 12 a schematic representation of an exemplary sequence of a method according to the invention for determining the vegetation index for the garden by means of the vegetation monitoring system according to the invention and/or the vegetation monitoring device according to the invention as a function of a illumination parameter, FIG. 13 a schematic representation of an exemplary sequence of a method according to the invention for determining the vegetation index in the garden by means of the vegetation monitoring system according to the invention and/or the vegetation monitoring device according to the invention as a function of a position parameter of the vegetation monitoring device and a position parameter of the light source, FIG. 14 a schematic representation of an exemplary sequence of a method according to the invention for determining the vegetation index in the garden by means of the vegetation monitoring system according to the invention and/or the vegetation monitoring device according to the invention as a function of an orientation parameter of the garden area, FIG. 15 a schematic representation of an exemplary sequence of a method according to the invention for determining the health of the garden by determining at least one garden health parameter by means of the vegetation monitoring system and/or the vegetation monitoring device according to the present invention using a machine learning system, FIG. 16 a schematic illustration of an exemplary sequence of a method according to the invention for training the machine learning system and FIG. 17 a schematic diagram of an operation mode of the machine learning system for a determination of the garden health parameter as a function of a plurality of parameters of the garden areas of the garden.

DESCRIPTION OF THE EXEMPLARY EMBODIMENTS

FIG. 1 shows a schematic illustration of a garden 10 comprising a lawn and other plants. Also shown in FIG. 1 is a vegetation monitoring system 12 for monitoring vegetation health and for maintaining vegetation in the garden 10. The vegetation monitoring system 12 is arranged in or at the garden 10. The vegetation monitoring system 12 comprises a vegetation monitoring device 14, a detection unit 16, and a plurality of vegetation maintenance devices 18, 20, 22. The vegetation monitoring device 14 is arranged, in particular fastened or mounted, on a wall 24, for example a house wall or a wall, which borders the garden 10. The vegetation monitoring device 14 comprises a computing unit 26 and a camera unit 28. The camera unit 28 is configured to capture a plurality of garden areas 30, 32, 34 of the garden 10 in at least a first range of the electromagnetic spectrum and in at least a second range of the electromagnetic spectrum. The image data captured by the camera unit 28 are provided to determine a vegetation index for the captured garden areas 30, 32, 34 of the garden 10. The first range is configured in the visible light range. The second range is configured in the near-infrared range. The computing unit 26 is configured to determine values of the vegetation index for the garden area 30, 32, 34 as a function of the image data of the respective garden area 30, 32, 34 captured by the camera unit 28. The computing unit 26 is configured to generate at least one temporal progression of the vegetation index for the respective garden area 30, 32, 34, preferably from a plurality of values of the vegetation index determined at different times and/or from image data captured at different times. The vegetation index is in particular configured as an NDVI. However, other embodiments of the vegetation index are also conceivable, wherein in particular the camera unit 28 is configured to capture relevant ranges of the electromagnetic spectrum for determining the vegetation index.

The camera unit 28 is provided for an arrangement at least substantially above ground level of the garden 10 and for an at least substantially stationary arrangement within or in the vicinity of the garden 10. The vegetation monitoring device 14, in particular the camera unit 28, is arranged at a height 36 of at least 2 m, preferably 3 m, and particularly preferably 4 m above the ground level of the garden 10. In particular, a preferred mounting height of the camera unit 28 to determine the vegetation index is dependent on a maximum size of the garden 10, in particular the garden areas 30, 32, 34 to be captured. In particular, in a larger garden 10, a greater mounting height of the camera unit 28 is preferred compared to a smaller garden 10. In particular, the camera unit 28 is arranged such that an angle 38 between a main viewing direction 40 of the vegetation monitoring device 14, in particular the camera unit 28, and a horizontal line through a point of the garden areas 30, 32, 34 of the garden 10 to be detected which is furthest from the vegetation monitoring device, in particular the camera unit 28, is at most 30°, preferably at most 40°, and particularly preferably at most 50°.

The detection unit 16 is provided for capturing at least one additional garden parameter of the garden area(s) 30, 32, 34. The detection unit 16 comprises a plurality of detection elements 42, 44, 46, 48 arranged at or in the garden 10, in particular one of the garden areas 30, 32, 34 of the garden 10. The detection unit 16 comprises a detection element 42 configured as a pollen sensor and a further detection element 44 configured as a particulate sensor. In addition, the detection unit 16 comprises a different detection element 46 configured as a humidity sensor. However, other embodiments of the detection unit 16, in particular of the detection elements 42, 44, 46, 48 of the detection unit 16, are conceivable, for example as a differently configured air quality sensor, as a rain sensor, as a monitoring camera, or the like. The detection unit 16 also comprises another detection element 48 configured as a light sensor. The detection elements 42, 44, 46, 48 configured as a light sensor, as a pollen sensor, and as a particulate sensor are arranged stationary in or at the garden 10, in particular one of the garden areas 30, 32, 34 of the garden 10. The detection element 46 configured as a humidity sensor is arranged within a garden area 32 of the garden areas 30, 32, 34 in the ground. The detection unit 16, in particular the detection elements 42, 44, 46, 48, are in particular provided to capture, and preferably transmit to the computing unit 26, a garden parameter configured as a pollen concentration in the air, a garden parameter configured as a particulate concentration in the air, a garden parameter configured as ground moisture of the garden area, and a illumination parameter. It is conceivable that the computing unit 26 is configured to notify and/or warn a user if a limit value of the garden parameter configured as pollen concentration in the air and/or the garden parameter configured as particulate concentration in the air is exceeded.

The vegetation maintenance devices 18, 20, 22 are each provided to carry out at least one activity in the respective garden area 30, 32, 34 as a function of a determined vegetation index and/or at least one value of the at least one additional garden parameter that is captured in at least one of the garden areas 30, 32, 34 and can be associated with the garden area. A vegetation maintenance device 18 of the vegetation maintenance devices 18, 20, 22 is configured as a robotic lawn mower. The detection unit 16 comprises another further detection element 50 arranged on the vegetation maintenance device 18 configured as a mobile unit. The other further detection element 50 is configured as a camera and is in particular provided to capture the garden areas 30, 32, 34, foreign objects 52, 54, 56 in the garden 10, as well as the vegetation monitoring device 14 and/or other devices of the vegetation monitoring system 12. The vegetation maintenance device 18 comprises a detection element 111 of the detection unit 16 configured as an inclination sensor, which is in particular configured as part of the vegetation maintenance device 18. Alternatively or additionally, it is conceivable that the other further detection element 50 and/or other detection elements of the detection unit 16 may be arranged at other mobile units of the vegetation monitoring system 12. However, other embodiments of the detection element 50 arranged on the vegetation maintenance device 18 and/or on another mobile unit of the vegetation monitoring system 12 are conceivable, for example as a lidar system, or the like. The computing unit 26 is configured to control the vegetation maintenance device 18 for a mowing operation in the garden areas 30, 32, 34 as a function of at least one determined value of the vegetation index and/or at least one value of the garden parameter captured in the respective garden area(s) 30, 32, 34. The activity to be carried out by the vegetation maintenance device 18 is in particular configured as cutting/ mowing a meadow and/or lawn in the garden areas 30, 32, 34 of the garden 10. Another vegetation maintenance device 20 of the vegetation maintenance devices 18, 20, 22 is configured as an irrigation system, in particular a lawn sprinkler. The other vegetation maintenance device 20 is in particular controllable by means of the computing unit 26 to irrigate the garden areas 30, 32, 34 of the garden 10. The other vegetation maintenance device 20 is arranged stationary in the garden 10. However, it is also conceivable that the other vegetation maintenance device 20 is configured as a mobile, for example slidable and/or movable, unit. A further vegetation maintenance device 22 of the vegetation maintenance devices 18, 20, 22 is configured as a fertilizer device and, in particular, is provided for fertilizing the ground of one of the garden areas 34 of the garden 10. The further vegetation maintenance device 22 is arranged stationary in the garden area 34. However, it is also conceivable that the further vegetation maintenance device 22 is configured as a mobile, for example slidable and/or movable, unit.

The vegetation monitoring system 12 comprises a wireless communication unit 58 provided for transmission of electronic data between units and devices of the vegetation monitoring system 12. The communication unit 58 comprises a plurality of communication elements 60, each of which is arranged on one of the units or devices of the vegetation monitoring system 12. The wireless communication unit 58 is provided for radio transmission of electronic data. In particular, the communication elements 60 are each configured as radio interfaces. Other embodiments of the communication unit 58 are also conceivable, wherein the electronic data is transmitted via, for example, optical signals and/or other electromagnetic waves different from radio waves. The computing unit 26 is configured as part of the vegetation monitoring device 14. The computing unit 26 is connected to the camera unit 28 of the vegetation monitoring device 14, the vegetation maintenance devices 18, 20, 22 and the detection unit 16. The communication unit 58 is configured to transfer electronic data between the computing unit 26 and an external unit 62, for example, an external network, a smart home system, a cloud, or the Internet. In particular, the communication elements 60 of the communication unit 58 are each arranged on the computing unit 26, the vegetation monitoring device 14, the vegetation maintenance devices 18, 20, 22 and the detection unit 16, in particular the individual detection elements 42, 44, 46, 48, 50 of the detection unit 16, or are formed as part thereof. The computing unit 26 is configured to switch to an independent operating mode if a connection to the external unit 62 via the communication unit 58 is interrupted. Alternatively or additionally, it is conceivable that the computing unit 26 is configured to switch to the independent operating mode if a connection to the detection unit 16 and/or one of the vegetation maintenance devices 18, 20, 22 via the communication unit 58 is interrupted. Preferably, the computing unit 26 is configured in the independent operating mode to evaluate signals received for monitoring the garden areas 30, 32, 34 despite the interrupted connection. For example, in the independent operating mode, the computing unit 26 is configured to evaluate image data captured by the camera unit 28 to determine the vegetation index, preferably to determine values of the vegetation index for captured garden areas 30, 32, 34. It is conceivable that the values of the vegetation index determined in the independent operating mode are stored with a time stamp by means of the computing unit 26, wherein, for example, a selection of values of the vegetation index is made to determine a temporal progression of the vegetation index from the stored values of the vegetation index determined in the independent operating mode, when a connection is re-established and values of the garden parameters and/or values of a illumination parameter, or the like, captured via the detection unit 16 are preferably available for the respective capture period.

The computing unit 26 is set up to generate control signals for the vegetation maintenance devices 18, 20, 20 depending on the vegetation index and/or the garden parameter detected in the at least one garden area 30, 32, 34 for controlling the at least one vegetation maintenance device 18, 20, 20, in particular in order to carry out the activity of the at least one vegetation maintenance device 18, 20, 22 in the at least one garden area 30, 32, 34. The computing unit 26 is configured to control the other vegetation maintenance device 20 configured as an irrigation system as a function of a determined value of the vegetation index and/or a captured value of any one of the garden parameters captured in the garden areas 30, 32, 34, in particular the garden parameter configured as the moisture of the ground of the garden area 30, 32, 34, in order to activate or control and/or regulate irrigation of the respective garden area 30, 32, 34. In particular, it is conceivable that the computing unit 26 controls the other vegetation maintenance device 20, such that at least one irrigation parameter of the other vegetation maintenance device 20, for example a water pressure, an irrigation duration, or the like, is set as a function of a determined value of the vegetation index and/or a captured value of one of the garden parameters captured in the garden areas 30, 32, 34, in particular the garden parameter configured as moisture of the ground of the garden area. The computing unit 26 is configured to control the further vegetation maintenance device 22, which is configured as a fertilizer device as a function of a determined value of the vegetation index and/or a captured value of one of the garden parameters captured in the garden areas 30, 32, 34 in order to activate or control and/or regulate fertilization of the respective garden area 30, 32, 34. In particular, it is conceivable the computing unit 26 controls the further vegetation maintenance device 22, such that at least one fertilization parameter of the further vegetation maintenance device 22, for example an output quantity of a fertilizer, a time for an output of a fertilizer, or the like, is set as a function of a determined value of the vegetation index and/or a captured value of one of the garden parameters captured in the garden areas 30, 32, 34, in particular the garden parameter configured as moisture of the ground of the garden area 30, 32, 34. Particularly preferably, the computing unit 26 is configured to separately control the vegetation maintenance devices 18, 20, 22 and/or individual ones of the vegetation maintenance devices 18, 20, 22 to carry out the activity of the respective vegetation maintenance device 18, 20, 22 for the garden areas 30, 32, 34 of the garden 10. Preferably, the vegetation index and/or some of the garden parameters are determined separately for the individual garden areas 30, 32, 34.

The computing unit 26 is configured to determine, preferably from a plurality of values of the vegetation index determined/captured at a time spaced apart from each other, at least one temporal progression of the vegetation index for the/a garden area(s) 30, 32, 34. It is conceivable that the computing unit 26 is configured to separately determine a temporal progression of the vegetation index for individual garden areas 30, 32, 34 of the garden 10. The camera unit 28 is configured to capture a plurality of distinguishable garden areas 30, 32, 34 of the garden 10. The computing unit 26 is configured to separately determine the vegetation index and/or the temporal progression of the vegetation index for individual captured garden areas 30, 32, 34. The computing unit 26 is configured to generate control signals for controlling the at least one vegetation maintenance devices 18, 20, 22 as a function of the temporal progression of the vegetation index, in particular in order to carry out the activity of the at least one vegetation maintenance device 18, 20, 22 in the at least one garden area 30, 32, 34. The computing unit 26 is configured to retrieve and/or request at least one rain condition parameter from a rain sensor and/or a weather station 64 for determined values of the vegetation index and/or for image data transmitted to the computing unit 26 for determining the vegetation index, in particular for determining a temporal progression of the vegetation index. The weather station 64 is in particular configured external to the system. Alternatively, it is conceivable that the detection unit 16 comprises a rain sensor for capturing the rain condition parameter. For example, it is conceivable that the rain sensor is arranged on one of the vegetation maintenance devices 18, 20, 22, in particular the vegetation maintenance device 18. The computing unit 26 is configured to determine a temporal progression of the vegetation index as a function of the rain condition parameter, wherein the computing unit 26 is configured to discard or select values of the vegetation index to determine the temporal progression of the vegetation index in each case as a function of a value of the rain condition parameter of the respective garden area 30, 32, 34 and/or the garden 10, which has at least substantially the same capture time as captured image data to determine the respective value of the vegetation index. Preferably, the computing unit 26 is configured to determine the temporal course of the vegetation index by exclusively selecting values of the vegetation index for which a value of the rain condition parameter that can be assigned via the capture time is below a stored limit value, wherein in particular the value of the rain condition parameter indicates no precipitation or only light precipitation. Due to water on plants of a garden area 30, 32, 34 to be captured and/or raindrops between a garden area 30, 32, 34 to be captured and the camera unit 28, reflectivity values to be captured for determining the vegetation index are falsified in the second area compared to a direct detection of the plants. As a result, the vegetation index cannot be used to make a reliable statement about the health of the vegetation in the respective garden area during or directly after rain. By discarding values of the vegetation index captured during at or directly after a rain to determine the temporal progression of the vegetation index, an advantageously accurate statement on the development of vegetation health in the garden areas 30, 32, 34 can be made possible.

The computing unit 26 is configured to detect the vegetation maintenance devices 18, 20, 22, in particular the vegetation maintenance device 18, within the garden areas 30, 32, 34 from image data of the garden areas 30, 32, 34 provided by the camera unit 28. Preferably, a shape, color and/or contour of the vegetation maintenance devices 18, 20, 22, in particular of the vegetation maintenance device 18, are stored in the computing unit 26. Preferably, the computing unit 26 is configured to detect captured shapes, color values of captured areas, and/or captured contours within the image data and/or within determined values of the vegetation index, and compare them with stored data, in particular the stored shapes, colors, and/or contours of the vegetation maintenance devices 18, 20, 22, in particular the vegetation maintenance device 18. Particularly preferably, the computing unit 26 is configured to localize mobile units, for example the vegetation maintenance device 18, of the vegetation monitoring system 12 via captured image data within the garden 10 and/or to determine a movement path 66 thereof (shown in FIG. 1 as an example for the vegetation maintenance device 18). It is conceivable that the computing unit 26 is configured to control one of the vegetation maintenance device(s) 18, 20, 22 as a function of at least one position of the vegetation maintenance device 18, 20, 22 detected via captured image data, and/or at least one movement path 66 of the vegetation maintenance device 18, 20, 22, in particular to carry out the activity associated with the respective vegetation maintenance device 18, 20, 22.

The computing unit 26 is configured to detect foreign objects 52, 54, 56 in the captured garden areas 30, 32, 34 based on image data used to determine the vegetation index, the determined vegetation index, and/or the detected garden parameters. FIG. 1 shows an example of a plurality of foreign objects 52, 54, 56. The computing unit 26 is configured to generate control signals to control at least one mobile unit of the vegetation monitoring system 12 and/or one of the vegetation maintenance devices 18, 20, 22, in particular the vegetation maintenance device 18, as a function of a detected foreign object 52, 54, 56, in particular in order to examine the foreign object 52, 54, 56 and/or to clear the respective garden area 30, 32, 34 comprising the foreign object 52, 54, 56. The computing unit 26 comprises a pattern recognition algorithm configured to detect foreign objects 52, 54, 56 located in the captured garden area(s) 30, 32, 34 based on image data captured via the camera unit 28 in the first range of the electromagnetic spectrum and/or the second range of the electromagnetic spectrum and/or based on a determined vegetation index. The foreign objects 52, 54, 56 are configured as objects, persons or animals, for example, within the garden 10, in particular the garden areas 30, 32, 34. The computing unit 26 is configured to detect persons 68, and/or animals in the vicinity of or within one of the garden areas 30, 32, 34, preferably based on image data captured by the vegetation monitoring device 14 and/or from determined values of the vegetation index of the garden area 30, 32, 34. The computing unit 26 is configured to take into account at least one position and/or at least one movement path 70 (shown as an example in FIG. 1) of a foreign body, preferably a detected person 68 and/or animal, in the respective garden area(s) 30, 32, 34 for controlling the/one of the activities of the vegetation maintenance devices 18, 20, 22. In FIG. 1, an exemplary person 68 is shown moving along a movement path 70 through the garden 10/garden areas 30, 32, 34 of the garden 10. In addition, in FIG. 1, an exemplary unidentified foreign object 54 is shown in a garden area 34 of the garden areas 30, 32, 34. Preferably, the computing unit 26 is configured, for example, to move the vegetation maintenance device 18 into the garden area 34 for an examination of the foreign object 54. Alternatively or additionally, it is conceivable that the computing unit 26 is configured to notify and/or alert a user in the event that a foreign object 52, 54, 56 is detected in one of the garden areas 30, 32, 34 and/or in the event that a detected foreign object 52, 54, 56 cannot be identified.

The computing unit 26 is configured to detect water accumulations 72 (shown as an example in FIG. 1) in a garden area 30, 32, 34 of the garden 10 based on image data captured by the vegetation monitoring device 14 and/or from determined values of the vegetation index of the garden area 30, 32, 34. The computing unit 26 is configured to generate control signals as a function of a detected water accumulation 72 in the respective garden area(s) 30, 32, 34 in order to control at least one mobile unit of the vegetation monitoring system 12 and/or one of the vegetation maintenance devices 18, 20, 22, in particular the vegetation maintenance device 18, in particular to prevent and/or remove the water accumulation 72 during an activity and/or movement within the garden 10. It is conceivable that the computing unit 26 is configured to notify and/or warn a user in the event that a water accumulation 72 is detected in one of the garden areas 30, 32, 34. Preferably, the computing unit 26 is configured to take into account an area of the garden 10 in which the water accumulation 72 is arranged when controlling the other vegetation maintenance device 20 for irrigation. For example, the area of the garden 10 in which the water accumulation 72 is arranged is excluded or avoided during a future or the next irrigation of the garden areas 30, 32, 34 by means of the other vegetation maintenance device 20. It is conceivable that the garden 10 is at least at times newly divided into other garden areas as a function of detected foreign objects 52, 54, 56, and/or water accumulations 72 within the garden 10 to determine the vegetation index and/or control the vegetation maintenance devices 18, 20, 22.

The computing unit 26 is configured to request a user input regarding a user activity in the/one of the garden areas 30, 32, 34 as a function of a determined vegetation index, a determined temporal progression of the vegetation index, a captured garden parameter, and/or at least one input signal of one of the vegetation maintenance devices 18, 20, 22. For example, the vegetation index in the garden areas 30, 32, 34 decreases when cutting the plants within the garden areas 30, 32, 34. Preferably, the computing unit 26 is configured to evaluate determined temporal progressions of the vegetation index and detect spontaneous changes of the vegetation index (see FIGS. 6 and 7). For example, the computing unit 26 is configured to request a user input regarding a user activity in the respective garden area 30, 32, 34 in the event of a spontaneous decrease in the vegetation index in one of the garden areas 30, 32, 34, which is detected in particular independently of the time of an activity of the vegetation maintenance devices 18, 20, 22. In another exemplary embodiment it is conceivable, in particular alternatively or additionally, that a comparatively low load and/or a spontaneous decrease in the load during a mowing operation in one of the garden areas 30, 32, 34 is detected by means of the vegetation maintenance device 18 and transmitted to the computing unit 26 via an input signal, wherein a user input relating to a user activity in the garden area 30, 32, 34 is requested in particular by means of the computing unit 26.

The computing unit 26 comprises an algorithm to identify at least one specific vegetation type, particularly a lawn, in captured garden areas 30, 32, 34 based on image data captured by the camera unit 28. The computing unit 26, in particular the algorithm, is configured to divide the captured garden area(s) 30, 32, 34 into a plurality of garden areas 30, 32, 34 to determine the vegetation index as a function of a proportion of the specific vegetation type. In order to determine the vegetation index, the computing unit 26, in particular the algorithm, is configured to discard areas 74 of the garden 10 that do not have a lawn and/or that have a certain proportion of at least another specific type of vegetation, in particular different from a lawn, when dividing the lawn 10 into the garden areas 30, 32, 34. FIG. 1 shows an example of a division of the garden 10 by the computing unit 26, in particular the algorithm, wherein only areas of the garden with a certain proportion of lawn were taken into account for a division into the garden areas 30, 32, 34. For example, in the areas 74 of the garden 10 outside the garden areas 30, 32, 34, for example, beds, trees, terrace areas, walkways, or the like are arranged. Alternatively, it is conceivable that the computing unit 26 is configured to carry out different divisions of the garden 10 into garden areas 30, 32, 34 for the various vegetation maintenance devices 18, 20, 22. For example, it is conceivable that for the other vegetation maintenance device 20 configured as an irrigation system, areas of the garden 10 with other types of vegetation, in particular different from lawns, are also used to divide the garden 10 into garden areas 30, 32, 34 (not shown in FIG. 1). Preferably, all planted areas of the garden 10 are taken into account for a division of the garden 10 into garden areas 30, 32, 34 for the activity of the other vegetation maintenance device 20 and/or the further vegetation maintenance device 22. Alternatively or additionally, other divisions of the garden 10 are conceivable. Preferably, the computing unit 26 is configured to control the vegetation maintenance devices 18, 20, 22 such that persons 68, animals and/or foreign objects 52, 54, 56 detected in the garden 10 are avoided during an activity carried out by the respective vegetation maintenance device 18, 20, 22, for example are bypassed by the vegetation maintenance device 18, are not irrigated by the other vegetation maintenance device 20 and/or are not hit by the further vegetation maintenance device 22.

The computing unit 26 is configured to detect an occlusion 80 of the camera unit 28, in particular of cameras 76, 78 of the camera unit 28 (see FIG. 2), based on image data provided by the camera unit 28. In particular, the computing unit 26 is configured to distinguish foreign objects 52, 54, 56, persons 68, and/or animals in the garden 10 from occlusions 80 of the camera unit 28 arranged at or in close range of the camera unit 28. For example, an occlusion 80 of the camera unit 28 is configured as a deposit of dirt, dust, or other residue on a lens of the camera unit 28 and/or on a window element 82 of the vegetation monitoring device 14 and/or as a movement and/or arrangement of a person 68 or a foreign object 52, 54, 56 in a detection range, in particular within the near range, of the camera unit 28. Preferably, the computing unit 26 is configured to detect an occlusion 80 of the camera unit 28, in particular the camera 76, 78 of the camera unit 28, as a function of changes in image data captured with a time offset relative to one another, for example if image values within the image data change significantly over a significant range of a detection range and/or captured image and/or if there is a change in image values in image data of a detection range and/or captured image within a time period, which is below a limit value of the time period stored for a proportion of the changing image values. For example, an occlusion 80 of the camera unit 28 is detected when, for example, 40% of all image values in image data of a detection range and/or captured image change within, for example, less than 3 seconds. Alternatively or additionally, it is conceivable that the computing unit 26 is configured to detect an occlusion 80 of the camera unit 28 by means of pattern recognition of captured image data. Alternatively or additionally, it is conceivable that the computing unit 26 is configured to detect an occlusion 80 of the one camera unit 28 as a function of detected movements and/or objects in an unobscured part of the garden 10/of the garden areas 30, 32, 34. For example, it is conceivable that an occlusion 80 of the camera unit 28 is detected if an object, for example a person 68 and/or the vegetation maintenance device 18, can move unhindered from an unobscured area of the detection range and/or the captured image into an area of the detection range and/or the captured image that is obscured by the occlusion 80 and, in particular, can no longer be detected. It is conceivable that the computing unit 26 is configured to distinguish a device of the vegetation monitoring system 12, in particular the vegetation mainte-nance device 18, for detecting an occlusion 80 of the camera unit 28, in particular for distinguishing an occlusion 80 of the camera unit 28 and an object or an optical effect within the captured garden areas 30, 32, 34. In particular, the computing unit 26 is configured to control a device of the vegetation monitoring system 12, in particular the vegeta-tion maintenance device 18, upon detection of an obscured area in a captured image to detect an occlusion 80 of the at least one camera unit 28, such that the device moves into an area of the garden areas 30, 32, 34 projected onto the garden areas 30, 32, 34 via the obscured area, in particular from an area of the garden areas 30, 32, 34 projected onto the garden areas 30, 32, 34 via an obscured area in the captured image.

The computing unit 26 is configured to determine at least one garden health parameter for one of the garden areas 30, 32, 34. Preferably, the computing unit 26 can be connected as part of a machine learning system 84 and/or to a machine learning system 84. The computing unit 26 is configured to determine the garden health parameter by means of the machine learning system 84. The machine learning system 84 is configured as an artificial neural network, in particular a convolutional neural network. The computing unit 26 is configured to request at least one of a value of a vegetation index and/or at least one value of an environmental param-eter from an external unit 62 to determine the garden health parameter and to train the machine learning system 84 (also see FIGS. 15 to 17).

The vegetation monitoring system 12 comprises an arti-ficial light source 86, which is in particular configured as a lamp and is arranged in the garden 10. In particular, the artificial light source 86 is arranged outside the garden areas 30, 32, 34. However, other embodiments and/or arrange-ments of the artificial light source 86 are conceivable. The artificial light source 86 is in particular configured to illu-minate the garden areas 30, 32, 34, in particular at a time interval or simultaneously, with light from the first range and light from the second range of the electromagnetic spectrum. Preferably, a position of the artificial light source 86 for determining a position parameter of the artificial light source 86 within the garden 10 is stored in the computing unit 26. Preferably, a position of the vegetation monitoring device 14 within the garden 10 for determining a position parameter of the vegetation monitoring device 14 is stored in the com-puting unit 26. Preferably, the computing unit 26 is config-ured to activate the artificial light source 86 to detect one of the garden areas 30, 32, 34 via the vegetation monitoring device 14, in particular the camera unit 28, preferably to determine the vegetation index, preferably independently of a presence of the sun 88 or at night. In particular, the artificial light source 86 is provided to illuminate the garden areas 30, 32, 34 to determine the vegetation index via captured image data of the garden area(s) 30, 32, 34. Embodiments of the vegetation monitoring system 12 with-out an artificial light source 86 are also conceivable, wherein in particular, the garden areas 30, 32, 34 are illuminated via the sun 88 as a light source to determine the vegetation index. Alternatively, it is conceivable that vegetation moni-toring system 12 comprises a plurality of artificial light sources 86 that are distributed in the garden 10 and, in particular, provided for lighting the garden areas 30, 32, 34 at least substantially evenly.

It is conceivable that the vegetation monitoring system 12 comprises at least one further vegetation monitoring device 90 (indicated in FIG. 1). The vegetation monitoring devices 14, 90, in particular camera units 28 of vegetation monitor-ing devices 14, 90, each have different detection ranges. The vegetation monitoring devices 14, 90 are configured to determine a position of the vegetation monitoring devices 14, 90 relative to each other and/or an orientation of the detection ranges in the garden 10 as a function of at least one reference body detected within the detection ranges. For example, it is conceivable that the vegetation monitoring system 12 comprises a dedicated reference body and/or that the computing unit 26 is configured to determine a common reference body in the detection ranges of the vegetation monitoring devices 14, 90. Alternatively or additionally, it is conceivable that a mobile unit of the vegetation monitoring system 12, in particular the vegetation maintenance device 18, is used as a reference body, and in particular is controlled to move into the detection ranges of the vegetation moni-toring devices 14, 90 for detection by the vegetation moni-toring devices 14, 90.

FIG. 2 shows a perspective view of the vegetation moni-toring device 14. In order to determine the vegetation index, the camera unit 28 is configured to generate an output signal to be transmitted to the computing unit 26, which in par-ticular comprises captured image data. The camera unit 28 comprises a first camera 76 for capturing the garden areas 30, 32, 34 in the first range of the electromagnetic spectrum and a second camera 78 for capturing the garden areas 30, 32, 34 in the second range of the electromagnetic spectrum. The camera unit 28 is configured to at least substantially adapt an exposure time of the second camera 78 to an exposure time of the first camera 76 to generate the output signal. A minimum distance 92 between the first camera 76 and the second camera 78 is at most 10 cm, preferably at most 5 cm, particularly preferably at most 3 cm, and more particularly preferably at most 1 cm. In particular, the minimum distance 92 between the first camera 76 and the second camera 78 is at least substantially 1 cm. The computing unit 26 is configured as part of the vegetation monitoring device 14. Alternatively, it is conceivable that the computing unit 26 is configured separately from the vegetation monitoring device 14.

Alternatively, it is conceivable that the camera unit 28, in particular instead of the first camera 76 and the second camera 78, only comprises another camera for capturing the image data of the garden areas 30, 32, 34. In particular, it is conceivable that the other camera is configured as an RGB-IR camera. Preferably, the other camera is configured to capture the garden areas 30, 32, 34 at least substantially simultaneously in the first range of the electromagnetic spectrum and the second range of the electromagnetic spectrum.

The vegetation monitoring device 14 comprises a camera housing 94, a mounting part 96, and a connection part 98. In particular, the camera housing 94, the mounting part 96, and the connection part 98 together form an outer shell of the vegetation monitoring device 14. The camera unit 28 is housed in the camera housing 94. The camera unit 28, in particular the first camera 76 and the second camera 78, are enclosed by the camera housing 94 at least for the most part, in particular at least substantially completely. The camera housing 94 comprises a window element 82, which is provided to allow the camera unit 28 arranged within the camera housing 94 to capture the garden areas 30, 32, 34. The camera housing 94 is provided to protect the camera unit 28 from external influences, such as weather, animals, or the like, and/or from damage. Preferably, the camera housing 94 is water-tight under normal conditions. Preferably, the window element 82 is at least substantially translucent, in particular for light from the first range and the second range of the electromagnetic spectrum. The vegetation monitoring device 14 comprises an environmental protection unit 100, which is provided to protect the camera unit 28 from specific environmental effects. In particular, the camera housing 94 is designed as part of the environmental protection unit 100. The environmental protection unit 100 comprises a shading element 102, which is provided to protect the window element 82 of the camera housing 92 and/or the camera unit 28, in particular at least one lens of one of the cameras 76, 78 of the camera unit 28, from direct sunlight under a certain angular range, in particular to obscure it from direct sunlight. The shading element 102 is configured as an extension above the window element 82 and is formed in one piece with the camera housing 94. Preferably, the shading element 102 is provided to protect the window element 82 from rain. In particular, the shading element 102 is provided to cover the window element 82 from above over an angular range about a perpendicular of at least 10°, preferably at least 20° and preferably at least 30°, when the vegetation monitoring device 14 is in a mounted state. The environmental protection unit 100 comprises a reflection and/or glare protection unit 106, which is provided to counteract interfering reflection effects and/or glare effects on the camera unit 28 and/or the window element 82 for capturing the garden areas 30, 32, 34. The reflection and/or glare protection unit 106 is in particular configured as a coating applied to an external surface of the window element 82 and is provided to prevent reflection effects and/or glare effects on the external surface of the window element 82 upon detection of the garden areas 30, 32, 34. Alternatively or additionally, it is conceivable that the reflection and/or glare protection unit 106 comprises at least one algorithm that is stored in the computing unit 26 and configured to detect reflection effects and/or glare effects within the captured image data and, in particular by using correction factors for individual affected pixels of the image data, to remove them from the image data. The environmental protection unit 100 comprises an at least substantially water-repellent coating, which is applied in particular to an upper side of the camera housing 94 and to the external surface of the window element 82, and is provided to prevent water accumulations on the camera housing 94 and on the window element 82. The environmental protection unit 100 comprises a plurality of sealing elements (not shown in FIG. 2), which are provided to at least substantially seal connection points of the camera housing 94, the mounting part 96 and the connection part 98 as well as openings in the camera housing 94, the mounting part 96 and the connection part 98 in a water-tight manner, in particular under normal conditions.

The computing unit 26, in particular an electronic circuit board of the computing unit 26, is arranged at least for the most part, in particular at least substantially completely, in the camera housing 94. The computing unit 26 is integrated into the camera housing 94. It is also conceivable that the computing unit 26 is at least partially integrated into the mounting part 96. The mounting part 96 is provided for mounting the vegetation monitoring device 14 on a vertical surface, in particular the wall 24. Preferably, the mounting part 96 is provided to be fastened to the vertical surface via fastening means, for example screws, anchors, hooks, nails, or the like (not shown in the Figures). The mounting part 96 comprises an electrical interface 108 to an electrical supply of the vegetation monitoring device 14, in particular the camera unit 28 and the computing unit 26. Preferably, the electrical interface 108 is configured to connect to a power grid. Alternatively or additionally, in particular in a configuration of the vegetation monitoring device 14 independent of the computing unit 26, it is conceivable that the electrical interface 108 is configured for connection to a replaceable and/or rechargeable energy store. In particular, it is conceivable that the vegetation monitoring device 14 is configured to be battery operated. Alternatively or additionally, it is conceivable that the vegetation monitoring device 14, in particular the mounting part 96, comprises at least one wired electronic interface for transmitting electronic data between the camera unit 28 and/or the computing unit 26 and the detection unit 16, the computing unit 26, the vegetation maintenance devices 18, 20, 22, and/or the external unit 62.

The connection part 98 is provided to couple the camera housing 94 to the mounting part 96. The camera housing 94 is connected to the mounting part 96 via the connection part 98. The connection part 98 is provided to adjust a position of the camera housing 94 relative to the mounting part 96. Alternatively it is conceivable that the vegetation monitoring device 14 comprises at least one actuation unit for a motor-driven adjustment of a position and/or an orientation of the camera housing 94 relative to the mounting part 96 and/or the vertical surface via the at least one connection part 98. For example, it is conceivable that the camera unit 28 and/or the camera housing 94 is movable on a rail or mounted on a suspension of the connection part 98 or the mounting part 96, such that it can pivot/rotate about an axis or a point. The connection part 98 is rigidly connected to the mounting part 96, in particular formed as one piece with the mounting part 96. The camera housing 94 is movably connected to the connection part 98, particularly in a plurality of fixed mounting positions. The camera housing 94 is mounted on the connection part 98 such that it can rotate or pivot about an axis or a point. Alternatively and/or via the connection part 98, it is mounted on the mounting part 96, such that it can rotate or pivot about an axis or a point. The camera housing 94 is provided to be connected to the connection part 98 in a positive and/or non-positive manner, in particular in at least one mounting position of a plurality of possible mounting positions. Particularly preferably, the camera housing 94 is configured to be rotatable or pivotable relative to the vertical surface about at least one transverse axis 110 aligned at least substantially parallel to a horizontal axis, preferably for adjusting the mounting or inclination angle of the vegetation monitoring device 14, in particular the camera unit 28, relative to the garden area(s) 30, 32, 34. It is conceivable that the connection part 98 is provided to be connected to the mounting part 96 in a positive and/or non-positive manner, in particular in at least one position or one of a plurality of possible positions. Alternatively, it is conceivable that the camera housing 94 can be formed in one piece with the connection part 98 and the mounting part 96.

The computing unit 26 is configured to detect foreign objects 52, 54, 56, in particular objects, persons, and/or animals, in the garden areas 30, 32, 34 using captured image data, wherein the computing unit 26 is configured to take into account at least one area of the image data comprising a detected foreign object 52, 54, 56 when determining the vegetation index using the image data. The computing unit 26 is configured to evaluate captured image data for a detection of foreign objects 52, 54, 56 using a pattern recognition algorithm and/or by image evaluation. The computing unit 26 is configured to identify the at least one area of the image data, which is formed in particular from a plurality of pixels and/or other image areas, which comprises, in particular depicts, a detected foreign object 52, 54, 56, when the foreign object 52, 54, 56 is detected. The computing unit 26 is configured to discard and/or ignore the at least one area of the image data comprising a detected foreign object 52, 54, 56 when determining the vegetation index of the garden areas 30, 32, 34, in particular the respective garden area/s 30, 32, 34 comprising the foreign body 52, 54, 56.

FIG. 3 schematically shows an exemplary sequence of a method 112 for monitoring vegetation health and for maintaining vegetation in the garden 10 by means of the vegetation monitoring system 12. In a method step 114 of method 112, the garden areas 30, 32, 34 are captured by means of the camera unit 28, wherein image data of the garden areas 30, 32, 34 is generated. The captured image data is associated with a capture time using the camera unit 28 and/or the computing unit 26. In a further method step 116 of method 112, the garden parameters are captured by means of the detection unit 16. It is conceivable that the garden parameters are captured periodically or continuously in each case, or are captured as a function of the image data. For example, it is conceivable that a recording of the garden parameters by means of the computing unit 26 is controlled for a time period at least substantially similar to the time of capturing the image data. Preferably, captured values of the garden parameters are each associated with a capture time. In a further method step 118 of method 112, at least one value of a illumination parameter of the garden areas 30, 32, 34 is determined by means of the computing unit 26 as a function of the captured image data. In a further method step 120 of method 112, a position parameter of the vegetation monitoring device 14 and a position parameter of the sun 88 are determined as a light source by means of the computing unit 26 as a function of the captured image data. In particular, for an embodiment in which the artificial light source 86 is used to illuminate the garden areas 30, 32, 34, a position parameter of the artificial light source 86 is preferably used, which in particular comprises the position of the artificial light source 86 in the garden 10. In a further method step 122 of method 112, at least one value of an orientation parameter of the garden areas 30, 32, 34 is determined by means of the computing unit 26 as a function of the captured image data and data for the individual garden areas 30, 32, 34 captured by means of the vegetation maintenance device 18. By means of the detection element 111 arranged on the vegetation maintenance device 18, an orientation of the respective garden area 30, 32, 34 in space is captured and transmitted as electronic data, in particular via the communication unit 58, to the computing unit 26. Alternatively, it is conceivable that values of the illumination parameter, values of the position parameter of the vegetation monitoring device 14, values of the position parameter of the sun 88, and/or values of the orientation parameter of the garden areas 30, 32, 34 are captured and/or provided by an external unit 62. The orientation parameter provides information about an orientation of a garden area 30, 32, 34 relative to a main viewing direction 40 of the vegetation monitoring device 14, in particular the camera unit 28, through which the image data in particular is captured In a further method step 124 of the method 112, at least one value of the vegetation index, preferably a plurality of values of the vegetation index, is determined for each of the garden areas 30, 32, 34 by means of the computing unit 26 using the captured image data. In a further method step 126 of method 112, a temporal progression of the vegetation index is determined by means of the computing unit 26 from a plurality of values of the vegetation index determined for different times, in particular for the garden 10 or for the individual garden areas 30, 32, 34 separately. It is conceivable that a plurality of values of the vegetation index are determined for individual garden areas 30, 32, 34, wherein in particular an average value of the vegetation index is determined for the determination of the temporal progression of the vegetation index for the individual garden areas 30, 32, 34 and the different times for determining the temporal progression of the vegetation index. The determination of the temporal progression of the vegetation index of a garden area 30, 32, 34 is carried out as a function of the individual values of the illumination parameter, values of the position parameter of the vegetation monitoring device 14 associated with the values of the vegetation index used to determine the temporal progression of the vegetation index of the respective garden area 30, 32, 34, values of the position parameter of the sun 88 and values of the orientation parameter of the respective garden area 30, 32, 34, wherein in particular the respective values are associated with an at least substantially similar capture time as the image data used to determine the respective value of the vegetation index. Preferably, it is conceivable that the illumination parameter, the position parameter of the vegetation monitoring device 14, the position parameters of the sun 88 and the orientation parameter of the garden areas 30, 32, 34 are each taken into account via a correction factor when taking into account values of the vegetation index to determine the temporal progression of the vegetation index and/or determined values of the vegetation index are selected to determine the temporal progression of the vegetation index as a function of the illumination parameter, the position parameter of the vegetation monitoring device 14, the position parameter of the sun 88, and the orientation parameter of the garden areas 30, 32, 34. In particular, determined values of the vegetation index which were determined based on image data at the capture time of which a rain condition was positively determined, in particular via the rain condition parameter provided, are discarded and/or not taken into account when determining the temporal progression of the vegetation index.

In a further method step 128 of method 112, a value of the health state parameter of the garden 10 is determined by means of the trained machine learning system 84, preferably as a function of the determined vegetation index or the determined progression of the vegetation index and the captured/determined garden parameters. It is conceivable that a value of the health state parameter is determined for the garden areas 30, 32, 34, or that a value of the health status parameter is determined for all the garden areas 30, 32, 34 of the garden 10 together. In a further method step 130 of method 112, the determined value(s) of the health state parameter is output to a user. In a further method step 132 of method 112, at least one of the vegetation maintenance devices 18, 20, 22 is controlled by means of the computing unit 26 as a function of the determined value(s) of the health state parameter and/or the determined temporal progression of the vegetation index for carrying out an activity associated with the respective vegetation maintenance device 18, 20, 22. It is conceivable that in a further method step 134 of method 112, an activity of at least one of the vegetation maintenance devices 18, 20, 22 is monitored by means of the computing unit 26 via captured image data of the garden areas 30, 32, 34.

In FIG. 4, three exemplary different options to arrange the vegetation monitoring device 14 on a/the wall 24 are shown, wherein the vegetation monitoring device 14 is arranged at different mounting height 136, 138, 140 on the wall 24 in each case. For the different mounting heights 136, 138, 140 of the vegetation monitoring device 14, the vegetation monitoring device 14 has a different inclination angle 142 or a different main viewing direction 40 relative to an exemplary garden area 30 of the garden 10. In particular, the inclination angle 142 corresponds to a mounting angle of the vegetation monitoring device 14. FIG. 4 shows the garden area 30 by way of example as being at least substantially planar and horizontally aligned. However, it is also conceivable that the garden area 30 is configured inclined relative to the horizontal (indicated in FIG. 4). The orientation parameter of the garden area 30 preferably describes the inclination of the garden area 30 in space and/or a spatial progression of a surface of the garden area 30. In particular, a value of the vegetation index determined for the garden area 30 is affected as a function of an angle 144 between the main viewing direction 40 of the vegetation monitoring device 14, in particular the camera unit 28, and the garden area 30. It is conceivable that the vegetation maintenance device 18 is provided to capture the orientation parameter of the garden area 30, for example, via the detection element(s) 50, 111, which is/are designed as an inclination sensor and/or as a camera, of the detection unit 16. It is conceivable that the vegetation maintenance device 18 is provided to capture the vegetation monitoring device 14, in particular the mounting height 136, 138, 140 and/or the mounting angle and/or the inclination angle 142 of the vegetation monitoring device 14, for example via the detection element 50 of the detection unit 16, which is configured as a camera.

FIG. 5 shows an example of five images 146, 148, 150 of a garden area 30 captured over time intervals. For the garden area 30, pixel-by-pixel reflectivity values for the first range and the second range of the electromagnetic spectrum are captured via the image data. In particular, the images 146, 148, 150 shown in FIG. 5 each show pixel-by-pixel determined values of the vegetation index for the garden area 30. The determined values of the vegetation index are shown as a color-coded heat map in the garden area 30. In the fourth image 148, a movement path 152 of a person 68 or an animal in the garden area 30 is shown as an example, which can be detected in particular via the determined values of the vegetation index. In the fifth image 150, a foreign object 54 arranged in the garden area 30 is shown as an example, which can be detected in particular via the determined values of the vegetation index.

In FIG. 6, a determined temporal progression 154 of the vegetation index for a garden area 30 and a temporal progression 156 of a rain condition parameter of the garden area 30 configured as a captured amount of precipitation in the garden area 30 is shown by way of an example. In particular, an abscissa 155 indicates time. Preferably, an ordinate 157 indicates the value of the vegetation index or the amount of precipitation. In particular, the temporal progression 154 of the vegetation index is shown independent of consideration of a correction factor determined as a function of the rain condition parameter. It can be clearly seen that a lower value for the vegetation index is determined in the event of an increase in the amount of precipitation, for example at time $t_1$. Preferably, water in the captured garden area 30 affects an absorption of radiation in the near-infrared range (second range) that is used to determine the vegetation index. It is conceivable that values of the vegetation index are taken into account to determine the temporal progression 154 of the vegetation index as a function of a value of the rain condition parameter at the time of capturing the image data used to determine the individual values of the vegetation index with a correction factor, which is in particular provided to compensate for the effects of water in the garden area 30 on the determined value of the vegetation index. Alternatively or additionally, it is conceivable that, in order to determine the temporal progression 154 of the vegetation index for the garden area 30, values of the vegetation index are discarded for which a value of the rain condition parameter, which has an at least substantially similar capture time as image data used to determine the respective value of the vegetation index, exceeds a certain limit value 158 (shown as an example in FIG. 6)

Figure 7:
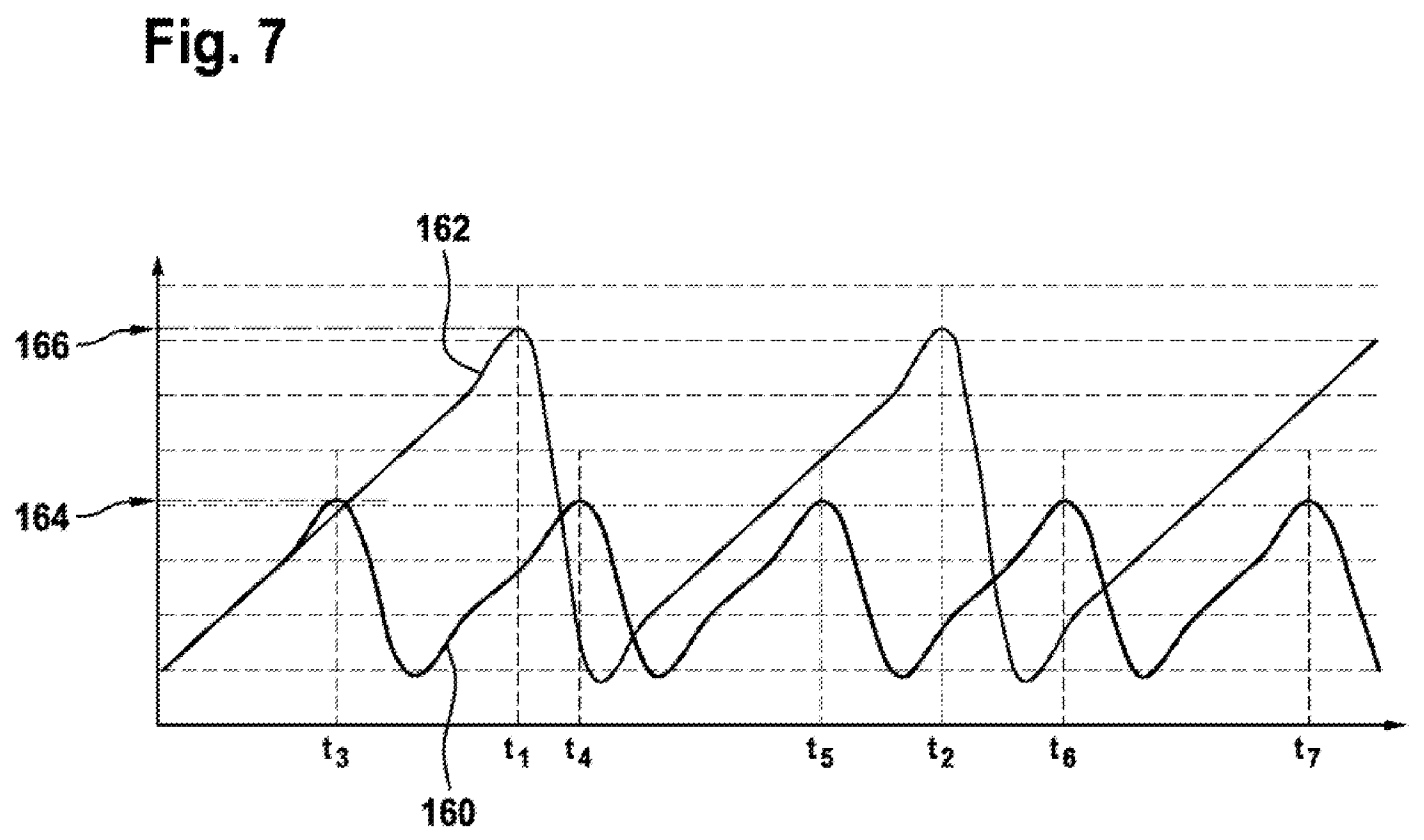

FIG. 7 shows, by way of example, two temporal progressions 160, 162 of the vegetation index for a garden area 32, wherein an activity configured as a mowing operation in the garden area 32 is carried out at a different frequency in each case. In particular, the vegetation maintenance device 18 is controlled to cut the lawn in the garden area 32 as a function of a limit value 164, 166 of the vegetation index of the garden area 32. In the first temporal progression 160 of the vegetation index, a limit value 164 of the vegetation index is less than a limit value 166 in the second temporal progression 162. FIG. 7 clearly shows an effect of pruning activities in the garden area 32 on the vegetation index. In particular, at times $t_1$ and $t_2$ in the first temporal progression 160 of the vegetation index and at times $t_3$, $t_4$, $t_5$, $t_6$ and $t_7$ in the second temporal progression 162 of the vegetation index, a pruning activity took place in the garden area 32. Preferably, it is conceivable that the computing unit 26 is configured to detect these spontaneous drops over the temporal progression 160, 162 of the vegetation index and associate them with a pruning activity in the garden area 32.

FIG. 8 shows a plurality of temporal progressions 168, 170, 172, 174, 176, 178 of the vegetation index for a garden area 34 over one day for different times within a calendar year. An abscissa 180 indicates a time of day, wherein in particular the abscissa 180 shown in FIG. 8 comprises a time period from 6 am to 5 pm. An ordinate 182 indicates a value of the vegetation index for the particular time of day. FIG. 8 shows six different temporal progressions 168, 170, 172, 174, 176, 178 of the vegetation index for the garden area 34, wherein a first temporal progression 168 of the vegetation index was captured on January 1. The other temporal progressions 170, 172, 174, 176, 178 of the vegetation index are each captured with a 60 day offset in the calendar year. In particular, a second temporal progression 170 of the vegetation index is captured on the 60th day in the calendar year. In particular, a third temporal progression 172 of the vegetation index is captured on the 120th day in the calendar year. In particular, a fourth temporal progression 174 of the vegetation index is captured on the 180th day in the calendar year. In particular, a fifth temporal progression 176 of the vegetation index is captured on the 240th day in the calendar year. In particular, a sixth temporal progression 178 of the vegetation index is captured on the 300th day in the calendar year. FIG. 8 shows how the vegetation index changes as a function of a position of the sun 88, wherein a minimum of the temporal progressions 168, 170, 172, 174, 176, 178 of the vegetation index captured over a day fluctuates by about 16% over the calendar year.

FIG. 9 shows a plurality of determined values of the vegetation index for a garden area 30 as a function of an inclination angle of the sun 88 relative to the garden area 30. An abscissa 184 represents the inclination angle of the sun 88, wherein in particular the range of the inclination angle of the sun 88 shown in FIG. 9 extends from 25° to 85°. An ordinate 186 represents the determined value of the vegetation index. The determined values of the vegetation index change by up to around 10% over the considered angular range of the inclination angle of the sun 88. In particular, this influence of the inclination angle of the sun 88 can be taken into account to determine a temporal progression of the vegetation index for a garden area 30, 32, 34 via the position parameter of the sun 88, wherein preferably values of the vegetation index are selected as a function of a value of the position parameter of the sun 88 that is captured at least substantially simultaneously in each case and/or are taken into account by means of correction factor determined as a function of a value of the position parameter of the sun 88 that is captured at least substantially simultaneously in each case when determining the temporal progression of the vegetation index.

In FIG. 10, an exemplary sequence of a method 188 for intelligently extending a vegetation monitoring system 12 for monitoring a vegetation health in the garden 10 using the vegetation monitoring system 12, in particular the vegetation monitoring device 14, is schematically proposed. In a method step 190 of method 188, image data of one of the garden areas 30, 32, 34 is captured using the camera unit 28 of the vegetation monitoring device 14. The captured image data of the garden area(s) 30, 32, 34 is provided to the computing unit 26. In a further method step 192 of method 188, values of the vegetation index of the garden area(s) 30, 32, 34 are determined using the computing unit 26 as a function of the captured and provided image data. Preferably, a plurality of values of the vegetation index are determined for the individual garden areas 30, 32, 34 (see FIG. 5). In particular, an average value of the vegetation index is determined for the individual garden areas 30, 32,

34. In a further method step 194 of the method 188, at least one device to be integrated into the vegetation monitoring system 12, for example a further vegetation maintenance device, a further detection element of the detection unit, a further vegetation monitoring device 90 or the like, is proposed by means of the computing unit 26 as a function of the determined vegetation index and/or of the detected image data. Preferably, a proposal for the device to be integrated into the vegetation monitoring system 12 is generated as the output signal of the computing unit 26. Preferably, the suggestion/the output signal comprising the suggestion is output, in particular via the communication unit 58 and/or an, for example optical or acoustic, output unit of the vegetation monitoring system 12 (not shown in figures), which is designed, for example, as a loudspeaker or the like, to a user and/or, in particular via the communication unit 58, to an external device 195 (see FIG. 1) assigned to a user, such as a smartphone, a smartwatch, another computer or the like. Alternatively, it is conceivable that the method 188 for intelligently extending a vegetation monitoring system 12 is carried out, in particular exclusively, by means of a portable device, preferably via an application executable via the portable device. In particular, it is conceivable that the image data is captured via a camera of the portable device and/or that the device to be integrated is determined exclusively from captured image data.

FIG. 11 schematically shows an exemplary sequence of a method 196 for intelligently cutting vegetation in the garden 10 by means of the vegetation monitoring system 12, in particular by means of the computing unit 26. In a method step 198 of the method 196, image data is provided from one or more of the garden areas 30, 32, 34. In particular, the image data is captured and transmitted to the computing unit 26 by means of the camera unit 28. In a further method step 200 of method 196, the vegetation index for the garden areas 30, 32, 34 is provided. Preferably, the vegetation index is determined as a function of the captured/provided image data, in particular by means of the computing unit 26. In at least one method step, in particular the method step 200, preferably when a pruning activity in the garden area 30, 32, 34 is detected and/or after receiving a user input regarding a pruning activity carried out by the user, a temporal progression of the vegetation index and/or a growth pattern of the garden area(s) 30, 32, 34 is analyzed with respect to the pruning activities carried out in the garden area(s) 30, 32, 34. Preferably, control signals for carrying out the pruning activity are generated, in particular by means of the computing unit 26, as a function of a pruning activity detected in the garden area(s) 30, 32, 34 and/or a pruning activity detected by the user input. Preferably, by generating the control signals as a function of a pruning activity detected in the garden area(s) 30, 32, 34 and/or a pruning activity carried out by the user detected by the user input, a time of the pruning activity to be carried out by the vegetation maintenance device 18 is adjusted, in particular postponed to a later date and/or limited to one or more particular garden areas 30, 32, 34, which in particular are not affected by the pruning activity detected in the garden area(s) 30, 32, 34 and/or the pruning activity carried out by the user detected by the user input. Alternatively or additionally, it is conceivable that, depending on a pruning activity detected in the garden area(s) 30, 32, 34 and/or a pruning activity performed by the user detected by the user input, the threshold value for generating the control signals is adjusted, in particular at least temporarily. In a method step of method 196, in particular method step 200, a required pruning activity to intelligently cut plants in the garden areas 30, 32, 34 is determined.

In a further method step 202 of method 196, control signals are generated to control the vegetation maintenance device 18, which is configured as a robotic lawn mower, to carry out the at least one pruning activity in the garden area(s) 30, 32, 34. Preferably, the control signals are generated by means of the computing unit 26. In particular, the control signals are transmitted from the computing unit 26 to the vegetation maintenance device 18 via the communication unit 58 for controlling the vegetation maintenance device 18. In a method step of method 196, in particular method step 202, at least one growth pattern of plants in the garden area(s) 30, 32, 34 is detected based on the image data and/or the vegetation index, wherein the control signals are generated as a function of the detected growth pattern. For example, regions in the garden areas 30, 32, 34 with different levels of lawn growth are detected. In a method step of method 196, in particular method step 202, the control signals for carrying out the pruning activity are generated, such that a particular growth pattern in the garden area(s) 30, 32, 34 is achieved and/or a temporal progression of the vegetation index in the garden area(s) 30, 32, 34 is optimized. The control signals comprise at least one value for a processing parameter of the vegetation maintenance device 18, which is set via the control signals for controlling the vegetation maintenance device 18 as a function of the determined vegetation index. In a method step of method 196, in particular method step 202, a machine learning method is used to generate the control signals in order to optimize the temporal progression of the vegetation index, wherein the provided image data and/or captured values of the vegetation index are taken into account. In a method step of method 196, in particular method step 202, the control signals are generated, such that the pruning activity is carried out when the determined vegetation index reaches the specific threshold value for the vegetation index. It is conceivable that the specific threshold value is stored and/or adjusted upon commissioning, manufacture, and/or maintenance of the vegetation monitoring system 12. Preferably, it is conceivable that the specific threshold value is adjusted using the machine learning method, in particular as a function of the determined temporal progression of the vegetation index in the respective garden area(s) 30, 32, 34.

It is conceivable that in at least one further method step 205 of method 196, at least one leaf area index is provided for the garden area(s) 30, 32, 34, wherein the control signals are generated, in particular in method step 202, as a function of a ratio between the leaf area index and the vegetation index of the garden area(s 30, 32, 34. It is conceivable that in a method step of method 196, in particular the method step 202, the garden area(s) 30, 32, 34 are divided into a plurality of individual maintenance areas based on the image data, which in particular each differ from the garden areas 30, 32, 34, wherein a set of control signals is generated in each case for the maintenance areas or for a selection of the maintenance areas, or at least one control command is integrated into each control signal.

In a further method step 204 of the method 196, the pruning activity is carried out by means of the vegetation maintenance device 18 in the garden area(s) 30, 32, 34 or the maintenance areas as a function of the generated/transmitted control signals. It is conceivable that the pruning activity is controlled at least substantially completely via the control signals/by means of the computing unit 26, or that only a single or a plurality of processing parameters of the vegetation maintenance device 18 are adjusted as a function of the control signals, wherein in particular the vegetation maintenance device 18 for carrying out the pruning activity is controlled at least in part, in particular at least for the most part, via the vegetation maintenance device 14 and/or another control unit of the vegetation monitoring system 12.

In a further method step 206 of method 196, in particular in addition to the control of the vegetation maintenance device 18, a proposal for an activity to be carried out by a user is generated as a function of a determined vegetation index, a detected growth pattern, and/or a determined leaf area index of garden area(s) 30, 32, 34. Preferably, the proposal is generated via an output signal by means of the computing unit 26. Preferably, the output signal is output to the external device 195 associated with the user via the communication unit 58 and/or to the user by means of the output unit of the vegetation monitoring system 12. In at least one method step, in particular method step 198 or method step 200, at least one additional garden parameter, in particular a weather condition, a temperature, a ground oil content parameter, or the like, is provided, wherein the pruning activity for the garden area(s) 30, 32, 34 is determined as a function of the additional garden parameter or proposed to a user.

FIG. 12 schematically shows an exemplary sequence of a method 208 for determining the vegetation index for the garden 10 taking into account the illumination parameter. In a method step 210 of method 208, image data is provided from one or a plurality of the garden areas 30, 32, 34. In particular, the image data is captured and transmitted to the computing unit 26 by means of the camera unit 28. It is conceivable that in a method step of method 208, the vegetation index is determined in a specific time interval before sunset or after sunrise, in particular at a periodic daily interval, wherein in particular in method step 210, image data to be used to determine the vegetation index is captured within the specific time interval.

In a further method step 212 of method 208, the illumination parameter is provided for an area which is located within or in the vicinity of the garden 10, in particular the garden area(s) 30, 32, 34, and/or which comprises the garden 10, in particular the garden area(s) 30, 32, 34, wherein the illumination parameter is provided for a capture period of the image data. In a method step of method 208, in particular method step 212, the illumination parameter is identified and/or determined based on the image data, preferably by means of the camera unit 28 and/or the computing unit 26. In a method step of method 208, in particular method step 212, at least one reference object and/or at least one reference surface (in FIG. 1, for example, a surface of the foreign object 54) in the garden area(s) 30, 32, 34 is detected to identify the illumination parameter based on the image data. Alternatively or additionally, it is conceivable that an orientation of the vegetation monitoring device 14 capturing the image data relative to the garden area(s) 30, 32, 34 and a global position of the vegetation monitoring device 14 and/or the garden area(s) 30, 32, 34 are provided to a method step of the method 208, in particular to a further method step 214, wherein the illumination parameter is determined as a function of the orientation of the vegetation monitoring device 14 relative to the garden area(s) 30, 32, 34 and the global position of the vegetation monitoring device 14 and/or the garden area(s) 30, 32, 34. In a method step of method 208, in particular method step 212, at least one weather parameter is provided to the computing unit 26 and/or transmitted to the computing unit 26, in particular by the detection unit 16 and/or the external unit 62.

In a further method step 216 of method 208, a temporal progression of the illumination parameter is determined, in particular by means of the computing unit 26. Interfering light sources within or in the vicinity of the garden areas 30, 32, 34 are identified as a function of the temporal progression of the illumination parameter, in particular by means of the computing unit 26. For interfering light sources, a time interval is determined for which the respective interfering light source has been identified. The time interval for which an interfering light source has been identified is taken into account when determining the vegetation index. Preferably, time intervals for which an interfering light source has been identified are excluded when determining the vegetation index, wherein in particular captured image data captured within the time intervals is discarded for determining the vegetation index.

In a further method step 218 of method 208, the vegetation index of the garden area(s) 30, 32, 34 is determined as a function of the image data and the illumination parameter, wherein a determination of the vegetation index is adjusted as a function of a value of the illumination parameter. The vegetation index, in particular a time to determine the vegetation index at which preferably the image data used to determine the vegetation index has been captured is determined as a function of the weather parameter and the illumination parameter. In a method step of method 208, in particular method step 218, determined values of the vegetation index are each associated with at least one value of the illumination parameter, wherein image data used to determine the respective value of the vegetation index and the value of the illumination parameter associated with the value of the vegetation index each have an at least substantially similar capture period. In a method step of method 208, in particular method step 218, the vegetation index is determined using at least one correction factor depending on a value of the illumination parameter, wherein image data used to determine the vegetation index and the illumination parameters each have an at least substantially similar capture period.

In a further method step 220 of method 208, a temporal progression of the vegetation index is determined from determined values of the vegetation index, in particular by means of the computing unit 26, wherein, when comparing values of the vegetation index, in particular to generate the temporal progression of the vegetation index, values of the illumination parameter associated with the respective values of the vegetation index are taken into account. Preferably, only values of the vegetation index whose associated values of the illumination parameter do not exceed a certain maximum deviation from one another or from a predefined limit value are used and/or compared when comparing values of the vegetation index, in particular to generate the temporal progression of the vegetation index. The plurality of determined values of the vegetation index to determine the temporal progression of the vegetation index are each selected as a function of a value of the illumination parameter associated with the respective determined value of the vegetation index, wherein in particular determined values of the vegetation index are selected with which an at least substantially similar value of the illumination parameter is associated in each case.

It is conceivable that a determination of the vegetation index, in particular capturing image data to be used to determine the vegetation index, is carried out using the artificial light source 86. In particular, it is conceivable that in a method step of method 208, in particular method step 210, at least one control signal for activating the artificial light source 86 for the garden area(s) 30, 32, 34 is generated for determining the vegetation index, in particular for capturing image data to be used to determine the vegetation index, preferably by means of the computing unit 26, wherein in particular the artificial light source 86 is activated via the control signal for a capture period of the image data.

FIG. 13 schematically shows an exemplary sequence of a method 222 for determining the vegetation index in the garden 10, taking into account the position parameter of the vegetation monitoring device 14 and the position parameter of the light source formed by the sun 88. In a method step 224 of method 222, image data captured by the vegetation monitoring device 14 is provided from one or a plurality of the garden areas 30, 32, 34 illuminated by a light source, in particular the sun 88. In particular, the image data is captured and transmitted to the computing unit 26 by means of the camera unit 28.

In a further method step 226 of method 222, the position parameter of the vegetation monitoring device 14 is provided. It is conceivable that in a method step of method 222, in particular method step 226, an orientation of the cameras 76, 78 of the camera unit 28 of the vegetation monitoring device 14 is provided as the position parameter of the vegetation monitoring device 14. The position parameter of the vegetation monitoring device 14 is determined as a function of the captured image data, in particular by means of the computing unit 26. It is conceivable that in a method step of method 222, in particular method step 226, at least one dimension parameter of a reference object captured via the image data is provided within the garden area(s) 30, 32, 34, wherein the position parameter of the vegetation monitoring device 14 is determined as a function of the dimension parameter of the reference object.

In a further method step 228 of method 222, the position parameter of the light source is provided. The position parameter of the light source is determined as a function of the captured image data, in particular by means of the computing unit 26. Alternatively, it is conceivable that the position parameter of the vegetation monitoring device 14 and/or the position parameter of the light source, in particular in a further method step of method 222, is provided independent of the captured image data. It is conceivable that in a method step of method 222, in particular method step 226 or method step 228, at least one shading parameter of a reference object in the garden area(s) 30, 32, 34 is identified from the image data, in particular by means of the computing unit 26, wherein the position parameter of the vegetation monitoring device 14 and/or the position parameter of the light source is determined as a function of the identified shading parameter of the reference object. Alternatively or additionally, it is conceivable that in a method step of method 222, in particular method step 226 or method step 228, at least one input prompt for a user to transmit to an external device 195 and/or to the output device of vegetation monitoring system 12 is generated to determine the position parameter of the vegetation monitoring device 14 and/or the position parameter of the light source. In particular, the position parameter of the vegetation monitoring device 14 and/or the position parameter of the light source, in particular via the communication unit 58, is provided by the user or an external device 195 associated with the user. Alternatively or additionally, it is conceivable that in a method step of method 222, in particular method step 226 or method step 228, the captured image data are integrated, in particular by means of the computing unit 26, into at least one output signal for transmission to an external device 195 and/or an external unit 62, wherein, in at least one further method step 230, in particular after method step 228, at least one input signal from the external device 195 and/or the external unit 62 is received and processed, in particular by means of the computing unit 26, which, in particular based on the transmitted image data, provides the position parameter of the vegetation monitoring device 14 and/or the position parameter of the light source. Alternatively or additionally, it is conceivable that in a method step of method 222, in particular method step 226 or method step 228, the position parameter of the vegetation monitoring device 14 and/or the position parameter of the light source is determined based on the image data using a machine learning method, which in particular uses additional image data provided by the external device 195 and/or the external unit 62.

In a further method step 232 of method 222, the vegetation index of the garden area(s) 30, 32, 34 is determined as a function of the image data, the position parameter of the vegetation monitoring device 14, and the position parameter of the light source. In addition, it is conceivable that at least one method step of method 222, in particular one of method steps 226, 228, 230, provides at least one position parameter of the garden area(s) 30, 32, 34 relative to the vegetation monitoring device 14 and/or the light source and, in particular in method step 232, is taken into account when determining the vegetation index.

In a further method step 234 of method 222, determined values of the vegetation index are each associated with at least one value for the position parameter of the light source and for the position parameter of the vegetation monitoring device 14, wherein associated values for the position parameters of the vegetation monitoring device 14 and the light source have each been provided for a time, that is at least substantially similar to a capture time of the image data used to determine the vegetation index.

In a further method step 236 of method 222, a temporal progression of the vegetation index is determined, in particular in each case for the individual garden areas 30, 32, 34, for a selection of garden areas 30, 32, 34 and/or for all garden areas 30, 32, 34, from a plurality of determined values of the vegetation index, wherein the plurality of determined values of the vegetation index is selected, such that at least substantially similar, in particular at least substantially identical, values for the position parameter of the light source and/or for the position parameter of the vegetation monitoring device 14 are associated with them in each case. Alternatively or additionally, it is conceivable that in a method step of method 222, in particular method step 236, the temporal progression of the vegetation index is determined from a plurality of determined values of the vegetation index, wherein at least one correction factor is used to take into account differences between the values of the position parameter of the light source associated with the individual values of the vegetation index and/or differences between the values of the position parameter of the vegetation monitoring device 14 associated with the individual values of the vegetation index.

FIG. 14 schematically shows an exemplary sequence of a method 238 for determining the vegetation index in the garden 10 taking into account an orientation parameter of the garden area(s) to be captured 30, 32, 34. In a method step 240 of method 238, image data is provided from one or a plurality of the garden area(s) 30, 32, 34. In particular, the image data is captured and transmitted to the computing unit 26 by means of the camera unit 28.

In a further method step 242 of method 238, the at least one orientation of the garden areas 30, 32, 34 relative to the main viewing direction 40 of the vegetation monitoring device 14, in particular the camera unit 28, is provided descriptive orientation parameters of the garden area(s) 30, 32, 34. Preferably, for a plurality of garden areas 30, 32, 34 to be captured, at least one orientation parameter and/or at least one value of the/one orientation parameter is provided for each garden area 30, 32, 34. The orientation parameter(s) are determined by the computing unit 26, in particular as a function of the captured image data and/or further data captured via the vegetation monitoring system 12, in particular the detection unit 16 and/or the vegetation maintenance device 18, or, in particular in a further method step 243 of method 238, provided by means of an external unit 62 and/or a user. In a method step of method 238, in particular method step 242, a distance of the vegetation monitoring device 14 to the individual garden area(s) 30, 32, 34 and the mounting height of the vegetation monitoring device 14 relative to the ground are provided, wherein the main viewing direction 40 of the vegetation monitoring device 14, in particular for determining the orientation parameter, preferably by means of the computing unit 26, is determined as a function of the distance of the vegetation monitoring device 14 to the garden area(s) 30, 32, 34 and of the mounting height of the vegetation monitoring device 14 relative to the ground. Alternatively or additionally, it is conceivable that in a method step of method 238, in particular method step 242, the mounting angle of the vegetation monitoring device 14 is provided, wherein the main viewing direction 40 of the vegetation monitoring device 14, in particular for determining the orientation parameter, is determined as a function of the mounting angle of vegetation monitoring device 14. Alternatively or additionally, it is conceivable that in a method step of method 238, in particular method step 242, an orientation of the garden area(s) 30, 32, 34 relative to a horizontal plane is provided, wherein the orientation parameter is determined as a function of the orientation of the garden area(s) 30, 32, 34 relative to the horizontal plane. In particular, it is conceivable that in a further method step 245 of the method 238, the distance of the vegetation monitoring device 14 to the individual garden area(s) 30, 32, 34 and/or the mounting height of the vegetation monitoring device 14 relative to the ground is determined by means of at least one, in particular mobile, device of the vegetation monitoring system 12 with a camera, in particular the detection element 50 of the detection unit 16 and/or the vegetation maintenance device 18, wherein the vegetation monitoring device 14 is detected by the detection element 50 designed as a camera and localized relative to the mobile device, in particular the vegetation maintenance device 18. Alternatively or additionally, it is conceivable that in a method step of method 238, in particular method step 242, at least one input prompt for a user to input the mounting height of vegetation monitoring device 14 relative to the ground is generated. In particular, the prompt is transmitted to an external device 195 assigned to the user by means of the communication unit 58 and/or output to the user by means of the output unit. Alternatively or additionally, it is conceivable that in a method step of method 238, in particular method step 242, at least one reference object, in particular at least one orientation parameter and/or at least one dimension parameter of a reference object, is identified in the garden area(s) 30, 32, 34 based on the image data, wherein an orientation of the garden area(s) 30, 32, 34 relative to a horizontal, the main viewing direction 40 of the vegetation monitoring device 14 and/or the orientation parameter is determined, preferably by means of the computing unit 26, as a function of the reference object, in particular the orientation parameter and/or the dimension parameter of the reference object. Alternatively or additionally, it is conceivable that in a method step of method 238, in particular the method step 240 or the method step 242, the orientation parameter is determined, preferably by means of the computing unit 26, as a function of an input signal transmitted by an external device 195, an external unit 62 or another device of the vegetation monitoring system 12, which input signal comprises in particular an orientation of the respective garden area 30, 32, 34, a position of the vegetation monitoring device 14 and/or an orientation of the vegetation monitoring device 14.

In particular for an embodiment of the vegetation monitoring system 12, in particular the vegetation monitoring device 14, in which the vegetation monitoring device 14 is configured to be movable or the vegetation monitoring system 12 comprises the further vegetation monitoring device 90, it is conceivable that in a method step of method 238, in particular method step 242, at least two images captured in different positions of the vegetation monitoring device 14 are provided via the image data, wherein the distance of the vegetation monitoring device 14 to the garden area(s) 30, 32, 34 is determined by means of a triangulation method as a function of the at least two images.

In a further method step 244 of method 238, the vegetation index of the garden area(s) 30, 32, 34 is determined as a function of the image data and the orientation parameter (s), preferably by means of the computing unit 26. In a further method step 246 of method 238, a temporal progression of the vegetation index for one of the garden area(s) 30, 32, 34 is determined as a function of a plurality of determined values of the vegetation index, wherein each orientation parameter of the individual garden areas 30, 32, 34 is taken into account. Preferably, values of the vegetation index for individual garden areas 30, 32, 34 to be used to determine the temporal progression of the vegetation index are selected as a function of a value of the orientation parameter and/or of the respective orientation parameter of the respective garden area 30, 32, 34 and/or are adjusted with a correction factor as a function of a value of the orientation parameter and/or of the respective orientation parameter of the respective garden area 30, 32, 34 for determining the temporal progression of the vegetation index.

FIG. 15 schematically shows an exemplary sequence of a method 248 for evaluating the health of the garden 10 by determining the garden health parameter. In a method step 250 of method 248, at least one value of the vegetation index is provided for the garden areas 30, 32, 34 of the garden 10, in particular all or selected garden areas 30, 32, 34 of the garden 10. Preferably, the values of the vegetation index for the individual garden areas 30, 32, 34 are determined by the computing unit 26 using captured image data of the individual garden areas 30, 32, 34, preferably by one or a plurality of the methods 196, 208, 222 shown above for determining the vegetation index. It is conceivable that a temporal progression of the vegetation index is provided for determining the garden health parameter for the garden areas 30, 32, 34 in each case.

In a further method step 252 of method 248, at least one value is provided for each of a plurality of different environmental parameters of the garden areas 30, 32, 34 or the garden 10, wherein each of the values of the environmental parameters is associated with one of the values of the vegetation index over a capture period. In a method step of method 248, in particular method step 252, at least one temperature parameter, which can be associated with the garden 10, in particular the individual garden areas 30, 32, 34, or an environment of the garden 10, is provided as one of the environmental parameters. In a method step of method 248, in particular method step 252, at least one air pressure parameter, which can be associated with the garden 10, in particular the individual garden areas 30, 32, 34, or an environment of the garden 10, is provided as one of the environmental parameters. In a method step of method 248, in particular method step 252, at least one humidity parameter, which can be associated with the garden 10, in particular the individual garden areas 30, 32, 34, or an environment of the garden 10, is provided as one of the environmental parameters. In a method step of method 248, in particular method step 252, a capture time, in particular a capture time of captured image data used to determine the respective value of the vegetation index, is provided for each of the values of the vegetation index, and a capture time for determining the garden health parameter is provided for each of the values of the environmental parameters. In a method step of method 248, in particular method step 252, at least one orientation parameter of vegetation monitoring device 14 configured to capture the image data for determining the values of the vegetation index is provided. In a method step of method 248, in particular method step 252, a value of the orientation parameter of the garden areas 30, 32, 34 is provided as one of the environmental parameters for each of the garden areas 30, 32, 34. In a method step of method 248, in particular method step 252, a global position of the garden areas 30, 32, 34 and a time of year with which the parameters, in particular the values of the vegetation index and the values of the environmental parameters, can be associated over a respective capture period area are provided.

In a further method step 254 of the method 248, using the machine learning system 84, which is trained to determine a value of the garden health parameter from a plurality of predefined values of the garden health parameter in dependence on the at least one vegetation index and the plurality of environmental parameters, a value of the garden health parameter for the garden 10 and/or the individual garden areas 30, 32, 34 is determined in dependence on the provided values of the vegetation index and on the provided values of the environmental parameters (see also FIG. 17). Alternatively, it is conceivable that at least one value of the garden health parameter is determined separately for each of the garden areas 30, 32, 34 in order to evaluate the health of the garden 10. In a method step of method 248, in particular method step 254, the garden health parameter is determined as one of four different values indicative of the health of the garden 10. The four different values of the garden health parameter are preferably given in a clear order. In particular, the four different values of the garden health parameter are configured as "poor, neutral, good, very good". However, other embodiments of the values of the garden health parameter are also conceivable, for example as numerical values of a scale or the like. In a method step of the method 248, in particular the method step 254, at least one individual determination parameter designed as a weighting factor for the vegetation index and/or for the various environmental parameters is taken into account in each case to determine the garden health parameter. In particular, the determination parameters are determined during training of the machine learning system 84 (see FIG. 16). In a method step of method 248, in particular method step 254, the parameters for determining the garden health parameter, in particular the values of the vegetation index and the values of the environmental parameters, are weighted against each other in at least two consecutive steps 256, 258 (see FIG. 17), wherein the consecutive steps 256, 258 each comprise a plurality of nodes 260, 262 of the machine learning system 84 (see. FIG. 17)

FIG. 16 schematically shows an exemplary sequence of a method 264 for training the machine learning system 84 for use when determining the garden health parameter. In a method step 266 of method 264, training data comprising a plurality of values of the vegetation index from a plurality of different garden areas 30, 32, 34 and/or from a plurality of different gardens 10, as well as a plurality of values for each environmental parameter to be taken into account when determining the garden health parameter are provided, wherein each value of the environmental parameters can be associated or is associated over a capture period with at least one of the provided values of the vegetation index. Preferably, the training data is provided via the communication unit 58 and/or another/the computing unit 26.

In a further method step 268 of the method 264, training output data is provided comprising at least one value of the garden health parameter for the garden 10 and/or the garden areas 30, 32, 34 for each associated set of vegetation index and environmental parameter values included in the training data. Preferably, the training output data is provided via the communication unit 58 and/or another/the computing unit 26.

In a further method step 270 of method 264, the machine learning system 84 is trained, wherein at least one value of the garden health parameter associated with the extracted values provided via the training output data is determined as a function of values for the vegetation index and the environmental parameters extracted from the training data, wherein determination parameters of the machine learning system 84 are adapted, such that the machine learning system 84 determines the respective associated training output data based on the determination parameters and the training input data provided. In particular, the determination parameters are configured as bias values, weighting factors and/or as threshold values, in particular for individual parameters to be taken into account by the machine learning system. Preferably, the determination parameters, which are applied in each case to a value taken from the training data, are determined, wherein in particular certain determination parameters for determining a garden health parameter are stored. Preferably, when training the machine learning system 84 for the vegetation index and the environmental parameters, in each case at least one determination parameter and/or in each case at least one value of one or a plurality of determination parameters is determined and associated with the respective parameter, in particular the vegetation index or one of the environmental parameters. Preferably, the determination parameters, in particular values of the various determination parameters, are determined when training the machine learning system 84 via an optimization algorithm, which is in particular configured to optimize according to a match of determined values of the garden health parameter with values of the training output data. In particular, the determination parameters, especially values of the various determination parameters, are determined using a gradient descent method.

In a further method step 272 of the method 264, at least one user evaluation is provided for one or more values of the garden health parameter determined during training of the machine learning system 84 and/or for one or more specific determination parameters, in particular in each case. For example, the user evaluation is provided via the communication unit 58 and/or via an input unit of the vegetation monitoring system 12.

In a further method step 274 of method 264, the machine learning system 84 is trained again, wherein at least one stored determination parameter is adjusted as a function of a user evaluation. Preferably, it is conceivable that the method 264 for training the machine learning system 84 is carried out periodically and repeatedly during an operation of the vegetation monitoring device 14 or the vegetation monitoring system 12, wherein in particular image data captured during the operation, captured garden parameters, and/or determined values of the vegetation index and/or the garden health parameter are used as training data and/or training output data.

The methods 112, 188, 196, 208, 222, 238, 248 described in FIGS. 3, 10, 11, 12, 13, 14, 15, and 16 are in particular configured to be compatible, wherein a person skilled in the art may also combine method steps of methods 112, 188, 196, 208, 222, 238, 248 for monitoring and/or maintaining the garden 10 by means of the vegetation monitoring system 12 as desired.

FIG. 17 shows an exemplary schematic of an operation mode of the machine learning system 84 for determining the garden health parameter. Initially, input data 276 is provided to the machine learning system 84. In particular, the input data 276 comprises at least one determined value of the vegetation index, in particular an average value of the vegetation index for a respective garden area 30, 32, 34 of the garden 10 and/or the garden 10 and for the individual garden areas 30, 32, 34 of the garden 10 and/or the garden 10 each have a value of the illumination parameter, a value of the temperature, a value of the air pressure, a value of air and/or ground moisture, a time of day, a time in the calendar year, an orientation of the camera unit, a value of the position parameter of the vegetation monitoring device and a value of the orientation parameter of the respective garden area 30, 32, 34. In particular, the parameters provided as input data 276 each have a capture time that is at least substantially similar. A different number of parameters provided as input data 276 is also conceivable. In a consecutive step 256, at least two or more of the parameters provided as input data 276 are each weighed against each other in a plurality of nodes 260. Preferably, stored determination parameters of the individual parameters provided as input data 276 are taken into account, which are determined and stored in particular when training the machine learning system 84. In a further consecutive step 258, intermediate factors determined in the consecutive step 256 are weighted against one another in a plurality of nodes 262. Preferably, in the further consecutive step 258, a plurality of end factors are determined, wherein a value of the garden health parameter is determined as a function of a value of the individual end factors. The machine learning system 84 is configured to output one of four different values of the garden health parameter indicative of the health of the garden 10 as output data 278. In particular, other alternative embodiments of the machine learning system 84 are also conceivable, for example with a different number of consecutive steps 256, 258 or layers and/or with a different number of nodes 260, 262 within the consecutive steps 256, 258.

The invention claimed is:

1. A vegetation monitoring system for monitoring vegetation health in a garden, comprising:
   at least one vegetation monitoring device mounted to a wall, the at least one vegetation monitoring device comprising at least one camera unit configured to detect at least one garden area of the garden in at least one visible light range and in at least one infrared range,
wherein the at least one camera unit is mounted to the wall at a position at least substantially above a ground level of the garden, and the at least one camera unit is stationary, and
wherein image data detected by the at least one camera unit is provided for determining a vegetation index of the at least one garden area of the garden; and
at least one vegetation maintenance device configured to carry out at least one activity in the at least one garden area as a function of the determined vegetation index and/or of at least one garden parameter detected in the at least one garden area or assignable to the at least one garden area.

2. The vegetation monitoring system according to claim 1, further comprising:
at least one detection unit configured to detect the at least one garden parameter.

3. The vegetation monitoring system according to claim 2, further comprising:
at least one computing unit, which is connected to at least one camera unit of the vegetation monitoring device, to the vegetation maintenance device and to the at least one detection unit, and which is configured to generate, as a function of the vegetation index and/or the garden parameter detected in the at least one garden area, control signals for controlling the at least one vegetation maintenance device to carry out the at least one activity of the at least one vegetation maintenance device in the at least one garden area.

4. The vegetation monitoring system according to at least claim 3, wherein:
the at least one vegetation maintenance device is configured as a robotic lawn mower; and
the at least one computing unit is configured to generate control signals for controlling the at least one vegetation maintenance device for a mowing operation in the at least one garden area as a function of the vegetation index and/or of the garden parameter detected in the at least one garden area.

5. The vegetation monitoring system according to claim 3, wherein:
the at least one computing unit is further configured to detect persons and/or animals in a vicinity or within the at least one garden area; and
the at least one computing unit is further configured to take into account at least one position and/or at least one movement path of a detected person and/or a detected animal in the at least one garden area for controlling the activity of the at least one vegetation maintenance device.

6. The vegetation monitoring system according to claim 2, wherein the at least one detection unit is arranged on at least one mobile unit of the vegetation monitoring system and/or on the at least one vegetation maintenance device.

7. The vegetation monitoring system according to claim 1, wherein:
at least one computing unit is configured to determine at least one temporal progression of the vegetation index for the at least one garden area;
the at least one computing unit is configured to generate control signals for controlling the at least one vegetation maintenance device as a function of the at least one temporal progression of the vegetation index to carry out the at least one activity of the at least one vegetation maintenance device in the at least one garden area.

8. The vegetation monitoring system according to claim 1, further comprising:
at least one computing unit, wherein
the vegetation monitoring device has at least one camera unit which is configured to determine the vegetation index in the at least one garden area in the at least one visible light range, and
the at least one computing unit is configured to detect the at least one vegetation maintenance device within the at least one garden area based on image data of the at least one garden area provided by the at least one camera unit.

9. The vegetation monitoring system according to claim 1, further comprising;
at least one computing unit configured to detect foreign objects in the at least one garden area based on image data used to determine the vegetation index, the determined vegetation index and/or the at least one detected garden parameter, wherein the at least one computing unit is configured to generate control signals for controlling at least one mobile unit of the vegetation monitoring system and/or the at least one vegetation maintenance device, as a function of a recognized foreign object, to examine the foreign object and/or to clear the at least one garden area.

10. The vegetation monitoring system according to claim 1, further comprising:
at least one computing unit; and
at least one communication unit configured to transmit electronic data between the at least one computing unit and at least one of an external network, a smart home system, a cloud, and the Internet,
wherein the at least one computing unit is configured to switch to an independent operating mode when a connection via the at least one communication unit is interrupted.

11. The vegetation monitoring system according to claim 1, further comprising:
at least one further vegetation monitoring device, wherein respective camera units of the at least one vegetation monitoring device and the at least one further vegetation monitoring device each have different detection ranges, and the at least one vegetation monitoring device and the at least one further vegetation monitoring device are configured to determine a position of the at least one vegetation monitoring device and the at least one further vegetation monitoring device relative to each other and/or an orientation of the different detection ranges as a function of at least one reference body detected within the different detection ranges.

12. The vegetation monitoring system according to claim 1, further comprising:
at least one computing unit configured to request a user input relating to a user activity in the at least one garden area as a function of a determined vegetation index, of a temporal progression of the vegetation index, of a detected garden parameter and/or of at least one input signal of the at least one vegetation maintenance device.

13. A method for monitoring vegetation health in a garden using the vegetation monitoring system according to claim 1.

14. A vegetation monitoring system for monitoring vegetation health in a garden, comprising:
at least one vegetation monitoring device comprising at least one camera unit configured to detect at least one garden area of the garden in at least one visible light range, and in at least one infrared range, wherein the at least one camera unit is configured to be arranged (i) at least substantially above a ground level of the garden, and (ii) to be arranged stationary within or in a vicinity of the garden, and wherein image data detected by the at least one camera unit is provided for determining a vegetation index of the at least one garden area of the garden;

at least one vegetation maintenance device configured to carry out at least one activity in the at least one garden area as a function of the determined vegetation index and/or of at least one garden parameter detected in the at least one garden area or assignable to the at least one garden area; and at least one computing unit configured to recognize foreign objects, such as objects, persons and/or animals, in the at least one garden area based on detected image data, wherein the at least one computing unit is configured to determine the vegetation index and to take into account areas of the image data which comprise a recognized foreign object when determining the vegetation index based on the image data.

15. The vegetation monitoring system according to claim 14, further comprising:

at least one detection unit configured to detect the at least one garden parameter.

16. The vegetation monitoring system according to claim 15, further comprising:

at least one computing unit, which is connected to at least one camera unit of the vegetation monitoring device, to the vegetation maintenance device and to the at least one detection unit, and which is configured to generate, as a function of the vegetation index and/or the garden parameter detected in the at least one garden area, control signals for controlling the at least one vegetation maintenance device to carry out the at least one activity of the at least one vegetation maintenance device in the at least one garden area.

17. The vegetation monitoring system according to claim 15, wherein the at least one detection unit is arranged on at least one mobile unit of the vegetation monitoring system and/or on the at least one vegetation maintenance device.

18. The vegetation monitoring system according to claim 14, wherein:

at least one computing unit is configured to determine at least one temporal progression of the vegetation index for the at least one garden area;

the at least one computing unit is configured to generate control signals for controlling the at least one vegetation maintenance device as a function of the at least one temporal progression of the vegetation index to carry out the at least one activity of the at least one vegetation maintenance device in the at least one garden area.

19. The vegetation monitoring system according to claim 14, further comprising:

at least one computing unit, wherein the vegetation monitoring device has at least one camera unit which is configured to determine the vegetation index in the at least one garden area in the at least one visible light range, and the at least one computing unit is configured to detect the at least one vegetation maintenance device within the at least one garden area based on image data of the at least one garden area provided by the at least one camera unit.

20. A vegetation monitoring system for monitoring vegetation health in a garden comprising:

at least one vegetation monitoring device comprising at least one camera unit configured to detect at least one garden area of the garden in at least one visible light range, and in at least one infrared range, wherein the at least one camera unit is configured to be arranged (i) at least substantially above a ground level of the garden, and (ii) to be arranged stationary within or in a vicinity of the garden, and wherein image data detected by the at least one camera unit is provided for determining a vegetation index of the at least one garden area of the garden;

at least one vegetation maintenance device configured to carry out at least one activity in the at least one garden area as a function of the determined vegetation index and/or of at least one garden parameter detected in the at least one garden area or assignable to the at least one garden area; and at least one computing unit configured to detect water accumulations in the at least one garden area based on image data detected by the vegetation monitoring device and/or of determined values of the vegetation index of the at least one garden area, wherein the at least one computing unit is further configured to generate control signals as a function of a position of detected water accumulation in the at least one garden area, and to control at least one mobile unit of the vegetation monitoring system and/or the at least one vegetation maintenance device to avoid and/or remove the water accumulation.

* * * * *